United States Patent
Sawaya et al.

(10) Patent No.: US 7,391,386 B2
(45) Date of Patent: Jun. 24, 2008

(54) ARRAY ANTENNA CONTROL DEVICE AND ARRAY ANTENNA DEVICE

(75) Inventors: Takuma Sawaya, Kyoto (JP); Kyoichi Iigusa, Kyoto (JP); Makoto Taromaru, Kyoto (JP); Takashi Ohira, Kyoto (JP); Kouji Araki, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 126 days.

(21) Appl. No.: 10/541,601

(22) PCT Filed: Jan. 8, 2004

(86) PCT No.: PCT/JP2004/000072

§ 371 (c)(1),
(2), (4) Date: Apr. 7, 2006

(87) PCT Pub. No.: WO2004/064194

PCT Pub. Date: Jul. 29, 2004

(65) Prior Publication Data

US 2006/0232492 A1    Oct. 19, 2006

(30) Foreign Application Priority Data

Jan. 8, 2003  (JP) ............................. 2003-002297
Mar. 12, 2003 (JP) ............................. 2003-066871
Jun. 11, 2003 (JP) ............................. 2003-166848

(51) Int. Cl.
*H01Q 19/00* (2006.01)
*H01Q 9/00* (2006.01)

(52) U.S. Cl. ........................ 343/833; 343/750; 343/745

(58) Field of Classification Search ................ 343/815, 343/817, 745, 749, 750, 833, 836, 837, 893
See application file for complete search history.

(56) References Cited

U.S. PATENT DOCUMENTS 5,767,807 A    6/1998  Pritchett (Continued)

FOREIGN PATENT DOCUMENTS

EP         0 812 026 A2    12/1997

(Continued)

OTHER PUBLICATIONS

Takashi Enoki et al., 2000 Nen The Institute of Electronics, Information and Communication Engineers Sogo Taikai Koen Ronbunshu, Mar. 7, 2000, p. 75.

(Continued)

*Primary Examiner*—Shih-Chao Chen
(74) *Attorney, Agent, or Firm*—Birch, Stewart, Kolasch & Birch, LLP

(57) ABSTRACT

An array antenna apparatus (100) includes a radiating element (A0) for receiving a transmitted radio signal, two parasitic elements (A1, A2), and two variable reactance elements (12-1, 12-2) connected to the respective parasitic elements (A1, A2), and a directivity characteristic of the array antenna apparatus is changed by changing reactances set to the variable reactance elements. An antenna controller (10) selects and sets one reactance to be set from those in a first case in which a first reactance set is set to the two variable reactance elements (12-1, 12-2) and a second case in which a second reactance set is set to the two variable reactance elements (12-1, 12-2) to be able to obtain a diversity gain equal to or larger than a predetermined value, based on a received radio signal, based on signal quality of the radio signal.

21 Claims, 47 Drawing Sheets

U.S. PATENT DOCUMENTS

| | | | |
|---|---|---|---|
| 6,337,668 | B1 | 1/2002 | Ito et al. |
| 6,407,719 | B1 | 6/2002 | Ohira et al. |
| 6,492,942 | B1 | 12/2002 | Kezys et al. |
| 6,677,898 | B2 | 1/2004 | Cheng et al. |
| 2002/0132581 | A1 | 9/2002 | Ichihara |
| 2003/0232633 | A1* | 12/2003 | Iida et al. .......... 455/575.7 |

FOREIGN PATENT DOCUMENTS

| | | |
|---|---|---|
| EP | 1 035 614 A2 | 9/2000 |
| JP | 55-52603 A | 4/1980 |
| JP | 2002-111559 A | 4/2002 |
| JP | 2002-261532 A | 9/2002 |
| JP | 2002-330019 A | 11/2002 |
| JP | 2002-374116 A | 12/2002 |
| JP | 2002118414 A | 4/2004 |
| KR | 2000-0062747 | 10/2000 |
| WO | WO-01/35490 A1 | 5/2001 |

OTHER PUBLICATIONS

Cheng et. al., IEICE Trans. Commun., vol. E84-B, No. 7, pp. 1790-1800 (Jul. 2001).

Shishkov et. al., "Adaptive Beamforming Of Espar Antenna Based On Stochastic Approximation Theory", (2001).

Gyoda et. al., "Design of electronically steerable passive array radiator (ESPAR) antennas" vol. 2, pp. 922-925 (2001).

Anonymous: Research and development of a 3-element planar ESPAR antenna for Binary Reactance Diversity pp. 1-2 Internet Article, 2002.

Ohira et al., 2000 IEEE International Conf. on Phased Array System & Technology, pp. 101-104, Dana Point, CA., May 21-25, 2000.

Ohira, Technical Report of the Institute of Electronics, Information and Communication Engineers in Japan, IEICE, AP2001-16, SAT2001-3, pp. 15-20, May 2001.

Ayoma et al., Proceedings of General Conference of IEICE, B-5-224, p. 695, Mar. 27-30, 2002 together with English translation thereof.

Ohira et al., Technical Report of IEICE, AP2000-44, pp. 7-14, Jul. 2000.

Murase et al., IEEE Transactions on Vehicular Technology, vol. 43, No. 3, pp. 537-541, Aug. 1994.

Arai, H., Sougou Denshi Shuppansha, 1st Ed., Apr. 9, 1996, pp. 151-155 together with a partial English translation thereof.

Rustako, Jr. et al., IEEE Transactions on Communications, vol. COM-21, No. 11, pp. 1257-1268, Nov. 1973.

Afrashteh et al., Conference Record of Globecom '88 Hollywood, pp. 810-814, Nov. 1988.

Akaiwa, Y., Proceeding of 39th IEEE Vehicle Technology Conf., pp. 470-473, 1989.

Proakis, J.G., Digital Communications, 3rd Ed., pp. 274-277, McGraw-Hill, New York, 1995.

Taromaru et al., Technical Report of IEICE, RCS2002-179, pp. 43-48, Oct. 2002.

Ohira et al., Technical Report of IEICE, AP2002-93, pp. 13-18, Oct. 2002.

Partial English translation of Enoki et al., Proceedings of General Conference of The Electronics, Information and Communications Engineers in Japan, Mar. 2000.

* cited by examiner

ARRAY ANTENNA CONTROL DEVICE AND ARRAY ANTENNA DEVICE

TECHNICAL FIELD

The present invention relates to an array antenna controller and an array antenna apparatus, and in particular, to a controller of an array antenna including a plurality of three or more antenna elements and implementing space diversity, and to an array antenna apparatus including the same array antenna controller.

BACKGROUND ART

Accompanying with radio communications' transferring to broadband media, an antenna apparatus mounted in a user terminal apparatus, such as a notebook personal computer or a PCMCIA card, is increasingly required to have advanced functions and exhibit a high performance. Examples of necessary functions include a function of removing multipath fading from an arriving radio signal. The multipath fading is such a phenomenon that sudden decrease in received level occurs when a radio wave transmitted from one signal source is propagated through a plurality of paths, and when received signals are cancelled at a receiving point with the same amplitudes as and opposite phases to those of each other. When the signal is received by an outdoor radio base station, the spread of an angle of the arriving radio wave through multi paths is relatively narrow. In an indoor environment including the user terminal apparatus, multipath radio waves spreading in all directions over 360 degrees arrives thereto.

A patent document and non-patent documents as cited in the present specification as references are as follows:

(1) Japanese patent laid-open publication No. JP-2002-118414-A (referred to as a first patent document hereinafter);

(2) T. Ohira et al., "Electronically Steerable Passive Array Radiator Antennas for Low-Cost Analog Adaptive Beamforming", 2000 IEEE International Conference on Phased Array System & Technology pp. 101-104, Dana point, Calif., May 21-25, 2000 (referred to as a first non-patent document hereinafter);

(3) Takashi Ohira, "Basic Theory on ESPAR Antenna Equivalent Weight Vector and Its Gradient", Technical Report of The Institute of Electronics, Information and Communication Engineers in Japan (referred to as an IEICE hereinafter), published by IEICE, AP2001-16, SAT2001-3, pp. 15-20, May 2001 (referred to as a second non-patent document hereinafter);

(4) Naoki Aoyama et al., "A Simple Diversity Receiver for CDEDM based on Mutual Coupling amongst Antenna Elements", Proceedings of General Conference of IEICE, published by IEICE, B-5-224, p. 695, Mar. 27-30, 2002 (referred to as a third non-patent document hereinafter);

(5) Takashi Ohira et al., "Equivalent Weight Vector and Array Factor Formulation for Espar Antennas", Technical Report of IEICE, published by IEICE, AP2000-44, p. 7-14, July 2000 (referred to as a fourth non-patent document hereinafter);

(6) Masahiro Murase et al., "Propagation and Antenna Measurements Using Antenna Switching and Random Field Measurements", IEEE Transactions on Vehicular Technology, Vol. 43, No. 3, pp. 537-541, August 1994 (referred to as a fifth non-patent document hereinafter);

(7) Hiroyuki Arai, "New antenna Engineering", pp. 151-155, published by Sougou Denshi Shuppansha, First Edition, Apr. 9, 1996 (referred to as a sixth non-patent document hereinafter);

(8) A. J. Rustako et al., "Performance of Feedback and Switch Space Diversity 900 MHz FM Mobile Radio Systems with Rayleigh Fading", IEEE Transactions on Communications, Vol. COM-21, pp. 1257-1268, November 1973 (referred to as a seventh non-patent document hereinafter);

(9) A. Afrashteh et al., "Performance of a Novel Selection Diversity Technique in an Experimental TDMA System for Digital Portable Radio Communications", Conference Record of Globecom '88 Hollywood, pp. 810-814, November 1988 (referred to as an eighth non-patent document hereinafter);

(10) Yoshiaki Akaiwa, "Antenna Selection Diversity for Framed Digital Signal Transmission in Mobile Radio Channel", Proceeding of 39th IEEE Vehicle Technology Conference, pp. 470-473, 1989 (referred to as a ninth non-patent document hereinafter);

(11) J. G. Proakis, "Digital communications", 3rd Edition, pp. 274-277, McGraw-Hill, New York, 1995 (referred to as a tenth non-patent document hereinafter);

(12) Makoto Taromaru et al., "A Study on the Mapping from Reactance Space to Equivalent Weight Vector Space of ESPAR Antenna", Technical Report of IEICE, published by IEICE, RCS2002-179, pp. 43-48, October 2002 (referred to as an eleventh non-patent document hereinafter);

(13) Takashi Ohira et al., "Basic Theory on 2-element Espar Antennas from Reactance Diversity Viewpoint", Technical Report of IEICE, published by IEICE, AP2002-93, pp. 13-18, October 2002 (referred to as a twelfth non-patent document hereinafter).

By the way, in order to mount an antenna apparatus in a portable terminal apparatus, a PC card or the like, such requirements are imposed on the antenna apparatus as small size and light weight, low cost when the antenna apparatus is accepted as a commercially available consumer product, and operation with low power consumption so that the antenna apparatus can be driven by a battery. As the antenna apparatus that satisfies these requirements, an electronically steerable passive array radiator antenna apparatus is proposed in, for example, each of the first patent document and the first, second and fourth non-patent documents.

The electronically steerable passive array radiator antenna apparatus includes an array antenna which includes a radiating element supplied with a radio signal, six parasitic elements which are provided to be distant from the radiating element at a predetermined interval, and which are not supplied with the radio signal, and variable reactance elements connected to the respective parasitic elements, respectively. By changing reactances of the respective variable reactance elements, a directivity characteristic of the array antenna can be changed. Numeric simulation examples are reported when even a two-element electronically steerable passive array radiator antenna apparatus having a small antenna element interval of one-tenth of the wavelength to be used can exhibit space diversity effect (See the third non-patent document).

The antenna apparatus disclosed in each of the first patent document and the third non-patent document implements an adaptive control processing for finely (substantially continuously) changing reactances so as to determine reactances to be set. The present adaptive control processing accompanies a complicated processing algorithm and a controller for executing the algorithm. Further, the controller needs a DA converter for generating a control voltage to generate a reactance signal to be set to a varactor diode. As a result, the configuration of the antenna apparatus is complicated, and a size and a cost of the apparatus increases.

As shown in FIG. 51, the antenna apparatus as disclosed in the third non-patent document is constituted so that two antenna elements A0 and A1 are arranged in parallel at a predetermined interval d, and so that a variable reactance element 12 of a varactor diode is connected to the antenna element A1 of a parasitic element. If the antenna apparatus is so constituted, a reactance X1 of the variable reactance element 12 can be changed by changing a control voltage applied to the variable reactance element 12 as shown in FIG. 52. However, an input impedance $Z_{in}$ at a feeding port of the antenna element A0 of a radiating element is also disadvantageously changed. In other words, the two-element antenna apparatus has such disadvantages that a change in the input impedance of the antenna apparatus is large relative to a change in the connected reactance, and in that an impedance matching design of the antenna apparatus including up to a feeding system is difficult.

A method for controlling the reactance into two states, and for selecting the reactance when a larger received power is obtained in a two-element electronically steerable passive array radiator antenna apparatus is disclosed in, for example, the twelfth non-patent document. However, a control method for a three-element electronically steerable passive array radiator antenna apparatus is complicated and not established yet.

Further, the three-element electronically steerable passive array radiator antenna apparatus is desired to be small in size, light in weight, and thin.

It is a first object of the present invention to provide an electronically steerable passive array radiator antenna apparatus including three or more elements, which is quite simple in hardware for configuration and steering as compared with conventional art, which can greatly improve an antenna gain with a multipath fading, and which can keep an input impedance of an antenna substantially unchanged with a change in a element value of a variable reactance element.

It is a second object of the present invention to provide an electronically steerable passive array radiator antenna apparatus including three elements, which is small in size, light in weight, and thin.

DISCLOSURE OF THE INVENTION

According to one aspect of the present invention, there is provided a controller for controlling an array antenna. The array antenna includes a radiating element, a plurality of parasitic elements, and a plurality of variable reactance elements. The radiating element is provided for receiving a transmitted radio signal, and each of the parasitic elements is provided to be distant from the radiating element at a predetermined interval. The variable reactance elements are connected to the parasitic elements, respectively.

The controller changes reactances to be set to the variable reactance elements, respectively, so that the parasitic elements operate as waveguides or reflectors, and then changing a directivity characteristic of the array antenna. The controller includes a control device.

The control device selects one reactance set from among a plurality of reactance sets in a plurality of cases of setting the plurality of reactance sets, respectively so as to be able to obtain a diversity gain equal to or larger than a predetermined value, based on the radio signal received by the array antenna, based on a signal quality of the radio signal received in each of the plurality of cases according to a predetermined selection criterion, and then, sets the selected reactance set to the plurality of variable reactance elements, respectively.

In the above-mentioned array antenna controller, the plurality of cases are of setting the plurality of reactance sets so as to be able to obtain a diversity gain equal to or larger than a predetermined value, and so as to keep an input impedance of the array antenna substantially unchanged, based on the radio signal received by the array antenna.

Further, in the above-mentioned array antenna controller, the signal quality of the radio signal is preferably estimated using one of a signal strength, a signal power, a signal-to-noise ratio, a ratio of signal to noise including an interference noise, a ratio of a carrier signal to noise, a bit error rate, a frame error rate, and a packet error rate.

Furthermore, in the above-mentioned array antenna controller, the selection criterion is preferably such that the signal quality of the radio signal received in each of the plurality of cases is equal to or larger than a predetermined threshold. Alternatively, the selection criterion is preferably such that, when the signal quality of the radio signal received in each of a plurality of cases is one of a signal power, a signal-to-noise ratio, a ratio of signal to noise including an interference noise, and a ratio of carrier signal to noise, then a reactance set, as obtained when the signal quality is a maximum, is selected. Otherwise, the selection criterion is preferably such that, when the signal quality of the radio signal received in each of the plurality of cases is one of the bit error rate, the frame error rate, and the packet error rate, then a reactance set, as obtained when the signal quality is a minimum, is selected.

In the above-mentioned array antenna controller, the control device preferably arbitrarily selects one reactance set from among the plurality of reactance sets when the signal quality of the radio signal received in each of the plurality of cases is smaller than a predetermined threshold, and repeats the selection processing until the signal quality reaches a predetermined selection criterion for the selected reactance set. Alternatively, the control device preferably selects one reactance set in a predetermined order from among the plurality of reactance sets when the signal quality of the radio signal received in each of the plurality of cases is smaller than a predetermined threshold, and repeats the selection processing until the signal quality reaches a predetermined selection criterion for the selected reactance set. Otherwise, the control device preferably switches over the plurality of cases with changing a threshold in a predetermined range, and sets as the threshold, a threshold as obtained when the signal quality of the radio signal satisfies a predetermined selection criterion.

Further, in the above-mentioned array antenna controller, the array antenna preferably includes an even number of parasitic elements and an even number of variable reactance elements. The even number of parasitic elements includes at least one first set of parasitic elements and at least one second set of parasitic elements. The even number of variable reactance elements include a first set of variable reactance elements connected to the first set of parasitic elements, respectively, and a second set of variable reactance elements connected to the second set of parasitic elements, respectively. The plurality of cases include a first case in which the first reactance set is set to the first and second sets of variable reactance elements, and a second case in which the second reactance set is set to the first and second sets of variable reactance elements. The control device selects one reactance set based on the signal quality of the radio signal received in each of the first and second cases, and sets the selected reactance set to the first and second sets of variable reactance elements.

In this case, the array antenna preferably includes first and second parasitic elements, the first reactance set includes reactances $X_a$ and $X_b$ which are set to the first and second parasitic elements, and the second reactance set includes the reactances $X_b$ and $X_a$ which are set to the first and second parasitic elements.

Further, in the above-mentioned array antenna controller, the array antenna preferably includes a plurality of parasitic elements each being distant from the radiating element at a predetermined interval, and the parasitic elements are provided at substantially equal angle relative to each other. The plurality of cases include a case in which a plurality of reactance sets obtained by circulating respective reactances are set so as to be able to obtain a diversity gain equal to or larger than a predetermined value, based on the radio signal received by the array antenna.

Furthermore, in the above-mentioned array antenna controller, the array antenna preferably includes a plurality of parasitic elements each being distant from the radiating element at a predetermined interval, and the parasitic elements are provided at substantially equal angle relative to each other. The plurality of cases include a case in which a plurality of reactance sets obtained by circulating respective reactances are set so as to be able to obtain a diversity gain equal to or larger than a predetermined value and so as to keep the input impedance of the array antenna substantially unchanged, based on the radio signal received by the array antenna.

Still further, in the above-mentioned array antenna controller, the array antenna preferably includes at least one pair of parasitic elements, and a plurality of parasitic elements. At least one pair of parasitic elements is provided linearly symmetrically about a symmetric line that serves as a symmetric axis, and that passes through a position of the radiating element. The plurality of parasitic elements are provided either one of to be located on the symmetric line and to be linearly symmetric about the symmetric line serving as the symmetric axis. The plurality of cases include at least two cases in which a plurality of reactance sets obtained by replacing reactances of at least one pair of parasitic elements provided linearly symmetrically with each other are set so as to be able to obtain a diversity gain equal to or larger than a predetermined value, based on the radio signal received by the array antenna.

Alternatively, in the above-mentioned array antenna controller, the array antenna preferably includes at least one pair of parasitic elements, and a plurality of parasitic elements. At least one pair of parasitic elements is provided linearly symmetrically about a symmetric line that serves as a symmetric axis, and that passes through a position of the radiating element. The plurality of parasitic elements provided either one of to be located on the symmetric line and to be linearly symmetric about the symmetric line serving as the symmetric axis. The plurality of cases include at least two cases in which a plurality of reactance sets obtained by replacing reactances of at least one pair of parasitic elements provided linearly symmetrically with each other are set so as to be able to obtain a diversity gain equal to or larger than a predetermined value, and so as to keep the input impedance of the array antenna substantially unchanged, based on the radio signal received by the array antenna.

In the above-mentioned array antenna controller, when a CDF, which is a cumulative probability of such an event as a signal power of the received radio signal exceeding a predetermined signal power, is a predetermined value, the plurality of reactance sets are set so that the diversity gain is substantially a maximum.

Alternatively, in the above-mentioned array antenna controller, when a CDF, which is a cumulative probability of such an event as a signal power of the received radio signal exceeding a predetermined signal power, is a predetermined value, the plurality of reactance sets are set so that the diversity gain is equal to or larger than a predetermined value.

In the above-mentioned array antenna controller, the array antenna preferably includes one radiating element, and two parasitic elements between which the radiating element is provided, and which are provided linearly together with the radiating element. In this case, in the above-mentioned array antenna controller, a distance between the radiating element and each of the parasitic elements is preferably set to one of lengths which are 0.1 to 0.35 times as large as a wavelength of the received radio signal.

Further, in the above-mentioned array antenna controller, the array antenna preferably includes a dielectric substrate, a grounding electrical conductor, and three strip electrical conductors. The dielectric substrate includes first and second surfaces parallel to each other. The grounding electrical conductor is formed on a predetermined first region on the second surface of the dielectric substrate. The three strip electrical conductors are formed on the first surface of the dielectric substrate, the three strip electrical conductors are formed to have a predetermined length so as to protrude from a region opposite to the first region, and to be provided at predetermined interval, so that the three strip electrical conductors operating as the radiating element and the two parasitic elements, respectively.

According to another aspect of the present invention, there is provided an array antenna apparatus including one radiating element, two radiating elements, and two variable reactance elements. Between the two parasitic elements, the radiating element is provided, and the two parasitic elements are provided linearly together with the radiating element. The two variable reactance elements are connected to the parasitic elements, respectively. The array antenna apparatus changes reactances which are set to the respective variable reactance elements, so that the parasitic elements operate as waveguides or reflectors, thereby changing a directivity characteristic of the array antenna apparatus.

The array antenna apparatus further includes a dielectric substrate, a grounding electrical conductor, and three strip electrical conductors. The dielectric substrate includes first and second surface parallel to each other. The grounding electrical conductor is formed on a predetermined first region on the second surface of the dielectric substrate. The three strip electrical conductors are formed on the first surface of the dielectric substrate, the three strip electrical conductors are formed to have a predetermined length so as to protrude from a region opposite to the first region, and the three strip electrical conductors are provided at a predetermined interval so as to operate as the radiating element and the two parasitic elements, respectively.

In the above-mentioned array antenna apparatus, a distance between the radiating element and each of the parasitic elements is preferably set to one of lengths which are 0.1 to 0.35 times as large as a wavelength of a received radio signal.

BEST MODE FOR CARRYING OUT THE INVENTION

Preferred embodiments of the present invention will be described hereinafter with reference to the drawings.

First Preferred Embodiment

Figure 1:
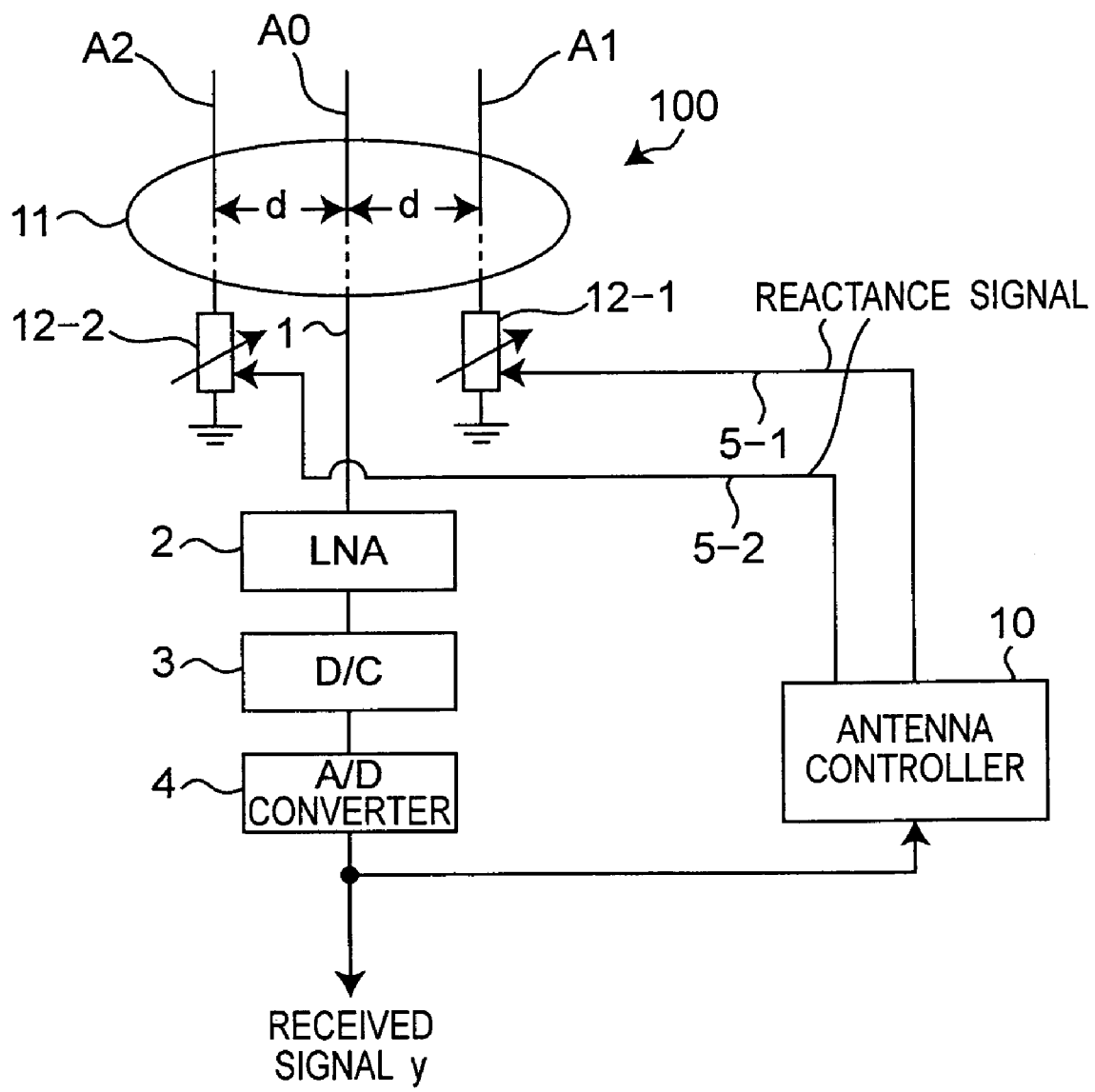
FIG. 1 is a block diagram showing a configuration of an array antenna controller according to a first preferred embodiment of the present invention.

FIG. 1 is a block diagram showing a configuration of an array antenna controller according to a first preferred embodiment of the present invention. As shown in FIG. 1, the array antenna controller includes an array antenna apparatus 100 constituted by a three-element electronically steerable passive array radiator antenna apparatus which includes one radiating element A0, a first parasitic element A1 to which a variable reactance element 12-1 is connected, and a second parasitic element A2 to which a variable reactance element 12-2 is connected, and an antenna controller 10. The antenna controller 10 is characterized by selecting a reactance set, when a signal power of a radio signal is larger, from among the following first and second cases. In the first case, a first reactance set (Xa and Xb) are set to the two variable reactance elements 12-1 and 12-2 (note that the reactance Xa is set to the variable reactance element 12-1, and then, the reactance Xb is set to the variable reactance element 12-2). In the second case, a second reactance set (Xb and Xa) are set to the two variable reactance elements 12-1 and 12-2 (note that the reactance Xb is set to variable reactance element 12-1, and then, the reactance Xa is set to the variable reactance element 12-2). This leads to that the array antenna apparatus can obtain a diversity gain equal to or larger than a predetermined value, and an input impedance $Z_{in}$ of the array antenna apparatus 100 is kept substantially unchanged, by setting the selected reactance set to the two variable reactance elements 12-1 and 12-2, respectively, based on the radio signal received by the array antenna apparatus 100.

Figure 2:
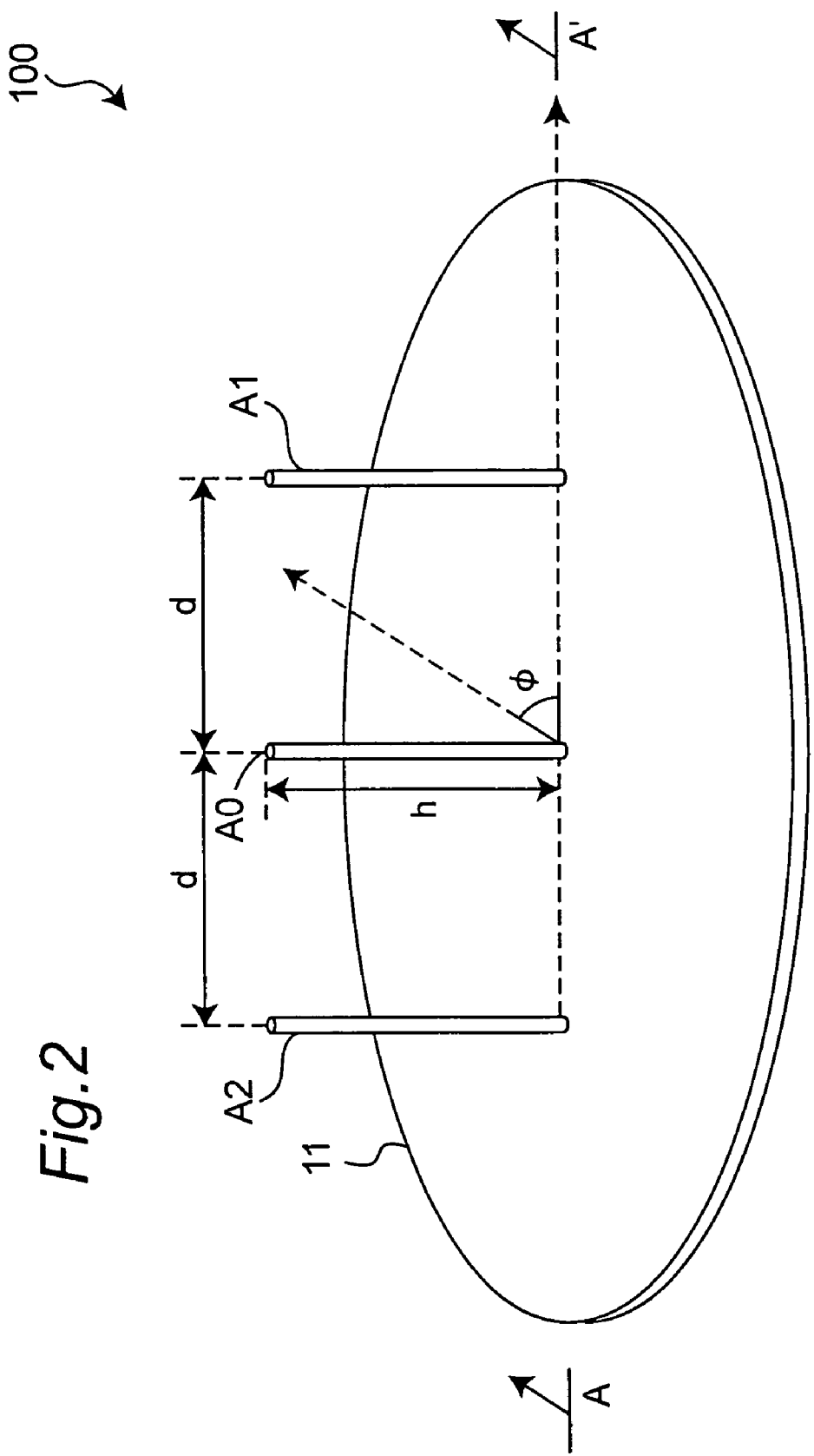
FIG. 2 is a perspective view showing a detailed configuration of an array antenna apparatus 100 shown in FIG. 1.

FIG. 2 is a perspective view showing a detailed configuration of the array antenna apparatus 100 shown in FIG. 1. As shown in FIGS. 1 and 2, the array antenna apparatus 100 includes the radiating element A0 and the two parasitic elements A1 and A2 which are provided vertically on a grounding electrical conductor 11. The radiating element A0 and the parasitic element A1 are arranged to be parallel to each other and distant from each other at an interval "d". The radiating element A0 and the parasitic element A2 are arranged to be parallel to each other and distant from each other at the interval d. The three antenna elements A2, A0 and A1 are arranged linearly. A length of each of the radiating element A0 and the parasitic elements A1 and A2 is set to about one-fourth of a wavelength $\lambda$ of a desired radio wave, and the antenna interval "d" is set to be, for example, 0.1 to 0.35 times as long as the wavelength $\lambda$. A feeding point of the radiating element A0 is connected to a low noise amplifier (LNA) 2 through a coaxial cable 1. The parasitic element A1 is connected to the variable reactance element 12-1, the parasitic element A2 is connected to the variable reactance element 12-2, and reactances of the variable reactance elements 12-1 and 12-2 are set according to reactance signals transmitted from the antenna controller 10 through paired cables 5-1 and 5-2, respectively.

Figure 3:
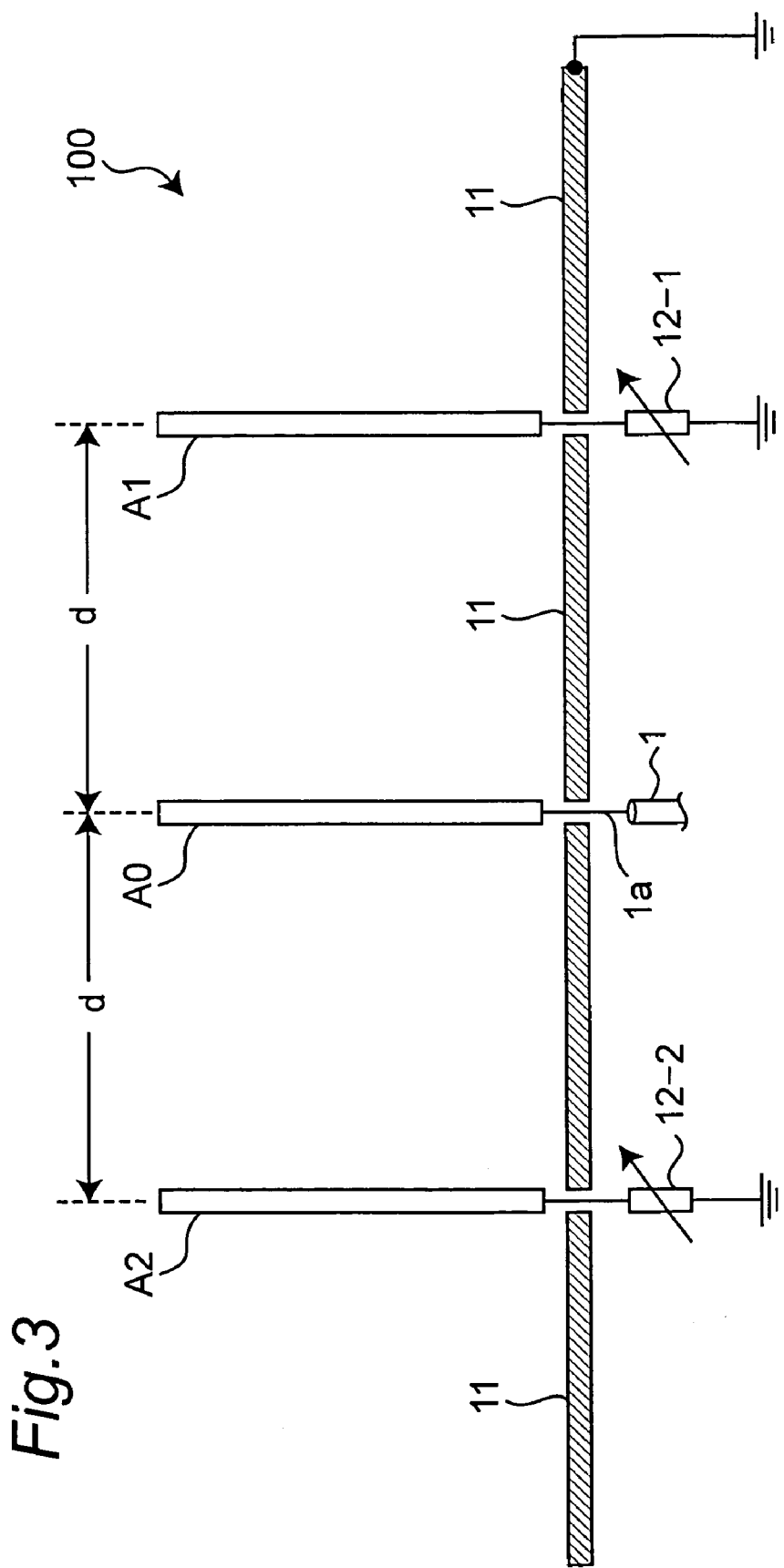
FIG. 3 is a longitudinal sectional view of the array antenna apparatus 100 taken along a line A-A' of FIG. 2.

FIG. 3 is a longitudinal sectional view of the array antenna apparatus 100 taken along a line A-A' of FIG. 2.

Referring to FIG. 3, the radiating element A0 is electrically isolated from the grounding electrical conductor 11, and connected to a center conductor 1a of the coaxial cable 1. The parasitic element A1 is grounded to the grounding electrical conductor 11 through the variable reactance element 12-1 at a high frequency. The parasitic element A2 is grounded to the grounding electrical conductor 11 through the variable reactance element 12-2 at a high frequency. An operation of each of the variable reactance elements 12-1 and 12-2 will be described.

If the radiating element A0 is substantially equal in a length in a longitudinal direction to the parasitic elements A1 and A2, for example, and if the variable reactance element 12-1 possesses an inductance characteristic (L characteristic), for example, then the variable reactance element 12-1 serves as an extension coil, an electric length of the parasitic element A1 is larger than that of the radiating element A0, and the parasitic element A1 acts as a reflector. On the other hand, if the variable reactance element 12-1 possesses a capacitance characteristic (C characteristic), for example, then the variable reactance element 12-1 serves as a reduced capacitor, the electric length of the parasitic element A1 is smaller than the radiating element A0, and the parasitic element A1 acts as a waveguide. Further, the parasitic element A2 to which the variable reactance element 12-2 is connected operates in a manner similar to that of the parasitic element A1. As the variable reactance elements 12-1 and 12-2, varactor diodes can be employed, for example.

Therefore, in the array antenna apparatus 100 shown in FIG. 1, by changing the reactances of the respective variable reactance elements 12-1 and 12-2 connected to the parasitic elements A1 and A2, respectively, a plane directivity characteristic of the array antenna apparatus 100 can be changed.

In the array antenna controller shown in FIG. 1, the array antenna 100 receives a radio signal and inputs the received radio signal to the LNA 2 through the coaxial cable 1, the LNA 2 amplifies the radio signal, and a down-converter (D/C) 3 coverts the amplified radio signal into a signal at a predetermined intermediate frequency (an IF signal). An A/D converter 4 converts the IF signal of an analog signal, into a digital signal and outputs the digital signal as a received signal "y". The received signal "y" is inputted to the antenna controller 10, and also inputted to a demodulator (not shown), in which the received signal "y" is converted into a demodulated signal. The antenna controller 10 selects the reactance set, as obtained when the signal power of the radio signal received in the first case or the second case is larger, from those in the first case in which the first reactance set (Xa and Xb) are set to the two variable reactance elements 12-1 and 12-2, and the second case in which the second reactance set (Xb and Xa) are set to the two variable reactance elements 12-1 and 12-2 so as to be able to obtain a diversity gain equal to or larger than a predetermined value, and so that the input impedance $Z_{in}$ of the array antenna apparatus 100 is kept substantially unchanged, and sets the selected reactance set to the two variable reactance elements 12-1 and 12-2, respectively, based on the radio signal received by the array antenna apparatus 100.

Figure 4:
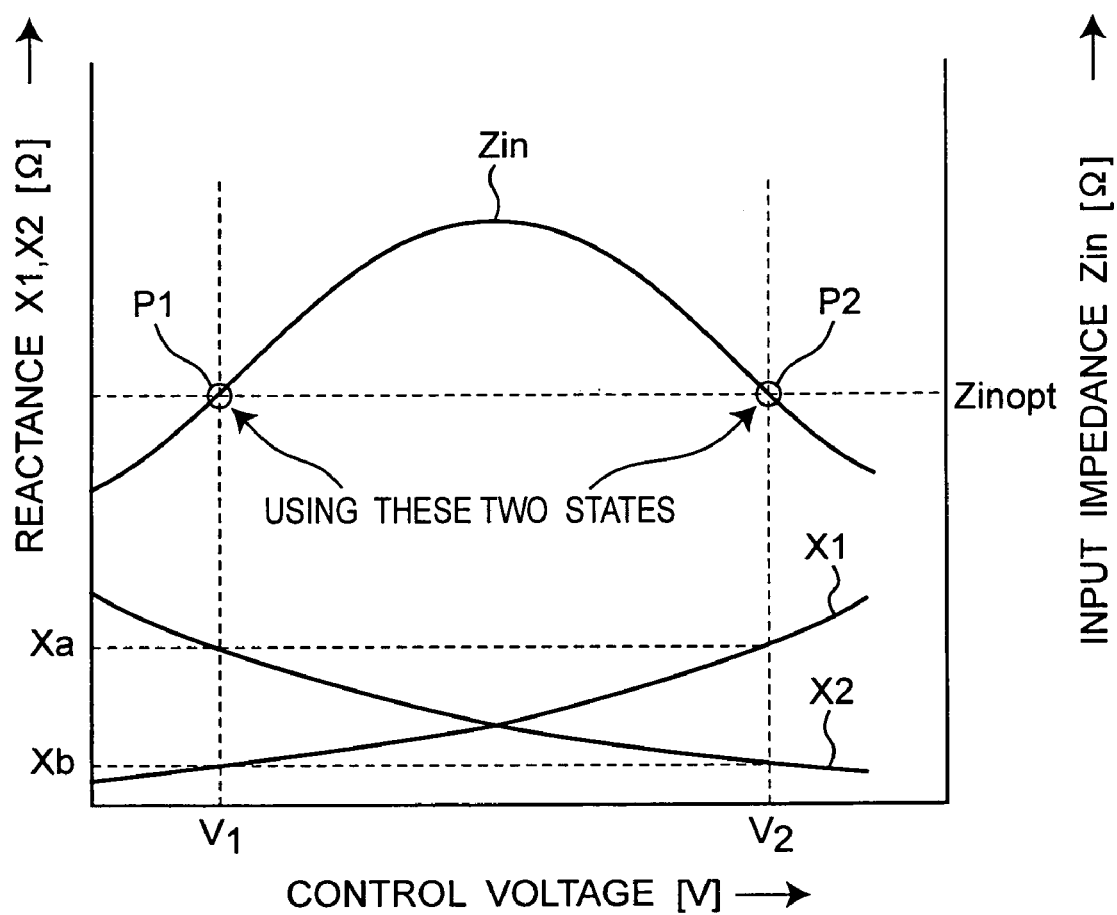
FIG. 4 is a graph showing a reactance and an input impedance relative to a control voltage applied to variable reactance elements 12-1 and 12-2 of the array antenna apparatus according to the preferred embodiment.

The first reactance set (Xa and Xb) and the second reactance set (Xb and Xa) are set as shown in FIG. 4. In other words, two states P1 and P2 in which the input impedance $Z_{in}$ of the array antenna apparatus 100 is kept substantially unchanged (the input impedance $Z_{in}$ at this time is $Z_{inopt}$) are measured in advance. The first reactance set (Xa and Xb) and the second reactance set (Xb and Xa) corresponding to the two states P1 and P2, respectively, are measured in advance and stored in a reactance set memory (not shown) as provided in the antenna controller 10. The antenna controller 10 selects the reactance set when the signal power of the radio signal received in one of the states P1 and P2 is larger, and sets the selected reactance sets to the variable reactance elements 12-1 and 12-2, respectively.

The array antenna controller according to the present preferred embodiment is simple in hardware for configuration and can obtain an effect of greatly improving the antenna gain with a multipath fading by simple one-bit binary control (that is, control for selecting one of the first reactance set (Xa and Xb) and the second reactance set (Xb and Xa)). Therefore, the array antenna apparatus can be employed as a diversity antenna which can be mounted in a commercially available consumer terminal apparatus such as a laptop terminal apparatus, or a PC card. The present control method (one-bit control) can dispense with the DA converter for generating a control voltage which is required in a system for continuously controlling the varactor diode. Therefore, the antenna apparatus can be made smaller in size and lower in cost. In addition, the one-bit binary control enables keeping the input impedance $Z_{in}$ of the array antenna apparatus 100 substantially hardly changed.

In the above-mentioned preferred embodiment, the first and second reactance sets (Xa and Xb) and (Xb and Xa) are used. However, the present invention is not limited to this. Two reactance sets (Xa and Xb) and (Xc and Xd) (where Xa≠Xd and Xb≠Xc) when the diversity gain equal to or larger than a predetermined value can be obtained and the input impedance of the array antenna apparatus 100 can be set to be substantially unchanged may be used.

Second Preferred Embodiment

Figure 5:
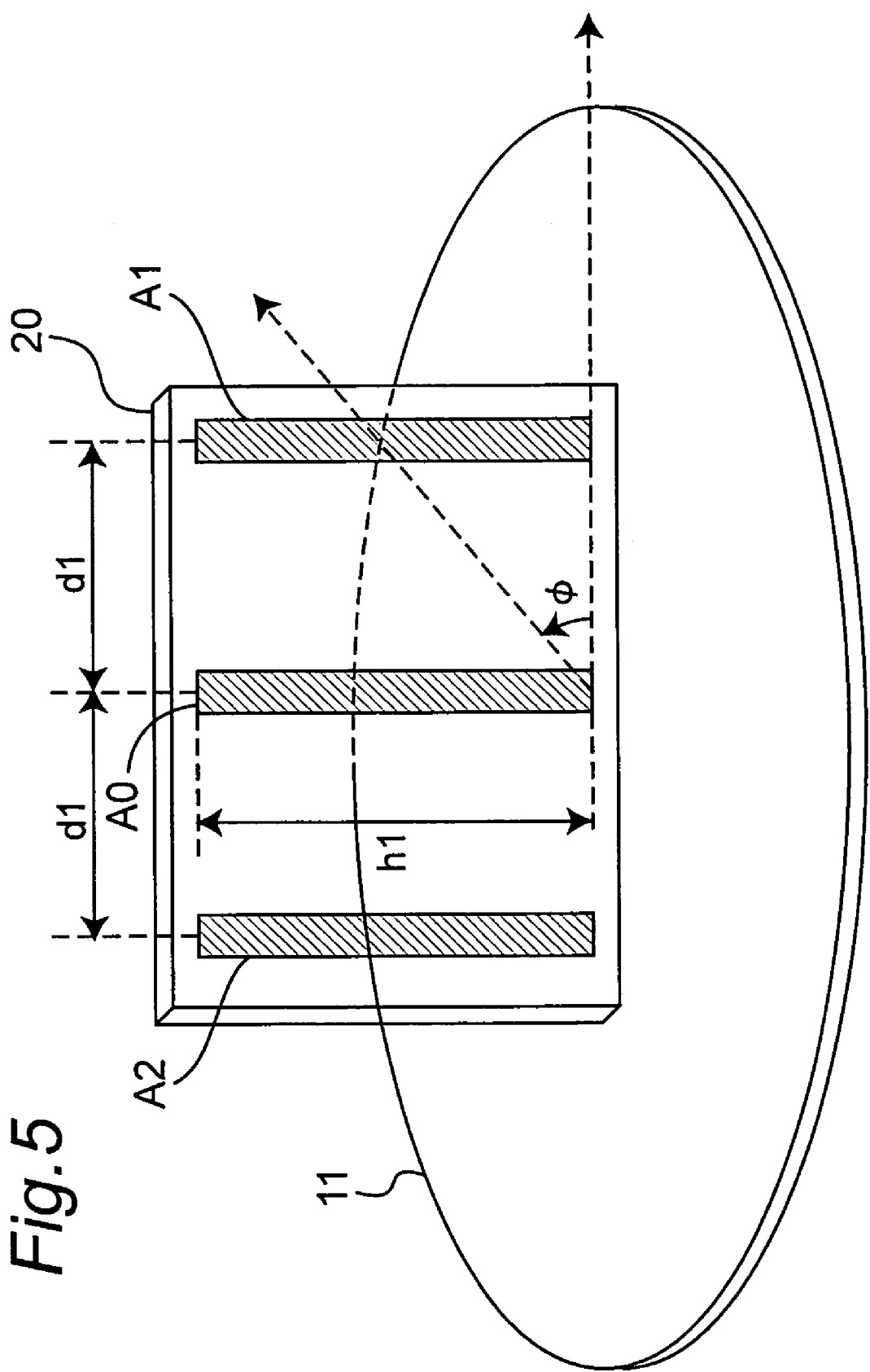
FIG. 5 is a perspective view showing a configuration of an array antenna apparatus according to a second preferred embodiment of the present invention.

FIG. 5 is a perspective view showing a configuration of an array antenna apparatus according to a second preferred embodiment of the present invention. The present preferred embodiment is characterized in that the radiating element A0 and the parasitic elements A1 and A2 shown in FIG. 1 are formed as strip electrical conductors printed on one surface of a dielectric substrate 20. The dielectric substrate 20 on which the radiating element A0 and the parasitic elements A1 and A2 are formed is a printed circuit board having a thickness of, for example, about 1 mm and made of, for example, glass epoxy resin, Teflon (trademark), alumina ceramic or the like. The radiating element A0 and the parasitic elements A1 and A2 are formed by a well-known printed circuit board process technique. In addition, the dielectric substrate 20 is provided vertically on a grounding electrical conductor 11.

The radiating element A0 is formed on the dielectric substrate 20 as a strip electrical conductor antenna element having a predetermined length $h_1$. Each of the parasitic elements A1 and A2 is formed on the dielectric substrate 20 as a strip electrical conductor antenna element having a length $h_1$ at an interval d1 to the radiating element A0, and parallel to the radiating element A0. The length $h_1$ is set to be about one-fourth of a wavelength of a radio signal received or transmitted.

Figure 6:
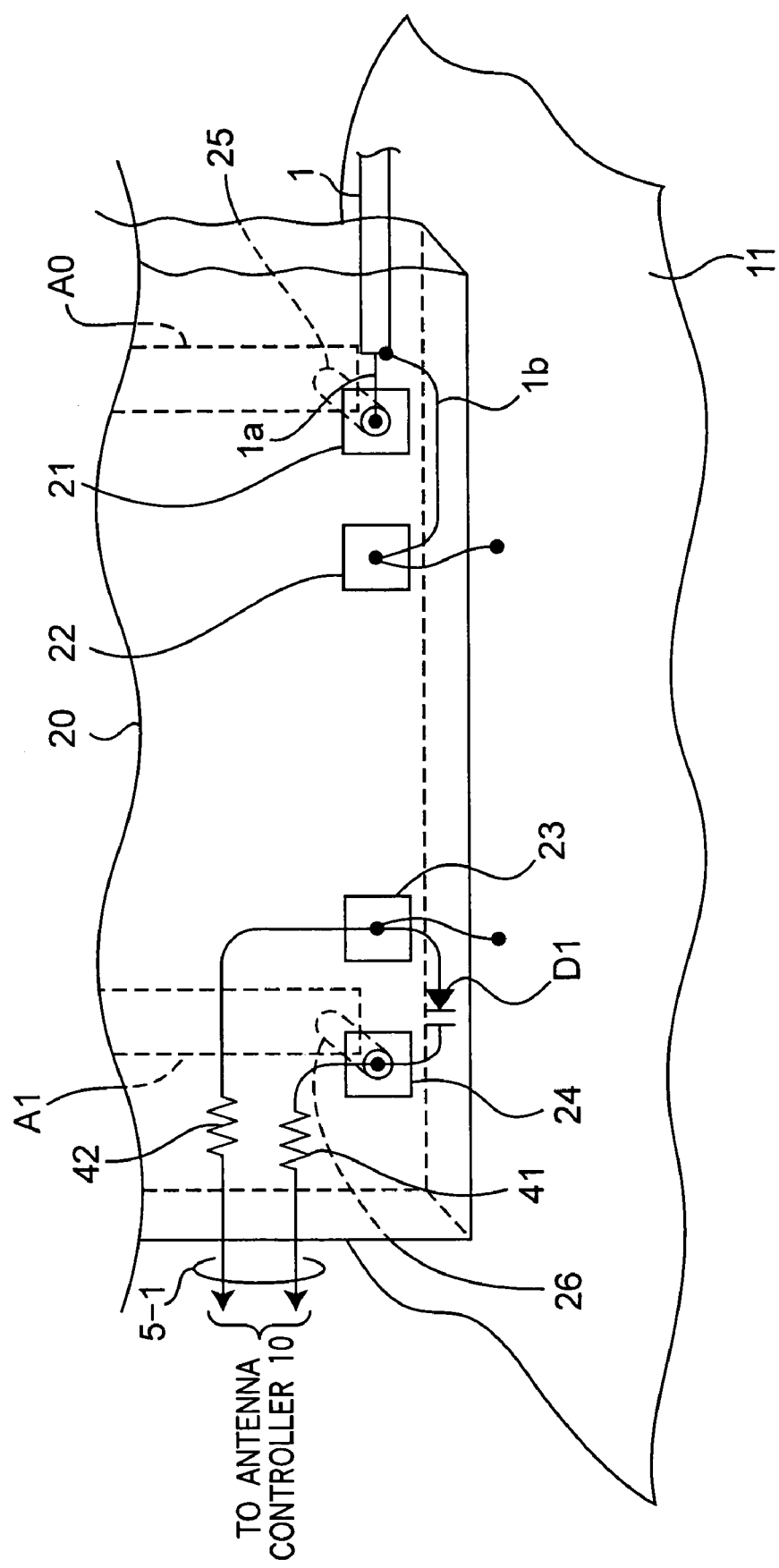
FIG. 6 is a perspective view showing a detailed configuration of a lower portion of a dielectric substrate 20 shown in FIG. 5.

FIG. 6 is a perspective view showing a detailed configuration of a lower portion of the dielectric substrate 20 shown in FIG. 5. Four electrodes 21 to 24 distant from each other are formed on a surface of the dielectric substrate 20 opposite to the surface on which the radiating element A0 and the parasitic element A1 are formed. A lower end (an end closer to the grounding electrical conductor 11) of the radiating element A0 is electrically connected to the electrode 21 through a through hole conductor 25 which passes through the dielectric substrate 20. The electrode 22 is electrically connected to the grounding electrical conductor 11. The electrode 21 is connected to a center conductor 1a of a coaxial cable 1 connected to an LNA 2, and the electrode 22 is connected to an external conductor 1b of the coaxial cable 1. A lower end of the parasitic element A1 is connected to the electrode 24 through a through hole conductor 26 which passes through the dielectric substrate 20. The electrode 24 is connected to a cathode of a varactor diode D1. The varactor diode D1 is an example of a variable reactance element 12. An anode of the varactor diode D1 is connected to the electrode 23, and the electrode 23 is electrically connected to the grounding electrical conductor 11. Further, the electrodes 23 and 24 are connected to an applied bias voltage terminal (not shown) of an antenna controller 10 which controls a directivity characteristic of the array antenna apparatus through resistances 41 and 42 for blocking high-frequency current in a range from a few kΩ to several tens kΩ and paired cables 5-1, respectively.

In the array antenna apparatus constituted as mentioned above, an applied bias voltage included in a reactance signal from the antenna controller 10 is applied to both ends of the varactor diode D1 through the paired cables 5-1, respectively. In this case, by changing the applied bias voltage, a coupling capacitance, i.e., a reactance of the varactor diode D1 can be changed. The antenna controller 10 includes a function as a variable voltage direct-current power supply. By changing a reverse bias voltage applied to the varactor diode D1 connected to the parasitic element A1, the coupling capacitance of the varactor diode D1 is changed and an electric length of the parasitic element A1 is also changed as compared with the radiating element A0. In addition, by changing the electric length of the parasitic element A2 as compared with the radiating element A0, the plane directivity characteristic of the array antenna apparatus can be changed.

The array antenna apparatus according to the second preferred embodiment constituted as mentioned above is easy to control and the input impedance of the apparatus is kept substantially unchanged by the control. Further, the dielectric substrate 20 on which the radiating element A0 and the parasitic elements A1 and A2 are formed is provided on the grounding electrical conductor 11. Therefore, it is possible to provide the array antenna apparatus which is simple in structure, as compared with that of the conventional diversity antenna apparatus, and which enables forming the drier element A0 and the parasitic elements A1 and A2 easily and accurately. In addition, the radiating element A0 and the parasitic elements A1 and A2 each of a strip electrical conductor are formed on the dielectric substrate 20. Therefore, it is advantageously possible to easily form the antenna elements by the printed circuit board formation technique and make manufacturing steps quite simple.

FIRST IMPLEMENTAL EXAMPLE

Figure 7:
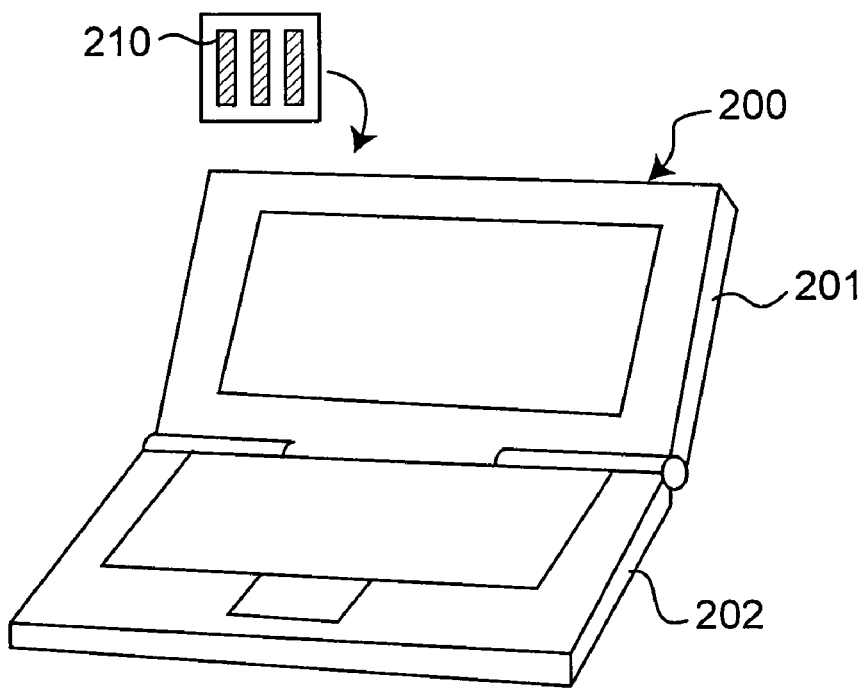
FIG. 7 is a perspective view showing an array antenna apparatus mounted in a portable personal computer 200 shown in FIG. 4 as a first implemental example according to the present invention.

FIG. 7 is a perspective view showing an array antenna apparatus mounted in a portable personal computer 200 as a first implemental example according to the present invention. In the present implemental example, the portable personal computer 200 includes a folding housing including an upper housing 201 and a lower housing 202. An array antenna apparatus 210 according to the preferred embodiment can be fixed onto the upper housing 201 or connected onto the upper housing 201 so that a direction of the apparatus 210 is movable. The array antenna apparatus 210 is shown as a quarter-wave monopole array antenna apparatus formed to be printed on a dielectric substrate in a manner similar to that of FIG. 5. Although a grounding electrical conductor of the array antenna apparatus 210 is not shown in FIG. 7, the grounding electrical conductor may be formed to the upper housing 201 or, if the upper housing 201 is made of metal, the upper housing 201 may be used as the grounding electrical conductor. As a controller in the implemental example shown in FIG. 7, the above-mentioned antenna controller 10 can be used.

SECOND IMPLEMENTAL EXAMPLE

Figure 8:
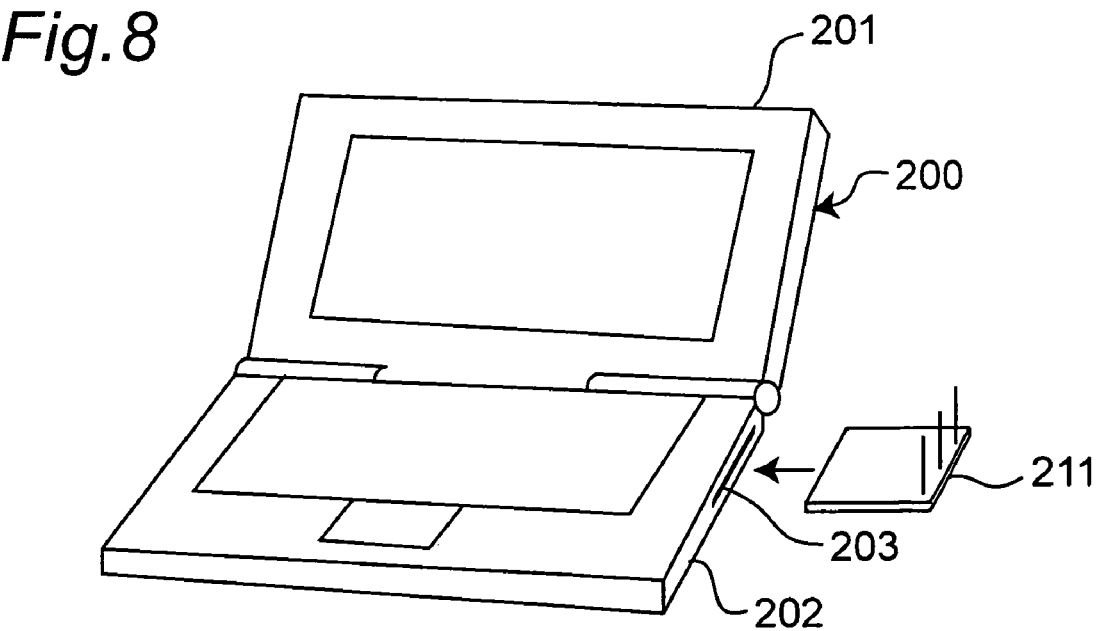
FIG. 8 is a perspective view showing an array antenna apparatus mounted in a PC card 211 shown in FIG. 1 as a second implemental example according to the present invention.

FIG. 8 is a perspective view showing an array antenna apparatus mounted in a PC card 211 as a second implemental example according to the present invention. In the present implemental example, the quarter-wave monopole array antenna apparatus provided on the PC card 211 which operates as a grounding electrical conductor is shown, in a manner similar to that of FIG. 1. The PC card 211 is inserted into a PC card slot 203 provided in a lower housing 202 of a portable personal computer 200 similar to that shown in FIG. 7, and the PC card 211 can operate as an antenna of a PC 200. As a controller in the implemental example shown in FIG. 8, the above-mentioned antenna controller 10 can be used.

Third and Fourth Preferred Embodiments

Figure 9:
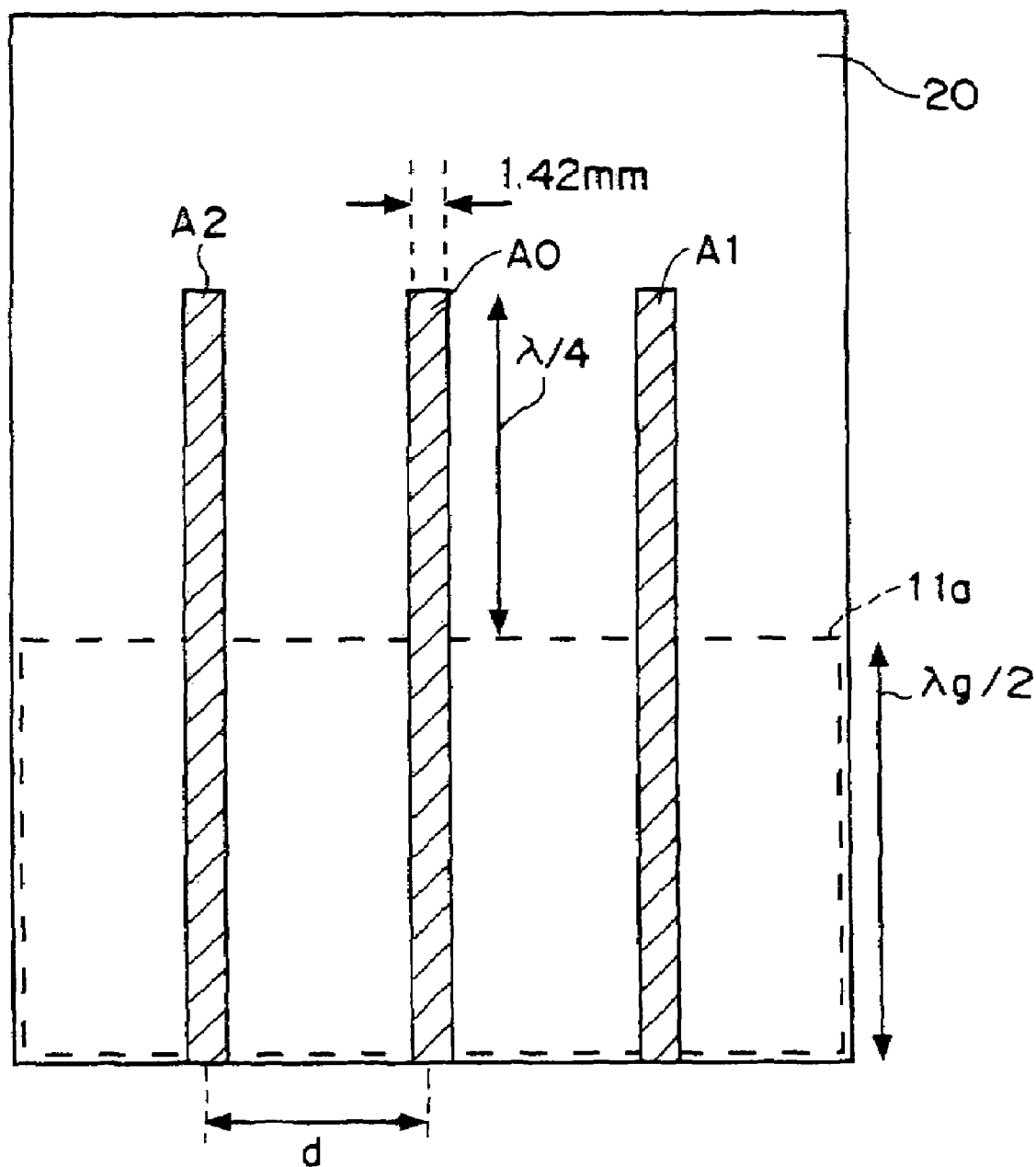
FIG. 9 is a plan view showing a configuration of an array antenna apparatus according to a third preferred embodiment according to the present invention.
Figure 10:
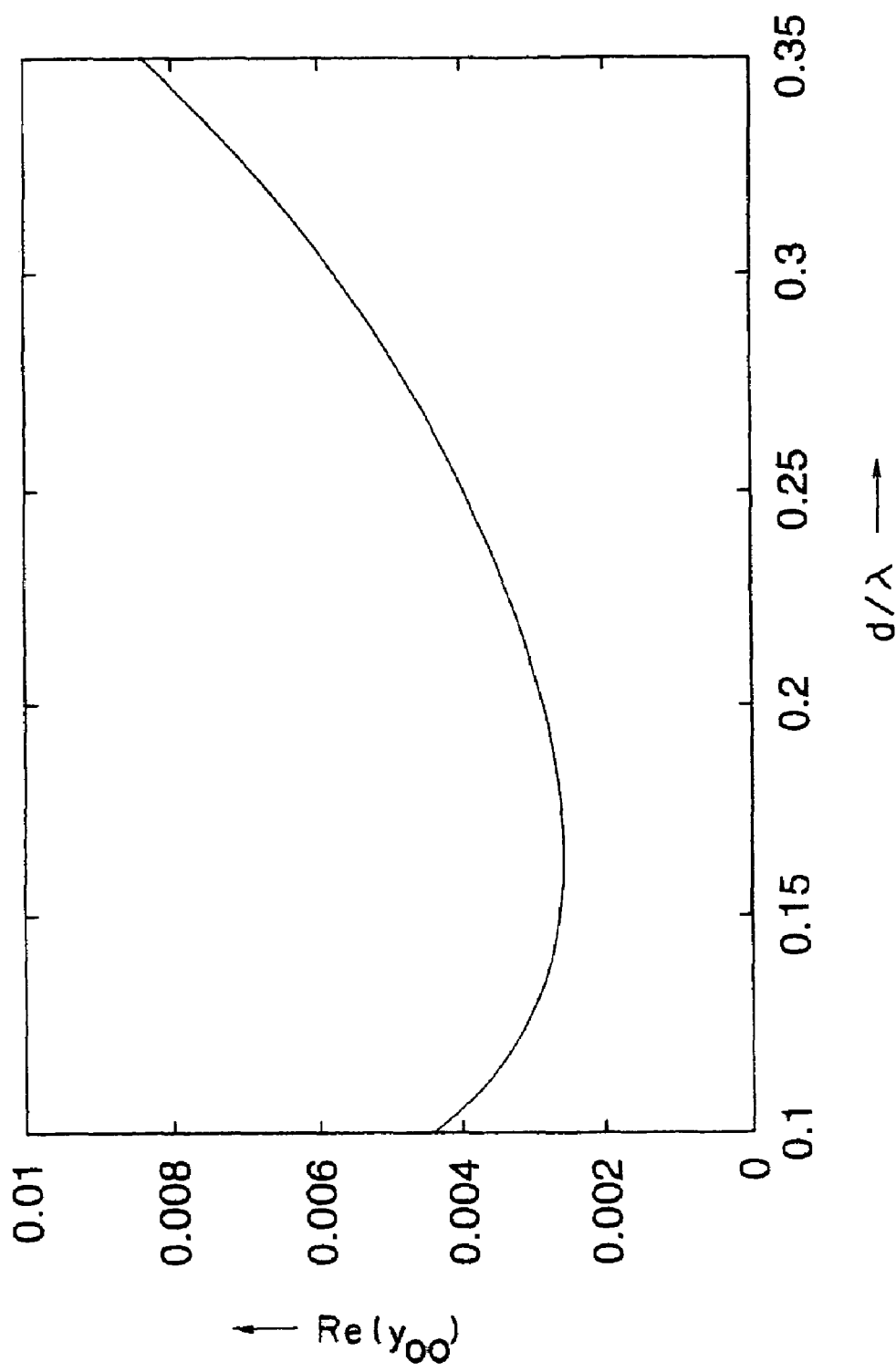
FIG. 10 is a graph showing simulation results according to the array antenna apparatus shown in FIG. 9, and showing a real part $Re(y_{00})$ of a self-admittance of a radiating element relative to an antenna element interval $d/\lambda$ as normalized by a wavelength $\lambda$.
Figure 11:
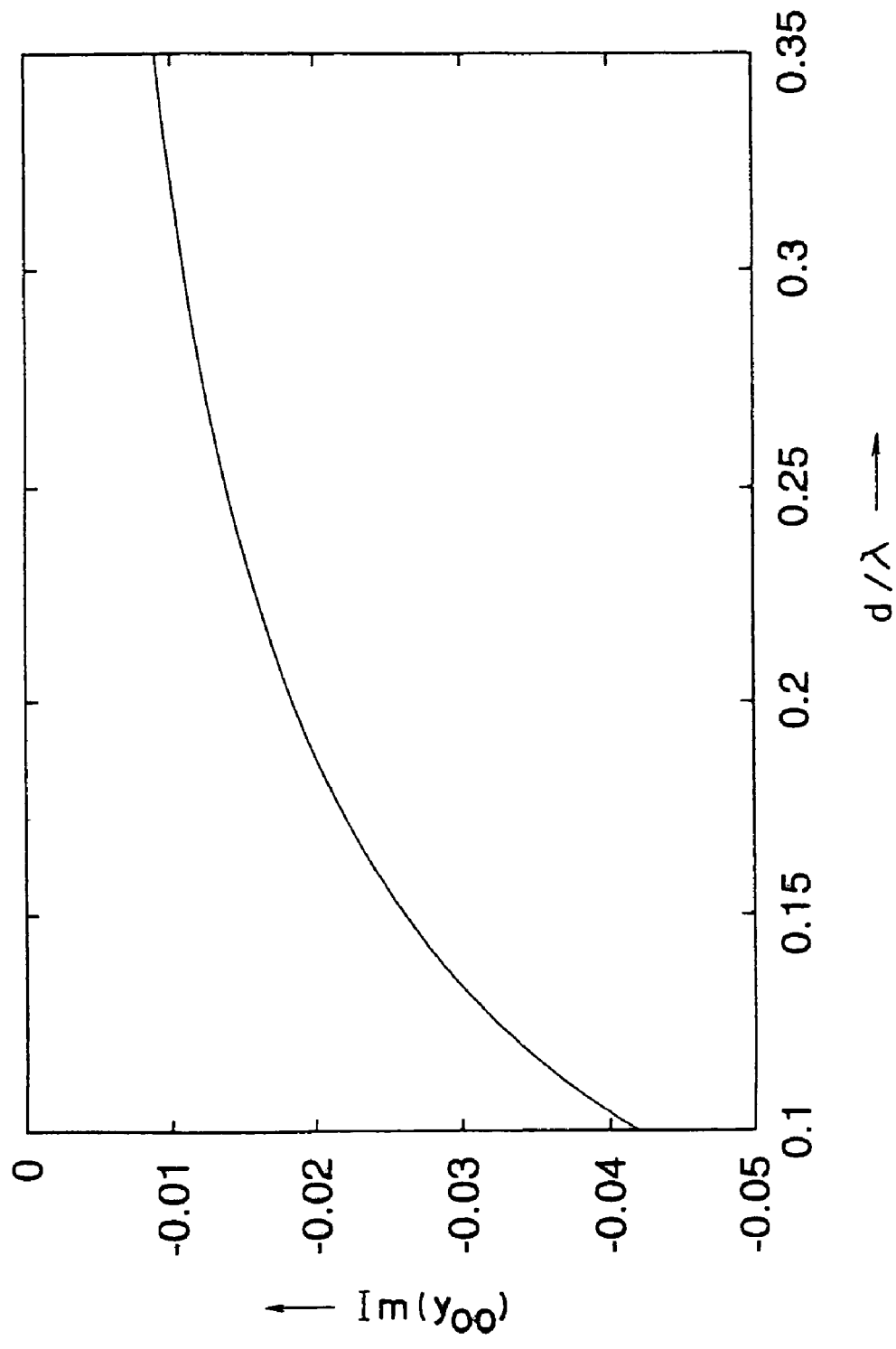
FIG. 11 is a graph showing simulation results according to the array antenna apparatus shown in FIG. 9, and showing an imaginary part $Im(y_{00})$ of the self-admittance of the radiating element relative to the antenna element interval $d/\lambda$ as normalized by the wavelength $\lambda$.
Figure 12:
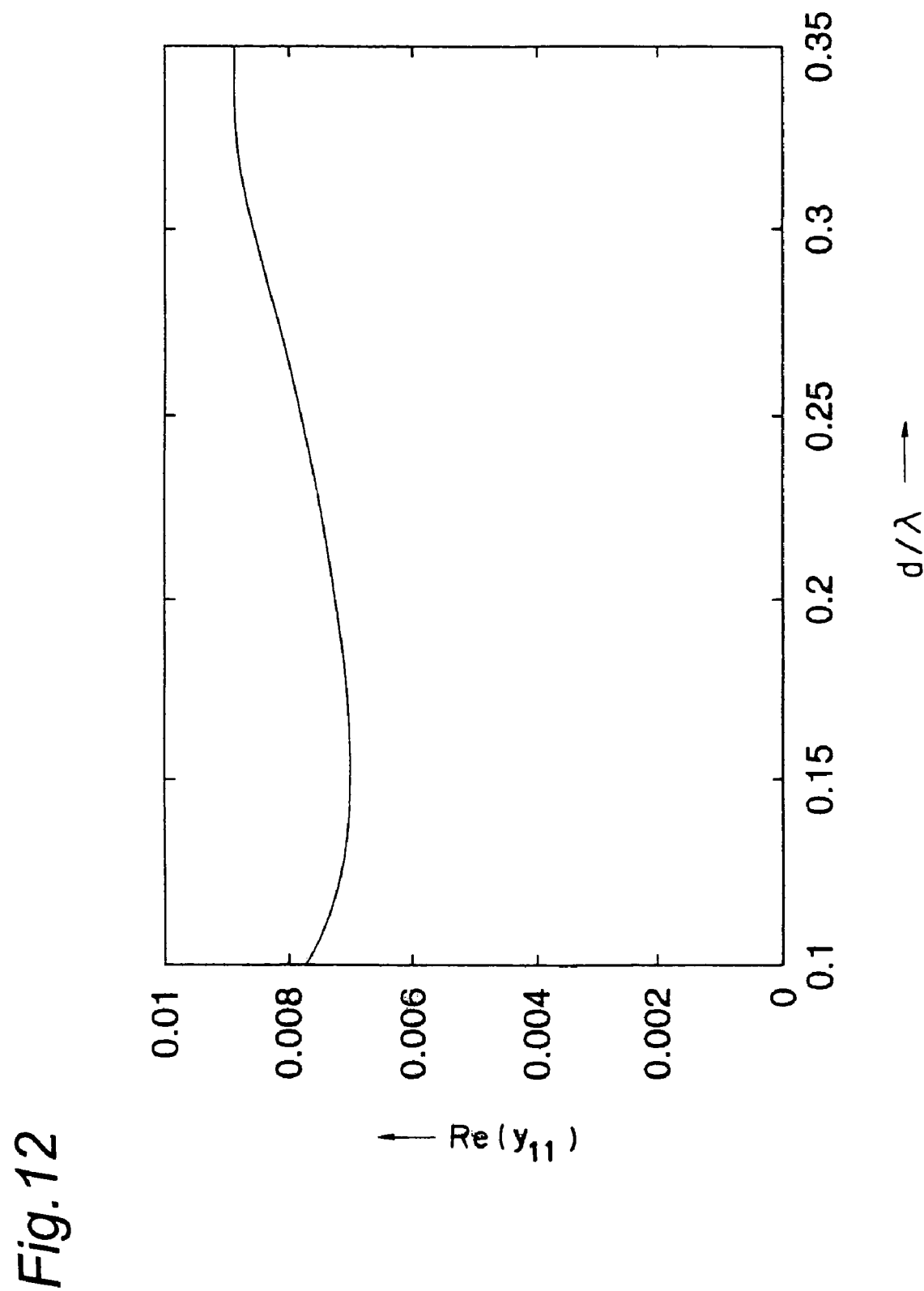
FIG. 12 is a graph showing simulation results according to the array antenna apparatus shown in FIG. 9, and showing a real part $Re(y_{11})$ of a self-admittance of a parasitic element relative to the antenna element interval $d/\lambda$ as normalized by the wavelength $\lambda$.
Figure 13:
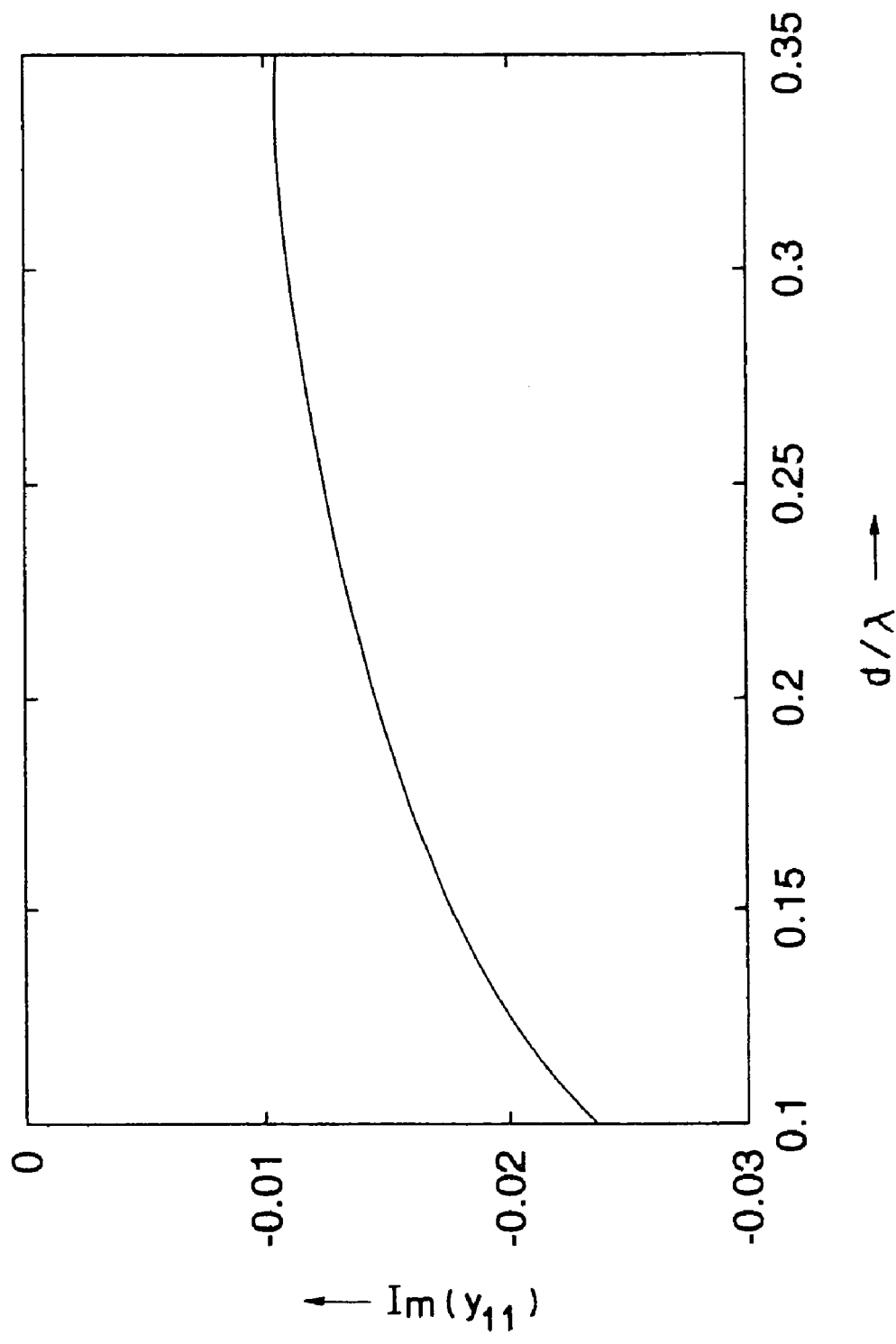
FIG. 13 is a graph showing simulation results according to the array antenna apparatus shown in FIG. 9, and showing an imaginary part $Im(y_{11})$ of the self-admittance of the parasitic element relative to the antenna element interval $d/\lambda$ as normalized by the wavelength $\lambda$.
Figure 14:
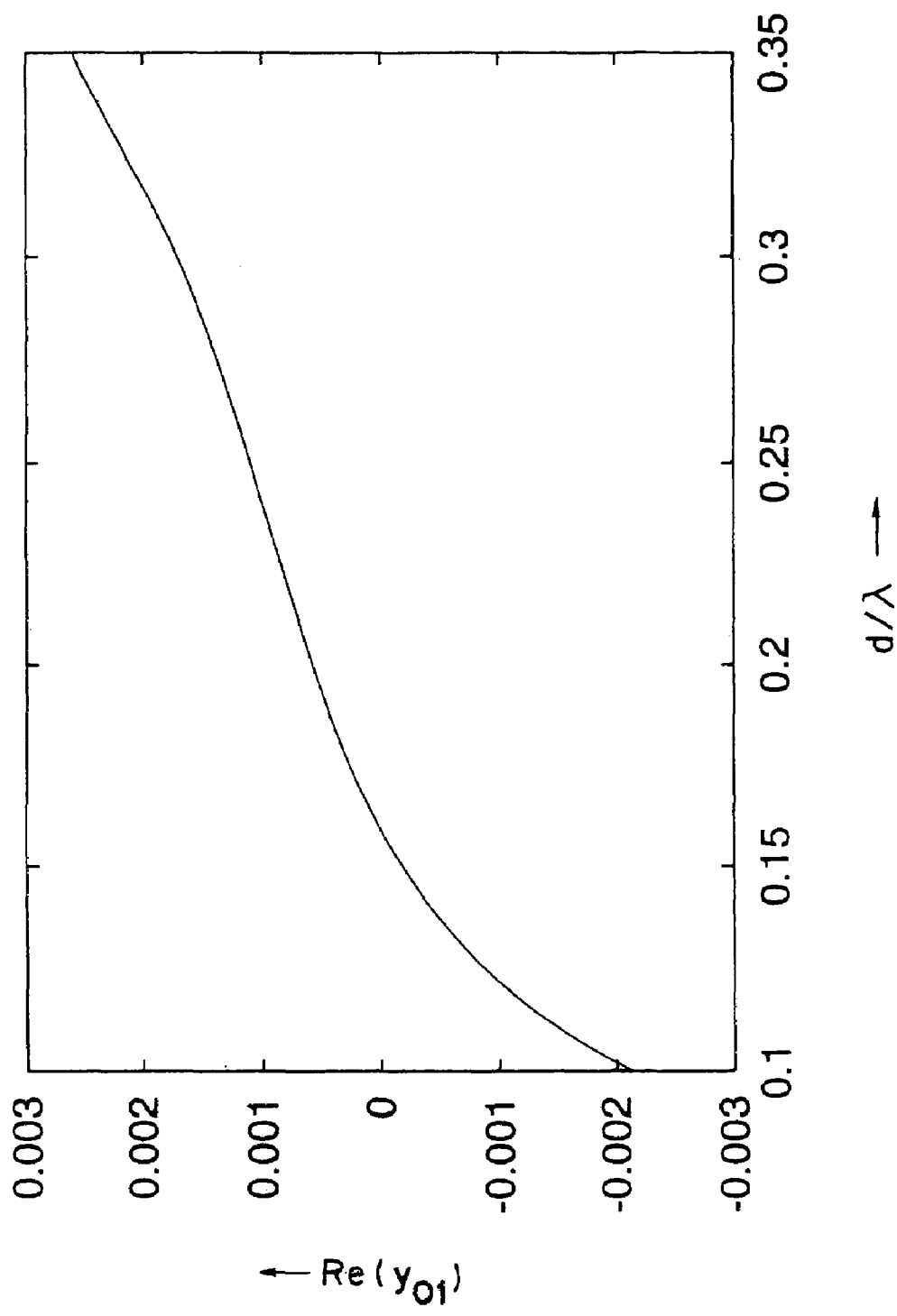
FIG. 14 is a graph showing a simulation results according to the array antenna apparatus shown in FIG. 9, and showing a real part $Re(y_{01})$ of a coupling admittance between the radiating element and the parasitic element relative to the antenna element interval $d/\lambda$ as normalized by the wavelength $\lambda$.
Figure 15:
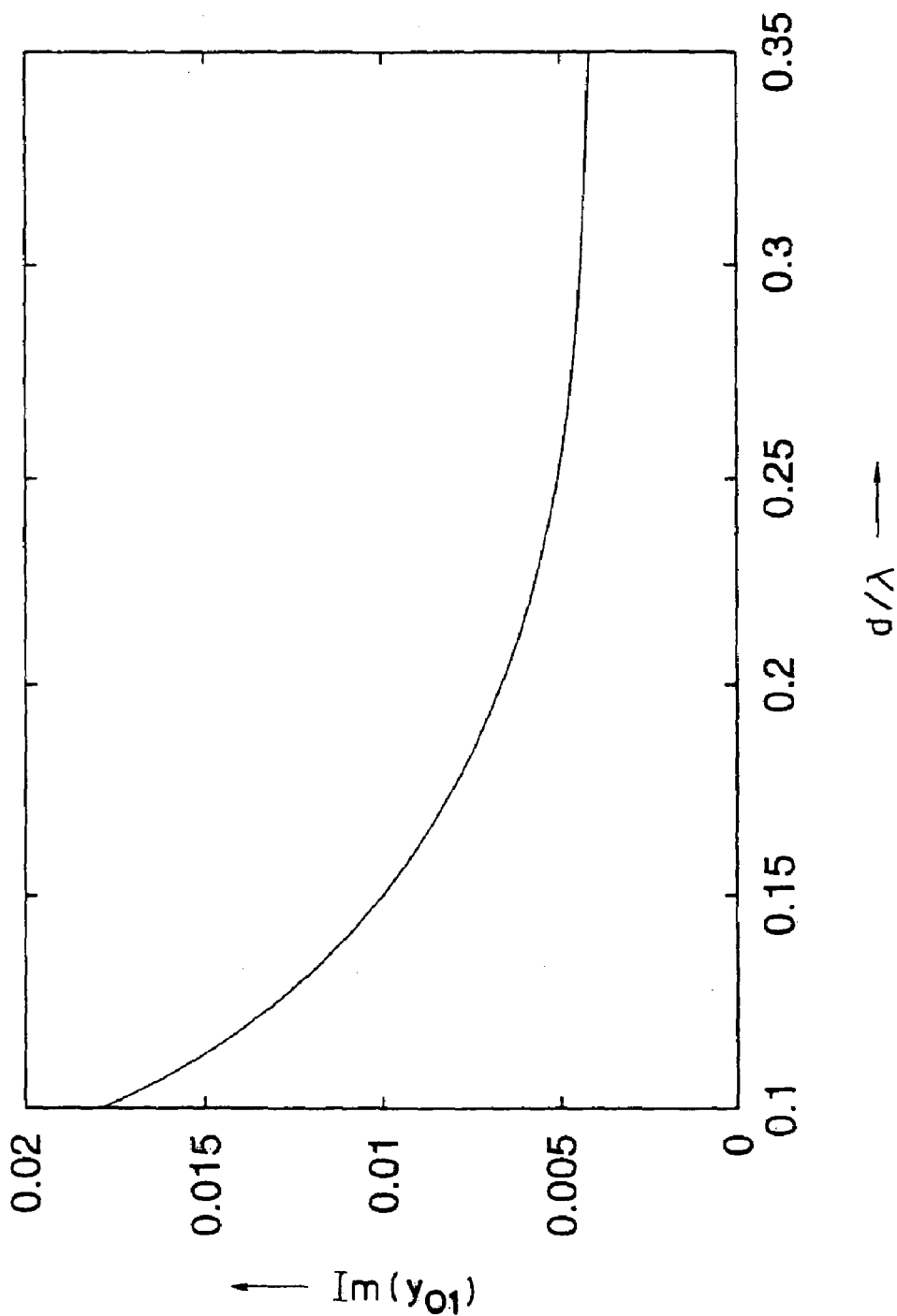
FIG. 15 is a graph showing simulation results according to the array antenna apparatus shown in FIG. 9, and showing an imaginary part $Im(y_{01})$ of the coupling admittance between the radiating element and the parasitic element relative to the antenna element interval $d/\lambda$ as normalized by the wavelength $\lambda$.
Figure 16:
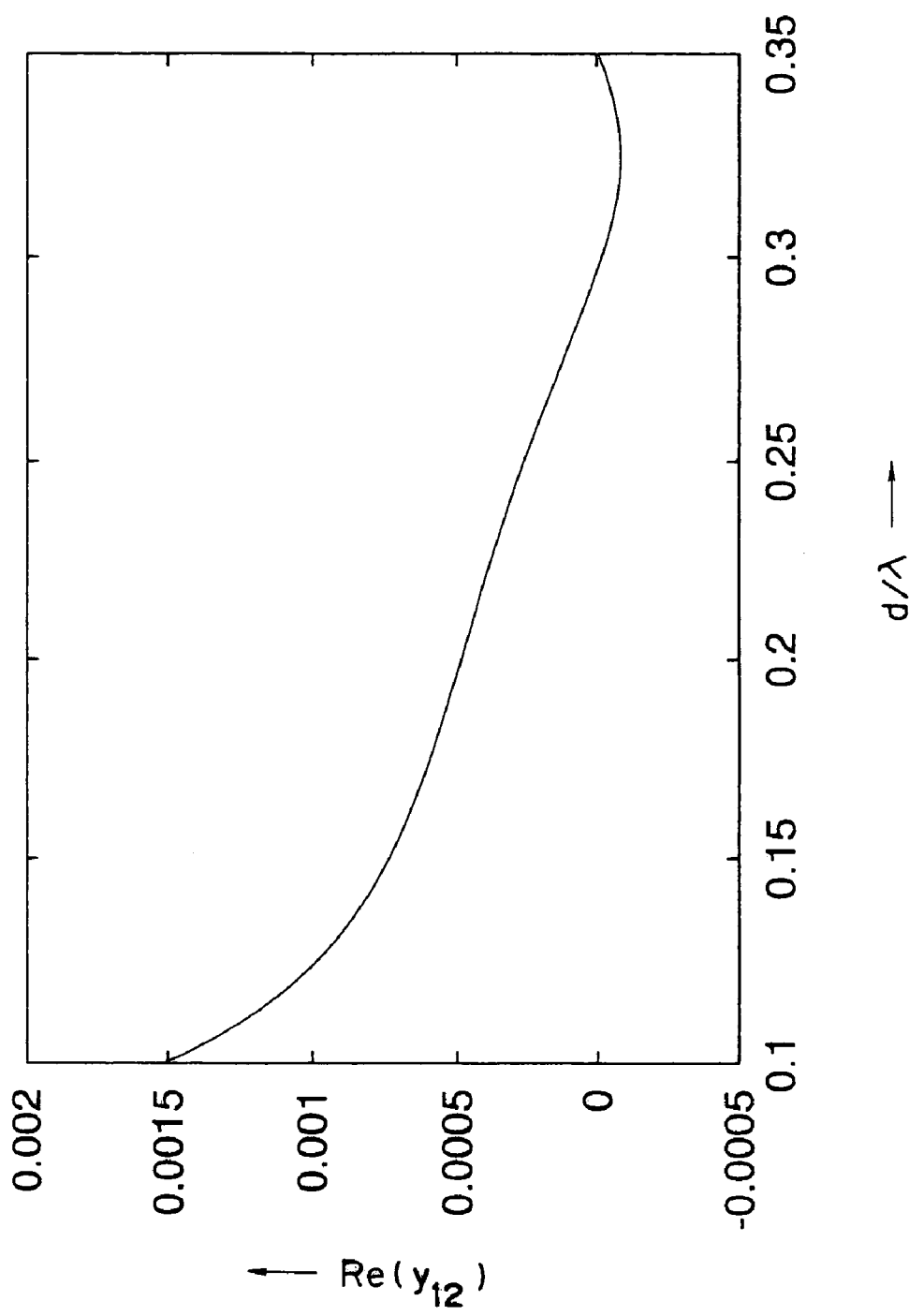
FIG. 16 is a graph showing simulation results according to the array antenna apparatus shown in FIG. 9, and showing a real part $Re(y_{12})$ of a coupling admittance between two parasitic elements relative to the antenna element interval $d/\lambda$ as normalized by the wavelength $\lambda$.
Figure 17:
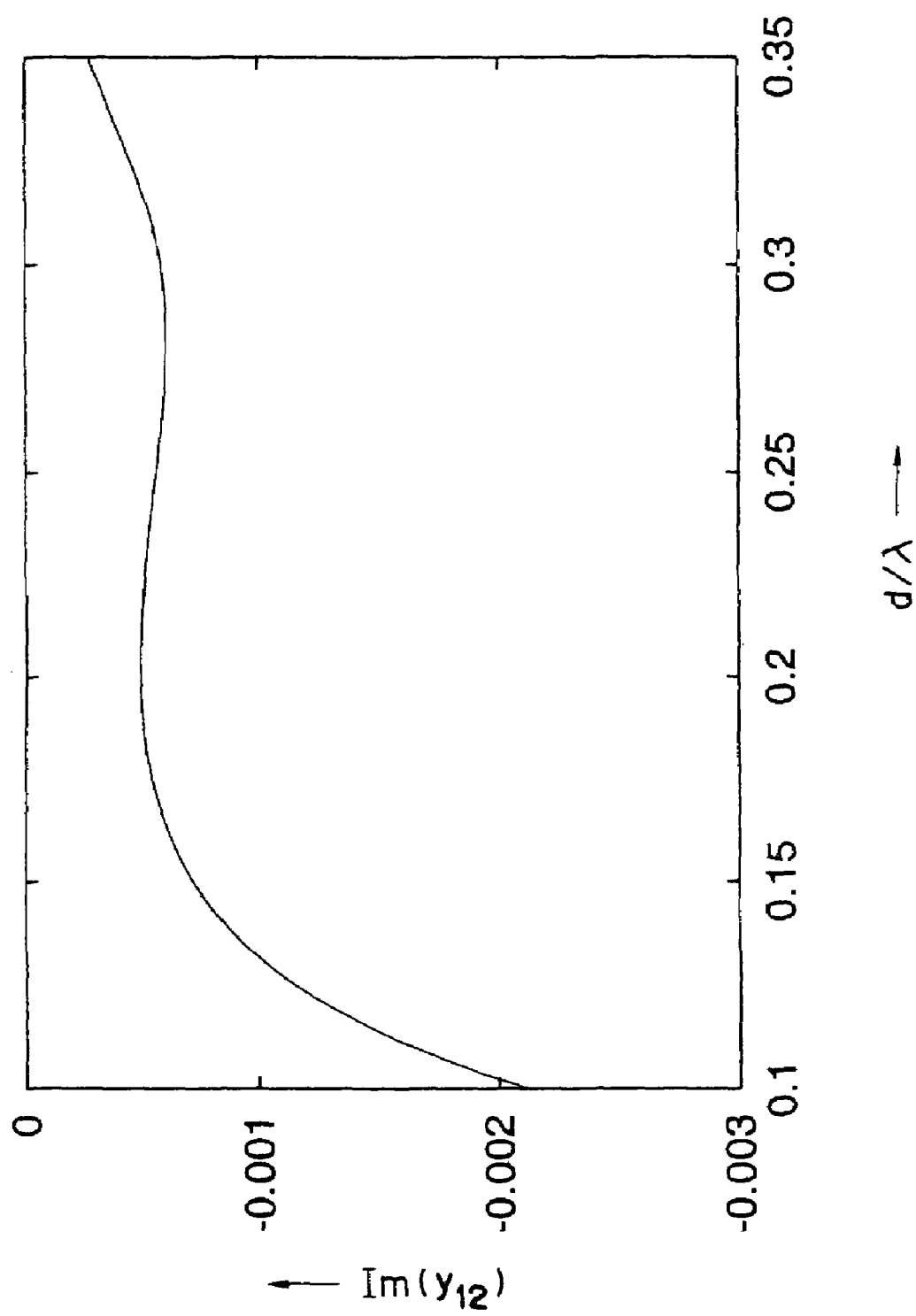
FIG. 17 is a graph showing simulation results according to the array antenna apparatus shown in FIG. 9, and showing an imaginary part $Im(y_{12})$ of the coupling admittance between the two parasitic elements relative to the antenna element interval $d/\lambda$ as normalized by the wavelength $\lambda$.

FIG. 9 is a plan view of an array antenna apparatus employed as an analysis model of a three-element electronically steerable passive array radiator antenna apparatus according to a third preferred embodiment.

Referring to FIG. 9, on a front surface of a dielectric substrate 20 having a rear surface on which a rectangular grounding electrical conductor 11a at a vertical height of $\lambda_g/2$ (where $\lambda_g$ is a guide wavelength of a desired wave to be received) is formed, a microstrip transmission line is formed by forming three microstrip electrical conductors at an interval "d" in parallel with each other. A tip end of each microstrip electrical conductor extends onto the surface, on which the grounding electrical conductor 11a is not formed, by $\lambda/4$ (where $\lambda$ is a free space wavelength of the desired wave to be received). A parasitic element A2, a radiating element A0, and then, a parasitic element A1 are formed. It is to be noted that the grounding electrical conductor 11a which serves as a grounding part of the microstrip transmission line functions as a grounding substrate of a monopole antenna. The grounding electrical conductor 11a acting as a perfect conductor is provided on a feeding part of the microstrip transmission line according to a specification of a simulator used for an analysis.

As a material constant of the dielectric substrate 20, that of a high-frequency printed circuit board consisting of BT resin, thermosetting PPO or the like is assumed, and a dielectric constant $\in_r$ is set to 3.4 and a dielectric loss tan δ is set to 0.003. Further, a thickness of the dielectric substrate 20 is set to 0.6 mm. As a material for conductor parts of the antenna elements A0, A1, and A2 and for the grounding electrical conductor 11a, Au is assumed to be used, and a conductivity σ of Au is set to σ=3.3×10$^8$ [S/m]. A width of the microstrip transmission line is set to 1.42 [mm] when a characteristic impedance of each microstrip electrical conductor is 50 [Ω]. The other parameters are shown in FIG. 9. $\lambda_g$ of FIG. 9 denotes an effective wavelength obtained from a dielectric constant of the substrate.

Results of electromagnetic field analysis (an admittance matrix representation) obtained when the analysis model shown in FIG. 9 is employed will be next described.

An array directivity when a reactance of an electronically steerable passive array radiator antenna apparatus is changed can be derived by an equivalent weight vector method to be described later. The equivalent weight vector is derived from an admittance matrix of the antenna with handling the antenna as a circuit. By deriving an expression equation which represents a change in admittance relative to the interval between the elements from the admittance matrix derived by an electromagnetic simulator, a basic structure equation of the three-element electronically steerable passive array radiator antenna apparatus can be obtained Therefore, using the element interval as a parameter, an expression equation of the admittance matrix of the three-element electronically steerable passive array radiator antenna apparatus is derived. The element interval is represented by a value as normalized by the wavelength. A calculation is conducted with the element interval "d" as set in a range between 0.1 λ and 0.35 λ. Regarding the three-element electronically steerable passive array radiator antenna apparatus as a three-terminal circuit network, an admittance matrix of the three-terminal circuit network is calculated. A Y matrix of the three-terminal circuit network is represented by the following equation:

$$Y = \begin{bmatrix} y00 & y01 & y02 \\ y10 & y11 & y12 \\ y20 & y21 & y22 \end{bmatrix}. \quad (1)$$

Because of a reciprocal theorem and symmetry of an antenna structure, the following equality relationships are satisfied for the parameter Y in the Equation (1):

$$y_{11} = y_{22} \quad (2),$$

$$y_{01} = y_{02} = y_{10} = y_{20} \quad (3), \text{ and}$$

$$y_{12} = y_{21} \quad (4).$$

These parameters will be referred to as the following names from their respective physical meanings:
 (1) $y_{00}$: Self-admittance of the radiating element.
 (2) $y_{11}$: Self-admittance of the parasitic element.
 (3) $y_{01}$: Coupling admittance between the radiating element and the parasitic element.
 (4) $y_{12}$: Coupling admittance between the two parasitic elements.

FIGS. 10 to 17 shows results of subjecting the respective admittances $y_{00}$ to $y_{12}$ to electromagnetic simulations in the above-mentioned analysis model conditions, and to polynomial fitting (approximation). Their respective expression equations are as follows. The expression equations are effective with the element interval "d" as set in a range between 0.1 λ and 0.35 λ.

$$\text{Re}\{y_{00}\} = 0.0045 - 0.0425\left(\frac{d}{\lambda}\right) + 0.1533\left(\frac{d}{\lambda}\right)^2 \quad (5)$$

$$\text{Im}\{y_{00}\} = -0.0519 + 0.253\left(\frac{d}{\lambda}\right) - 0.3802\left(\frac{d}{\lambda}\right)^2 \quad (6)$$

$$\text{Re}\{y_{11}\} = -0.0131 + 0.3984\left(\frac{d}{\lambda}\right) - 2.885\left(\frac{d}{\lambda}\right)^2 + \quad (7)$$
$$8.9546\left(\frac{d}{\lambda}\right)^3 - 9.8593\left(\frac{d}{\lambda}\right)^4$$

$$\text{Im}\{y_{11}\} = -0.0269 + 0.091\left(\frac{d}{\lambda}\right) - 0.1255\left(\frac{d}{\lambda}\right)^2 \quad (8)$$

$$\text{Re}\{y_{01}\} = -0.0029 + 0.0469\left(\frac{d}{\lambda}\right) - 0.2507\left(\frac{d}{\lambda}\right)^2 + \quad (9)$$
$$0.6058\left(\frac{d}{\lambda}\right)^3 - 0.4074\left(\frac{d}{\lambda}\right)^4$$

$$\text{Im}\{y_{01}\} = 0.0298 - 0.2618\left(\frac{d}{\lambda}\right) + 0.9086\left(\frac{d}{\lambda}\right)^2 - 1.0566\left(\frac{d}{\lambda}\right)^3 \quad (10)$$

$$\text{Re}\{y_{12}\} = 0.0047 - 0.1017\left(\frac{d}{\lambda}\right) + 0.8628\left(\frac{d}{\lambda}\right)^2 - \quad (11)$$
$$2.9996\left(\frac{d}{\lambda}\right)^3 + 3.5825\left(\frac{d}{\lambda}\right)^4$$

$$\text{Im}\{y_{12}\} = -0.0024 + 0.0341\left(\frac{d}{\lambda}\right) - 0.1504\left(\frac{d}{\lambda}\right)^2 + \quad (12)$$
$$0.0965\left(\frac{d}{\lambda}\right)^3 + 0.3008\left(\frac{d}{\lambda}\right)^4$$

Next, an input impedance $2Z_{in}$ (which is an output impedance during receiving) of the three-element electronically steerable passive array radiator antenna apparatus is derived from the above-obtained admittance matrix Y. Formulation is performed using an equivalent dipole model (in the case of an element length of 1/2 λ) according to a fourth preferred embodiment shown in FIG. 18. Due to this, all the coefficients include multiplication of two.

Figure 18:
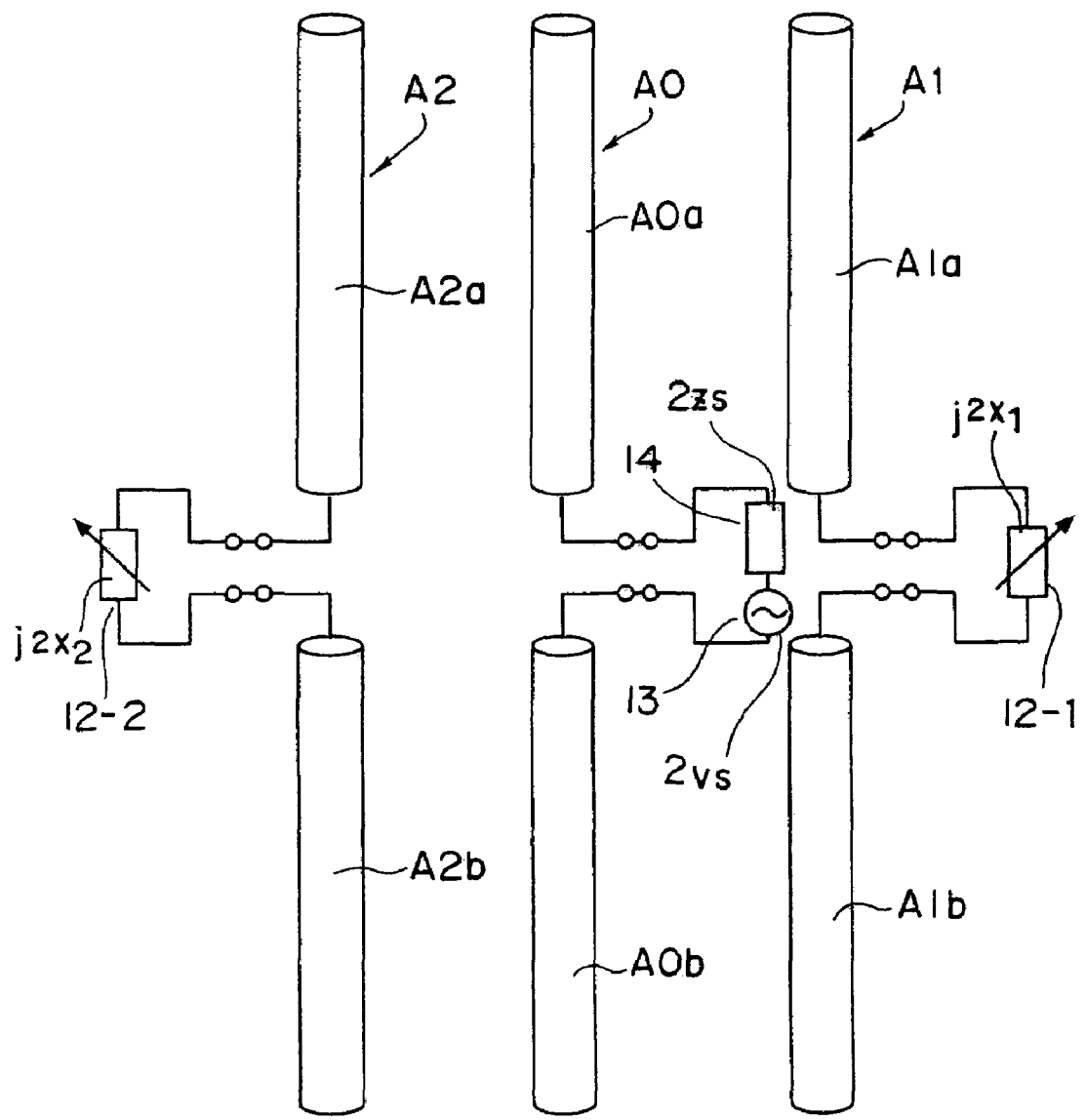
FIG. 18 is a block diagram showing a configuration of an array antenna apparatus according to a fourth preferred embodiment of the present invention.

Referring to FIG. 18, a radiating element A0 is constituted to include two antenna elements A0a and A0b, and an oscillation source 13 at a voltage of 2 $v_s$ and an output impedance of $z_s$ of a radio transmitter 13 is connected to feeding ports of the two antenna elements A0a and A0b, respectively. A parasitic element A1 is constituted to include two antenna elements A1a and A1b, and a variable reactance element 12-1 having a reactance $j2x_1$ is connected to antenna ports of the two antenna elements A1a and A1b, respectively. A parasitic element A2 is constituted to include two antenna elements A2a and A2b, and a variable reactance element 12-2 having a reactance $j2x_2$ is connected to antenna ports of the two antenna elements A2a and A2b, respectively.

The input impedance $Z_{in} = 2z_{in}$ of the three-element electronically steerable passive array radiator antenna apparatus constituted as mentioned above is represented by the following equation:

$$2z_{in} = z_{00} + 2z_{01}^2 \frac{z_{11} - z_{12} + j(x_1 + x_2)}{z_{12}^2 - (z_{11} + j2x_1)(z_{11} + j2x_2)}. \quad (13)$$

Figure 19:
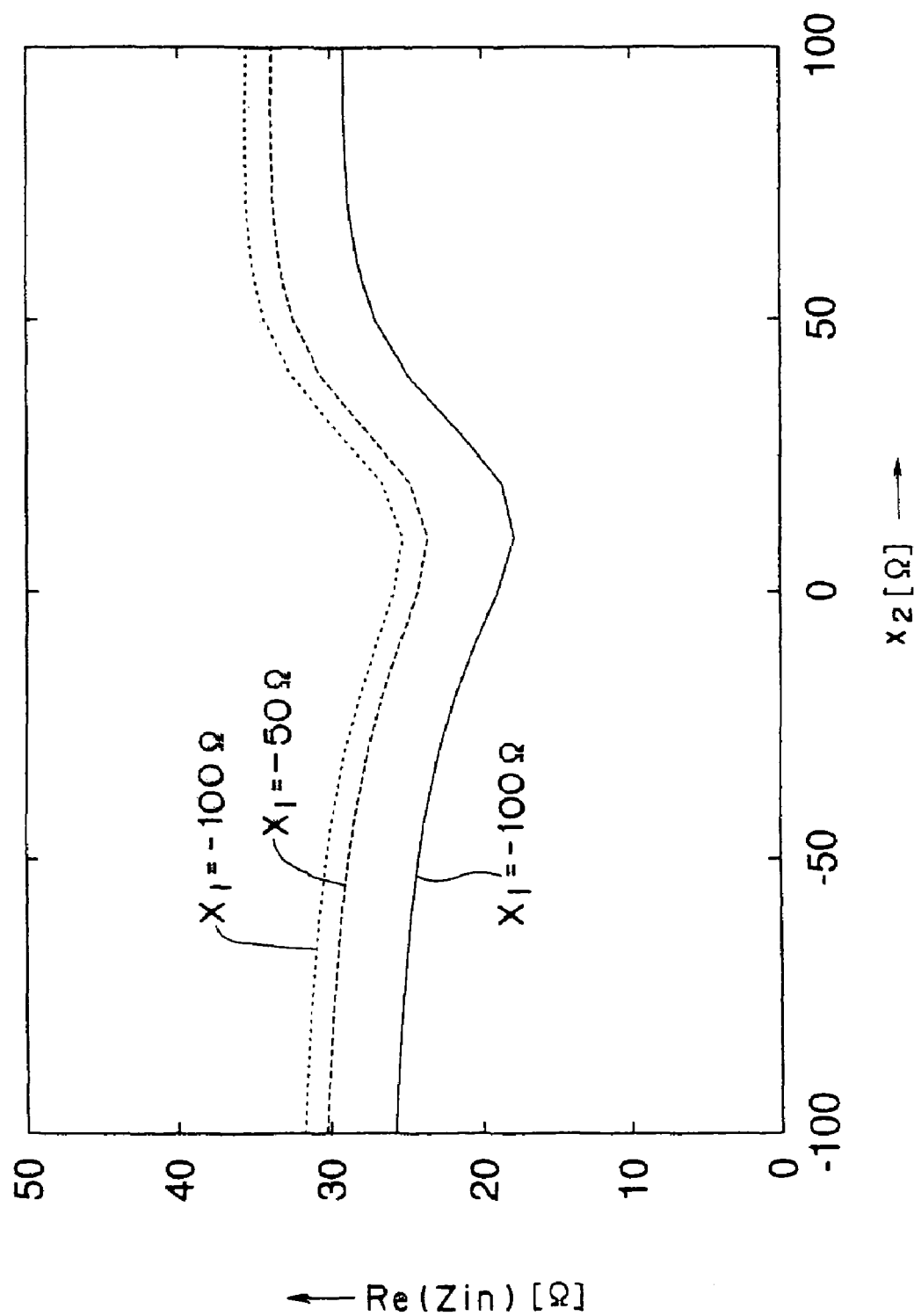
FIG. 19 is a graph showing simulation results according to the array antenna apparatus shown in FIG. 18, and showing a real part $Re(Z_{in})$ of an input impedance $Z_{in}$ of the array antenna apparatus relative to a half x1 of a reactance of a variable reactance element 12-2.
Figure 20:
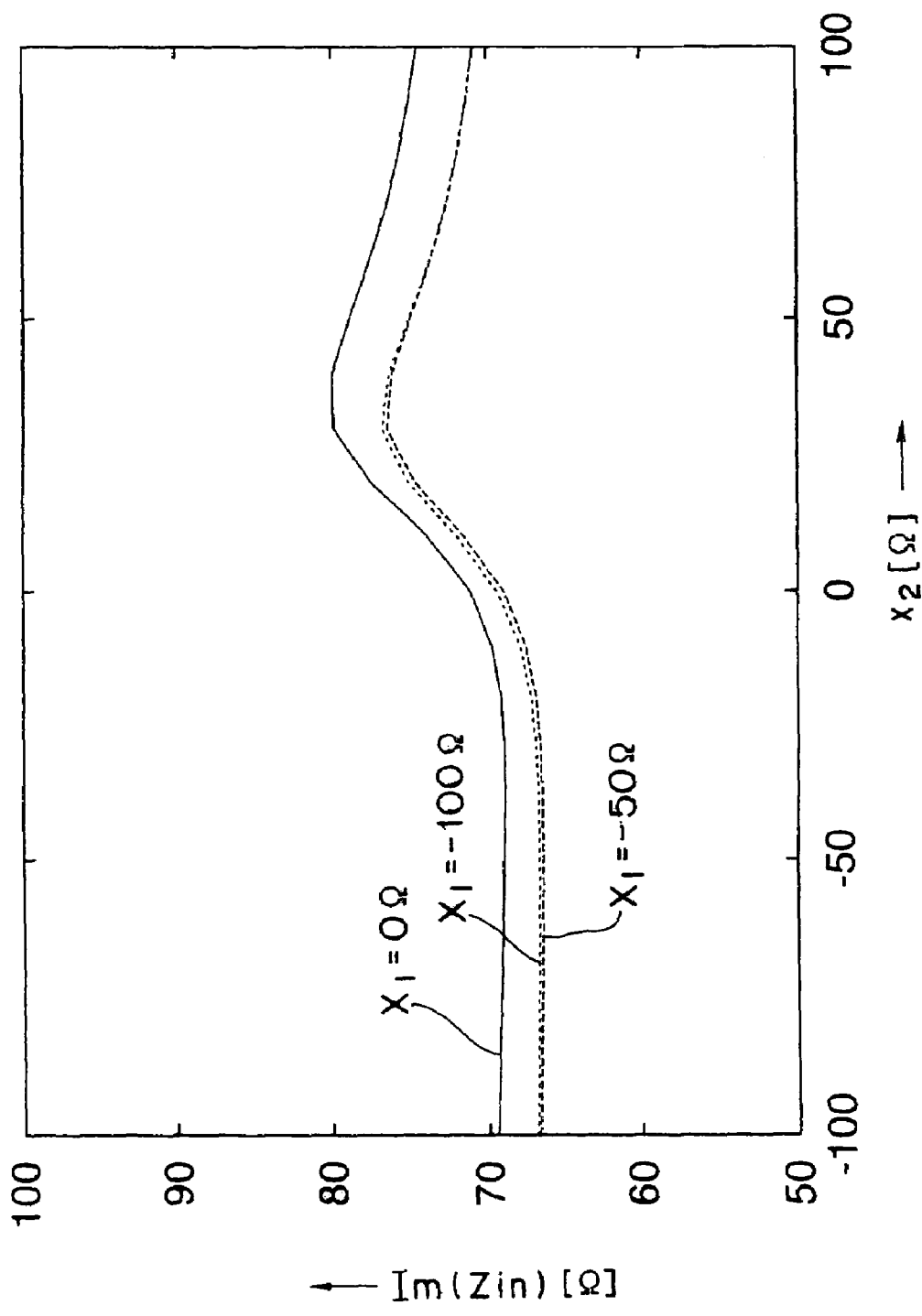
FIG. 20 is a graph showing simulation results according to the array antenna apparatus shown in FIG. 18, and showing an imaginary part $Im(Z_{in})$ of the input impedance $Z_{in}$ of the array antenna apparatus relative to the half x1 of the reactance of the variable reactance element 12-2.

Impedances $z_{00}$ to $z_{12}$ in the Equation (13) are calculated using the following equations, respectively based on circularity and symmetry of the antenna structure:

$$z_{00} = \frac{y_{11}^2 - y_{12}^2}{\det Y}, \quad (14)$$

$$z_{01} = \frac{y_{01}(y_{12} - y_{11})}{\det Y}, \quad (15)$$

$$z_{11} = \frac{y_{00}y_{11} - y_{01}^2}{\det Y}, \text{ and} \quad (16)$$

$$z_{12} = \frac{y_{01}^2 - y_{00}y_{12}}{\det Y}, \quad (17)$$

where det Y denotes a determinant of the admittance matrix Y. In order to check a degree of a change in the input impedance $Z_{in}$, the reactance $X1=2x_2$ of one of the two parasitic elements A1 and A2 (parasitic element A1 of FIG. 18) is fixed to 0, 50, and 100 [Ω], respectively, and a half $x_2$ of the reactance of the parasitic element A2 is changed in a range from −100 to 100 [Ω]. The calculated input impedance $Z_{in}=2z_{in}$ is divided to a real component and an imaginary component, which are shown in FIGS. 19 and 20, respectively.

According to the simulations done by the inventors of the present invention, the change in the input impedance of the two-element electronically steerable passive array radiator antenna apparatus is about 40 to 100 [Ω], depending on the element interval. As shown in FIGS. 19 and 20, the change in the input impedance of the three-element electronically steerable passive array radiator antenna apparatus is suppressed to be equal to or less than 10 [Ω]. The array antenna apparatus including three elements is basically small in a change width of the input impedance relative to a change in reactance.

In addition, in the three-element electronically steerable passive array radiator antenna apparatus, combinations of two values are alternately allotted to the reactances x1 and x2. Due to this, input impedances of the apparatus before and after a directivity pattern is changed coincide with each other. Thus, it is confirmed that an impedance matching design of the three-element electronically steerable passive array radiator antenna apparatus is easier than that of the two-element electronically steerable passive array radiator antenna apparatus.

Next, the equivalent weight vector method (array factor) will be described. Generally speaking, the directivity of an array antenna is represented by a product between a directivity of a single element and an array response vector (array factor). In order to obtain an array factor of the three-element electronically steerable passive array radiator antenna apparatus, the equivalent weight vector method is used herein (See, for example, the second and fourth non-patent documents).

The equivalent weight vector method is a method of representing the array factor by an inner product between a steering vector and a weight vector, and regarding the weight vector as an equivalent vector for a current vector when the present antenna is driven in a transmission mode. The array factor $D(\phi)$ is defined as follows. w (w0, w1, w2) denotes an equivalent weight vector of each of the antenna elements A0, A1 and A2, $z_s[\Omega]$ and $v_s[V]$ denote an output impedance and an internal voltage of a transmission feeding system, respectively, x1 and x2 $[\Omega]$ denote the reactances of the variable reactance elements 12-1 and 12-2 connected to the parasitic elements A1 and A2, respectively. Since the formulation is performed using the equivalent dipole model shown in FIG. 18, the two-fold coefficients are given:

$$D(\phi) = a(\phi) \cdot w \qquad (18),$$

where $a(\phi)$ and w are represented by the following equations, respectively:

$$a(\phi) = \begin{bmatrix} 1 \\ \exp\left(-j\frac{2\pi d}{\lambda}\cos(\phi)\right) \\ \exp\left(j\frac{2\pi d}{\lambda}\cos(\phi)\right) \end{bmatrix}, \text{ and} \qquad (19)$$

$$w = 2z_s(Y^{-1} + X)^{-1} u_0, \qquad (20)$$

where X and $u_0$ are represented as follows:

$$X = \text{diag}(2z_s, j2x_1, j2x_2) \qquad (21), \text{ and}$$

$$u_0 = [1\ 0\ 0]^T \qquad (22).$$

A loss caused by impedance mismatching between the feeding system and the antenna is considered in the array factor $D(\phi)$ which can be calculated by the equation (18). If the array factor $D(\phi)$ is plotted as a function of an azimuth $\phi$ with using the reactances $2x_1$ and $2x_2$ of the connected variable reactance elements 12-1 and 12-2 as parameters, an amplitude directivity and a phase directivity are obtained. As for the azimuth, an azimuth of a direction in which the parasitic element A1 is viewed from the radiating element A0 is set to zero degree.

Figure 21:
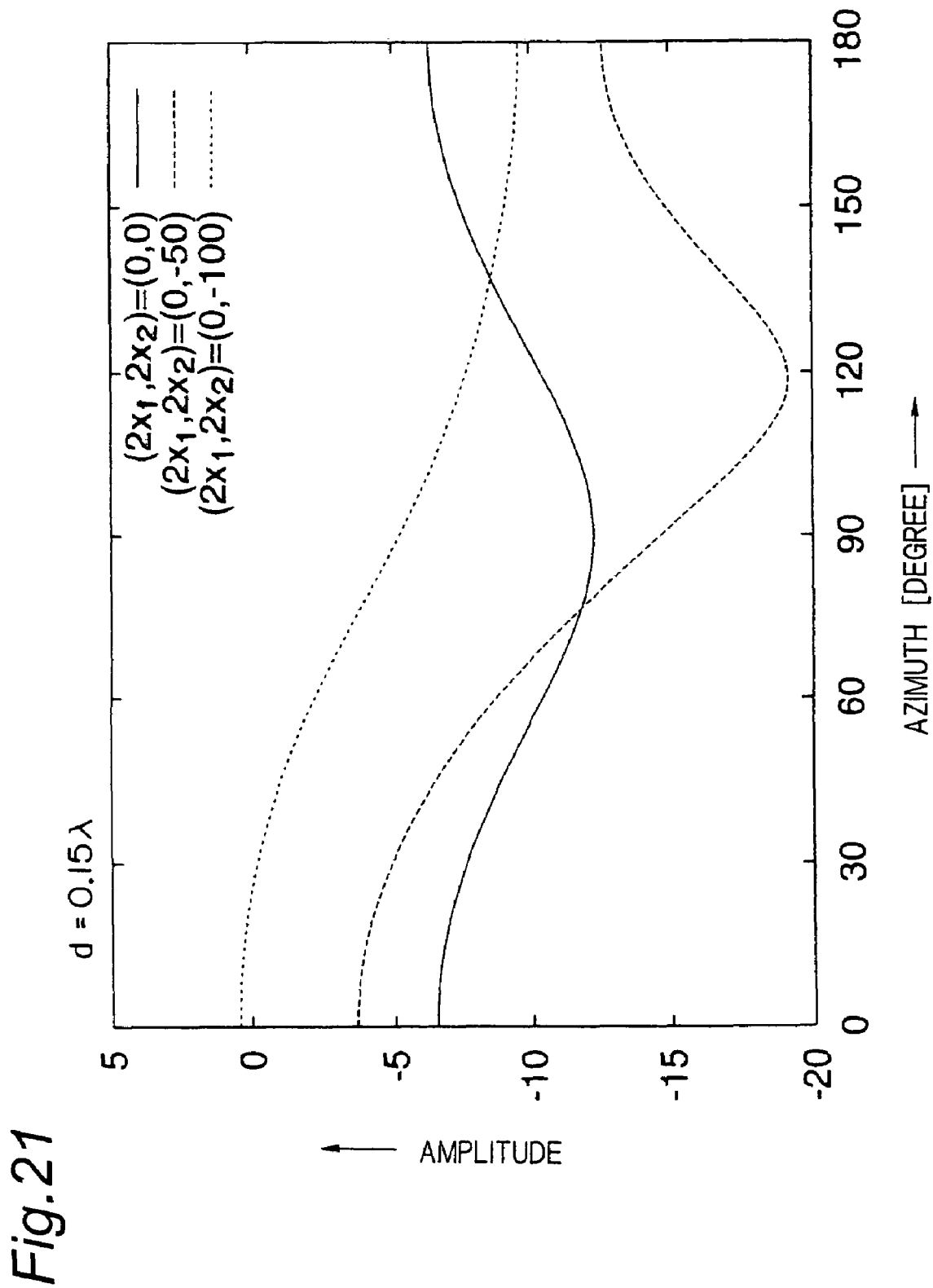
FIG. 21 is a graph showing simulation results according to the array antenna apparatus shown in FIG. 18, and showing an amplitude directivity characteristic.
Figure 22:
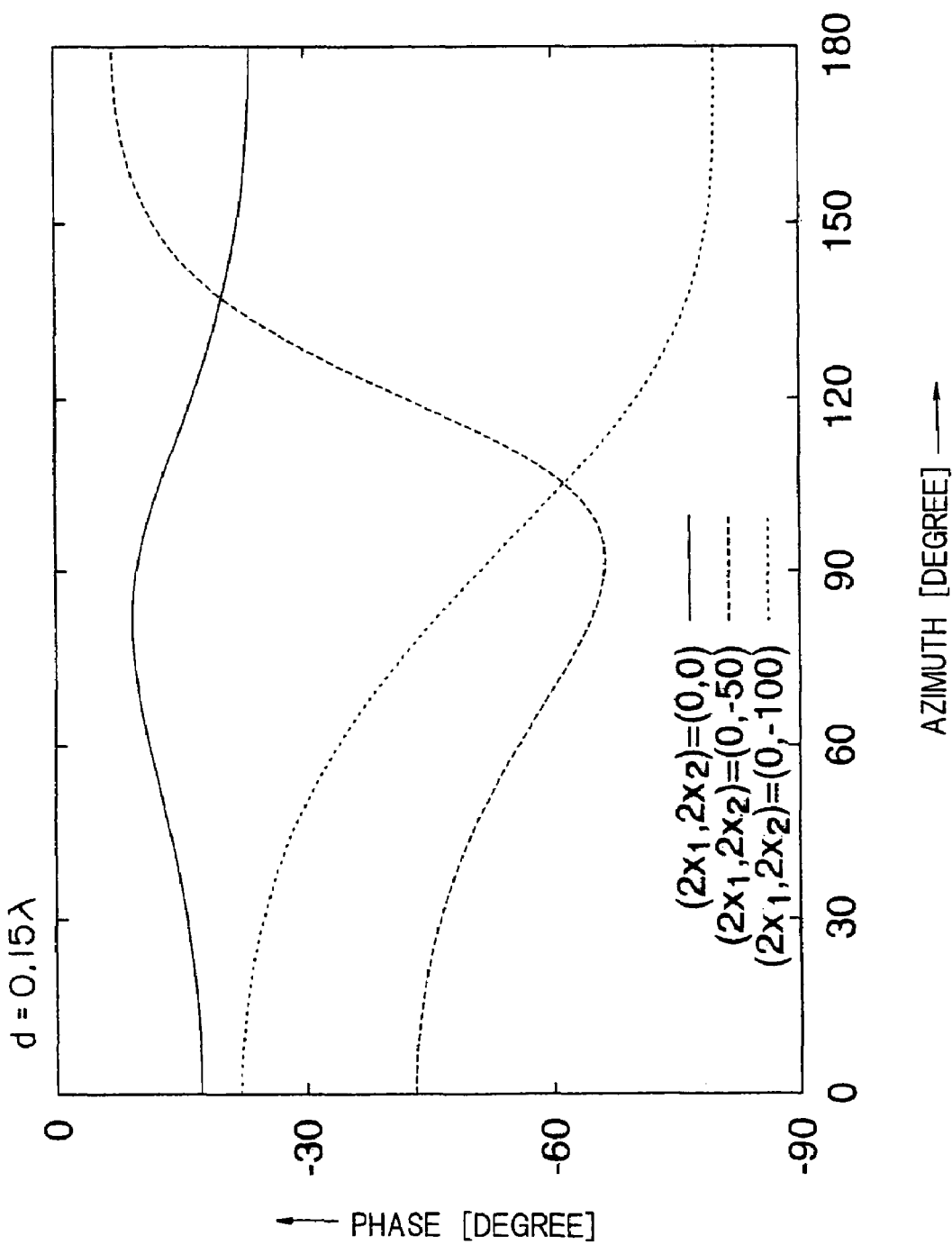
FIG. 22 is a graph showing simulation results according to the array antenna apparatus shown in FIG. 18, and showing a phase directivity characteristic.

FIG. 21 shows an amplitude directivity in the case of an element interval "d" of 0.15λ, and FIG. 22 shows a phase directivity at that time. Since the directivity is symmetric, the respective directivities are shown in a range from 0 to 180 [degree].

Further, confirmation results of a reactance diversity effect of the three-element electronically steerable passive array radiator antenna apparatus will be described.

As mentioned above, by controlling the reactance of even the three-element electronically steerable passive array radiator antenna apparatus, dependency of the amplitude and the phase of the apparatus on the azimuth can be changed. By using the fact adaptively, it is possible to avoid such a condition that decrease in the received level occurs due to fading, that is, a state of equal amplitude and opposite phase. In order to quantitatively confirm the fact, the following simulations are performed.

Figure 23:
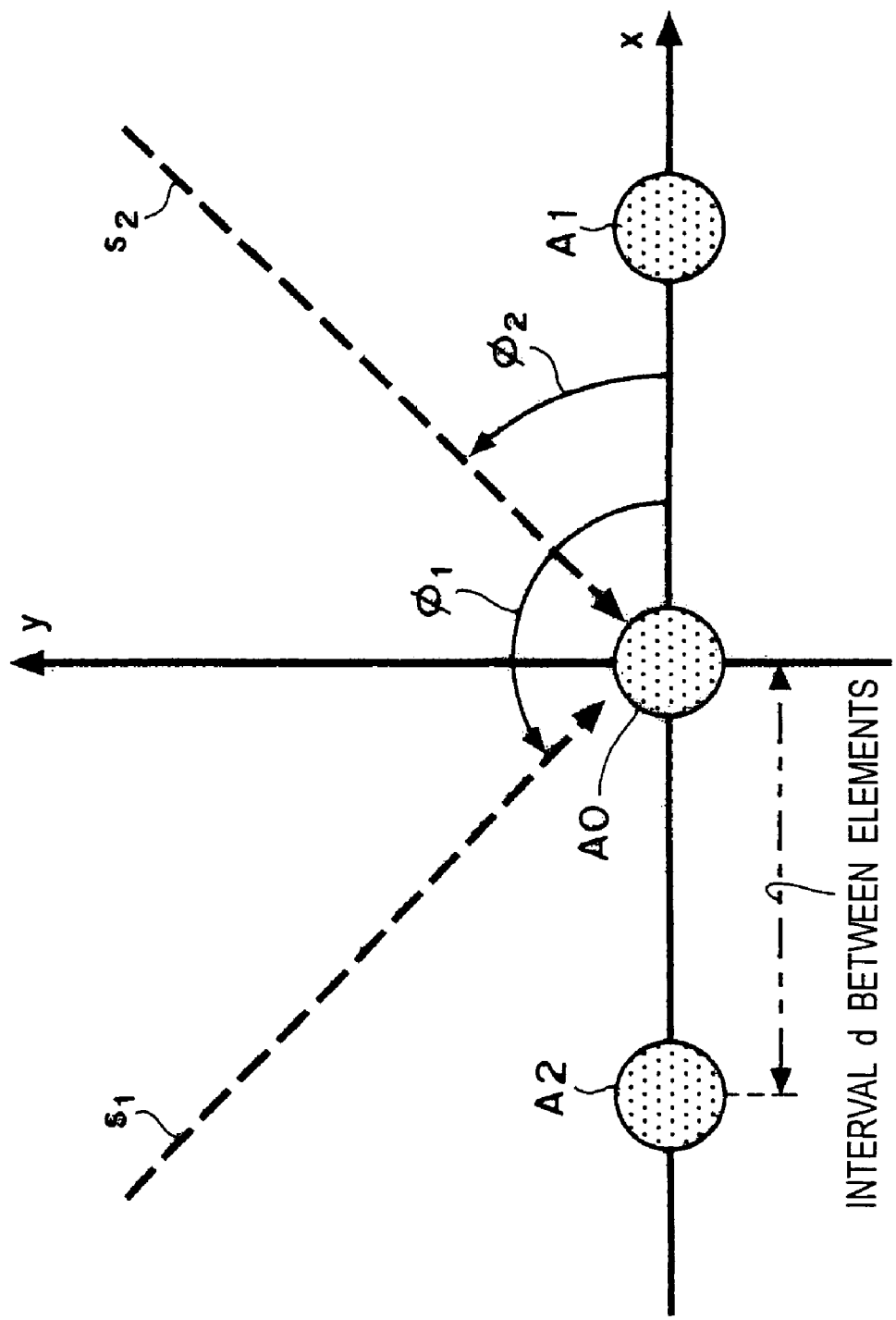
FIG. 23 is a plan view showing two wave arrival environmental models according to an experimental example.

The simulations are performed, in a manner similar to that of the two-element electronically steerable passive array radiator antenna apparatus, using two wave models in the case of the same amplitude. FIG. 23 shows these models. A signal is assumed as "y" which is received when the three-element electronically steerable passive array radiator antenna apparatus is provided in an environment in which two radio waves $s_1$ and $s_2$ interfering with each other arrive at the equal amplitude and at a random phase difference. The signal "y" is represented by the following equation using the array factor $D(\phi)$. Arriving azimuths $\phi_1$ and $\phi_2$ of the two respective waves are of no correlation to each other and random in a range of 360 [degree]:

$$\begin{aligned} y &= D(\phi_1)s_1 + D(\phi_2)s_2 \\ &= D(\phi_1)a_0\exp(-j\phi_1) + D(\phi_2)a_0\exp(-j\phi_2). \end{aligned} \qquad (23)$$

It is assumed herein that fading is avoided by an algorithm that reactances $x_1$ and $x_2$ of the three-element electronically steerable passive array radiator antenna apparatus are controlled to turn into two states, and that the reactance as obtained when a received power $(y \cdot y^*)$ is larger is selected. It is also assumed that the same combination of reactances is alternately used as $x_1$ and $x_2$.

Figure 24:
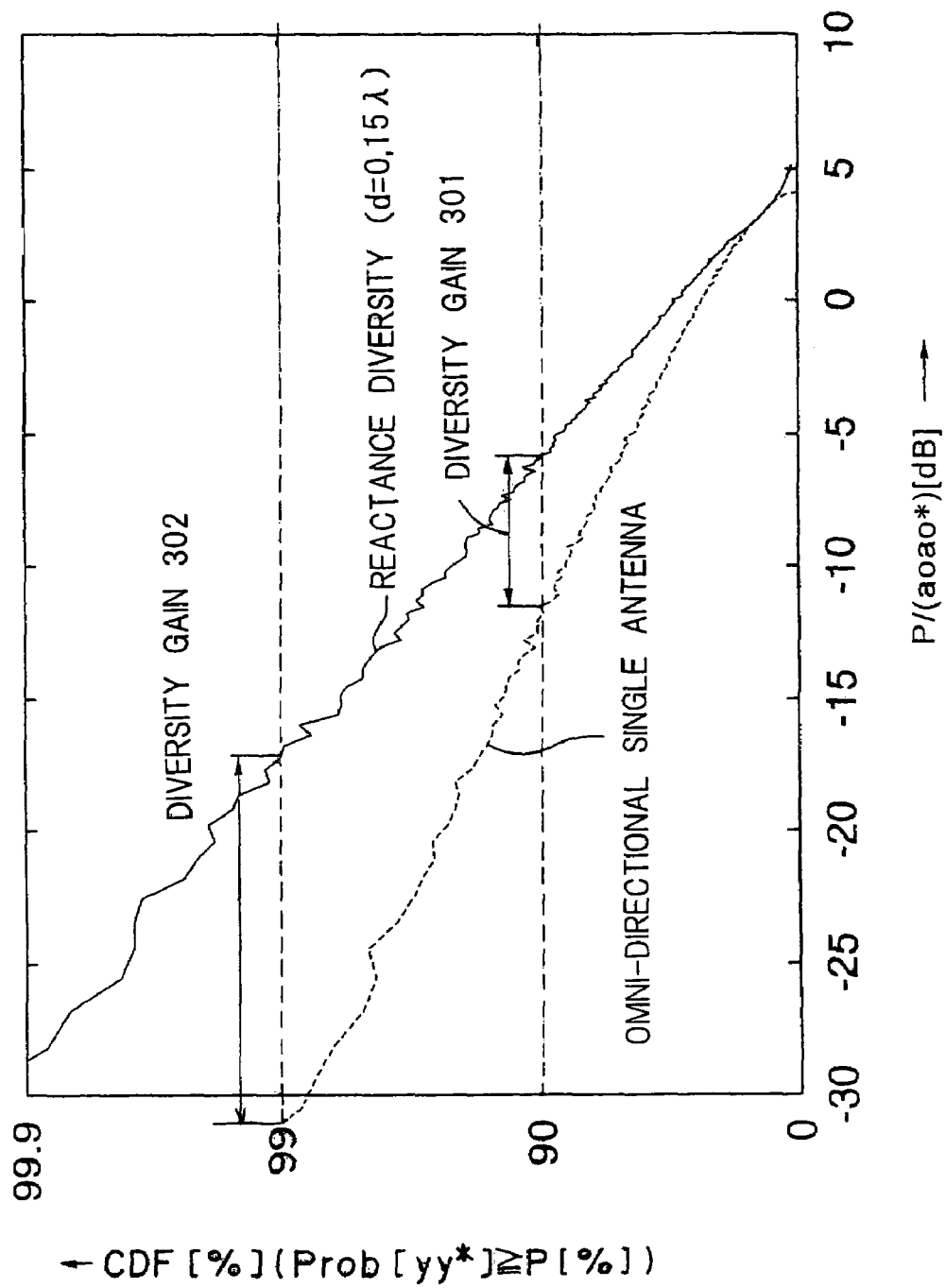
FIG. 24 is a graph showing simulation results according to the array antenna apparatus shown in FIG. 18, and showing a cumulative probability distribution of a fading deterioration.

FIG. 24 shows a cumulative probability distribution (CDF curve) of a fading deterioration when a feeding system impedance $z_s$ is 50 [Ω] (100 [Ω] when the antenna is converted into a dipole model) and an element interval "d" is 0.15 λ. The reactance is controlled to alternately be switched over to 0 [Ω] and 50 [Ω]. A vertical axis of a graph shown in FIG. 24 indicates a cumulative probability (CDF) of such an event as a diversity received signal power exceeding dB indicated value on a horizontal axis with reference to a signal power $a_0 a_0^*$ per an arriving radio wave. For comparison, a theoretical value of a fading CDF (See the following equation) of an omni-directional single antenna apparatus in a model in which two arriving radio waves with the same amplitudes are present is indicated by a dotted line in FIG. 24:

$$\frac{P}{a_0 a_0^*} = 2 + 2\cos\{prob(yy^* \geq P)\pi\}, \qquad (24)$$

where prob $(yy^* \geq P)$ denotes a probability as obtained when the received signal power $yy^*$ is equal to or larger than P. In particular, in a region including a deep fading, that is, in a region for satisfying the following expression (25), the equation (26) shows an asymptotic line:

$$\text{prob}(yy^* \geq P) \ll 1/\pi \qquad (25), \text{ and}$$

$$P = p^2 \pi^2 a_0 a_0^* \qquad (26).$$

As is apparent from FIG. 24, the three-element electronically steerable passive array radiator antenna apparatus can obtain a diversity gain 301 of 5 dB at a CDF of 90% and a diversity gain 302 of about 10 dB at a CDF of 99%, as compared with the single antenna. In addition, a probability, as obtained when a fading deterioration of 20 dB occurs, is greatly reduced to about 0.5%, and that as obtained when a fading deterioration of 30 dB occurs, is greatly reduced to about 0.07%, as compared with the single antenna.

Referring to FIG. 24, it is more preferable to select and set the first and second reactance sets so that, when the CDF, which is the cumulative probability of such an event as the signal power of the received radio signal exceeding a predetermined signal power, is a predetermined value such as 90% or 99%, the diversity gain is equal to or larger than a predetermined value, and so that the input impedance $Z_{in}$ is kept substantially unchanged. It is most preferable to select and set the first and second reactance sets so that, when the CDF, which is the cumulative probability of such an event as the signal power of the received radio signal exceeding a predetermined signal power, the diversity gain is substantially the maximum.

Figure 25:
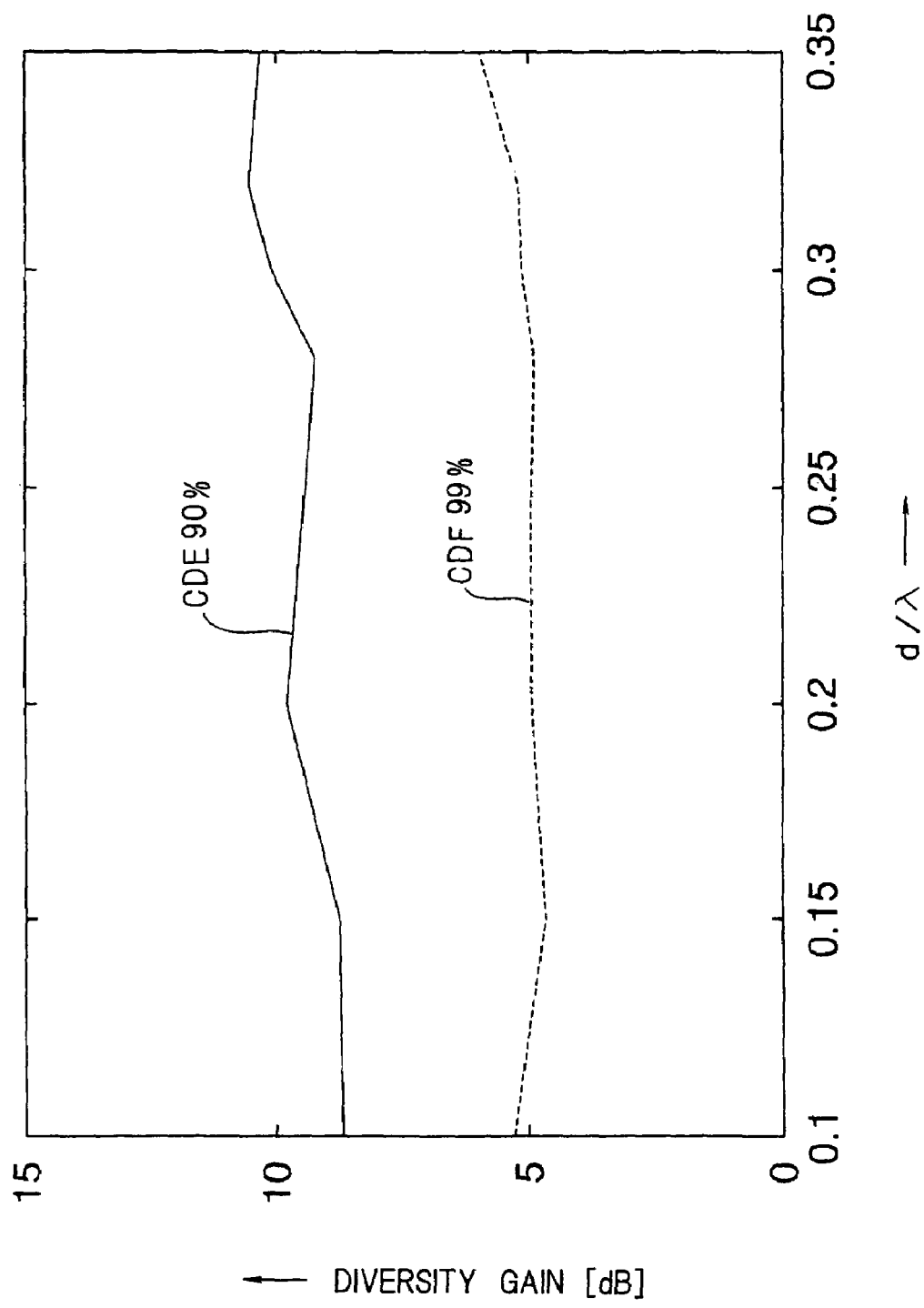
FIG. 25 a graph showing simulation results according to the array antenna apparatus shown in FIG. 18, and showing a diversity gain relative to an antenna element interval $d/\lambda$ as normalized by a wavelength $\lambda$.

FIG. 25 shows a relationship between the element interval and the diversity gain. The CDF 90% and the CDF 99% do not greatly depend on the element interval and the diversity gain with the element interval set in a range from 0.1 λ to 0.35 λ. This means that it is unnecessary to strictly set a margin in a packaging design of the three-element electronically steerable passive array radiator antenna apparatus. That is, the element interval is preferably set in a range from 0.1 λ to 0.35 λ.

As described above, it is confirmed that the three-element electronically steerable passive array radiator antenna apparatus according to the present preferred embodiment can suppress a change in antenna input impedance caused by switching over among the reactances. Using the algorithm for controlling the reactance to turn into two states, the diversity gain of the two wave models at the equal amplitude is calculated. As compared with the single antenna, the diversity gain of about 5 dB and about 10 dB are obtained at the cumulative probability distribution of 90% and 99%, respectively. Since there is no great difference in diversity gain obtained in an element interval range from 0.1 λ to 0.35 λ, it is unnecessary to set a strict margin in packaging, the electronically steerable passive array radiator antenna apparatus is advantages also in cost.

In other words, since the cumulative probability distribution does not strongly depend on the antenna element interval, it is unnecessary to strictly and accurately set the mechanical margin in packaging of the antenna apparatus. Therefore, the present invention is effective to package an antenna apparatus having a folding development structure or made of a soft elastic material. The controller of the present array antenna is simple in hardware for configuration and can obtain a great fading improvement effect by the simple one-bit binary control. Therefore, the antenna apparatus can be used as a diversity antenna which can be mounted in the commercially available consumer terminal apparatus such as a laptop terminal apparatus or a PC card.

Furthermore, the variable reactance element of the electronically steerable passive array radiator antenna apparatus includes, for example, an inexpensive varactor diode. Therefore, the electronically steerable passive array radiator antenna apparatus including one radiating element and two parasitic elements can be produced at a lower cost than that of the conventional two-element selection diversity antenna by a single pole double throw RF switch. In addition, since the varactor diode always operates at reverse bias, no direct current is consumed in an ON state in a different manner from a PIN diode switch. As compared even with an FET switch, the varactor diode is low in cost and low in loss. Besides, the electronically steerable passive array radiator antenna apparatus can operate even when the antenna element interval is relatively narrow. Therefore, the overall antenna apparatus can be reduced in size.

In the above-mentioned preferred embodiment, the three-element electronically steerable passive array radiator antenna apparatus has been described. However, the present invention is not limited to this, but the present invention is also applicable to an electronically steerable passive array radiator antenna apparatus including one radiating element and an even number of parasitic element. In other words, the electronically steerable passive array radiator antenna apparatus includes the radiating element for receiving a transmitted radio signal, an even number of parasitic elements provided to distant from the radiating element at a predetermined interval, and an even number of variable reactance elements connected to the respective parasitic elements. By changing reactances set to the respective variable reactance elements, the parasitic elements are allowed to operate as waveguides or reflectors, and the directivity characteristic of the array antenna that is the electronically steerable passive array radiator antenna apparatus is changed. The even number of parasitic elements includes at least one first set of parasitic elements and at least one second set of parasitic elements. The even number of variable reactance elements include a first set of variable reactance elements connected to the first set of the respective parasitic elements and the second set of the respective parasitic elements, and a second set of variable reactance elements connected to the second set of the respective parasitic element. The antenna controller 10 may be constituted to select the reactance set to which the signal power of the received radio signal is larger from those in the first case in which the first reactance set is set to the first and second sets of variable reactance elements and the second case in which the second reactance set is set to the first and second reactance elements, and to set the selected reactances to the first and second variable reactance elements so as to be able to obtain a diversity gain equal to or larger than a predetermined value, and so that the input impedance of the electronically steerable passive array radiator antenna apparatus is kept substantially unchanged, based on the radio signal received by the electronically steerable passive array radiator antenna apparatus.

First Modified Preferred Embodiment

Figure 26:
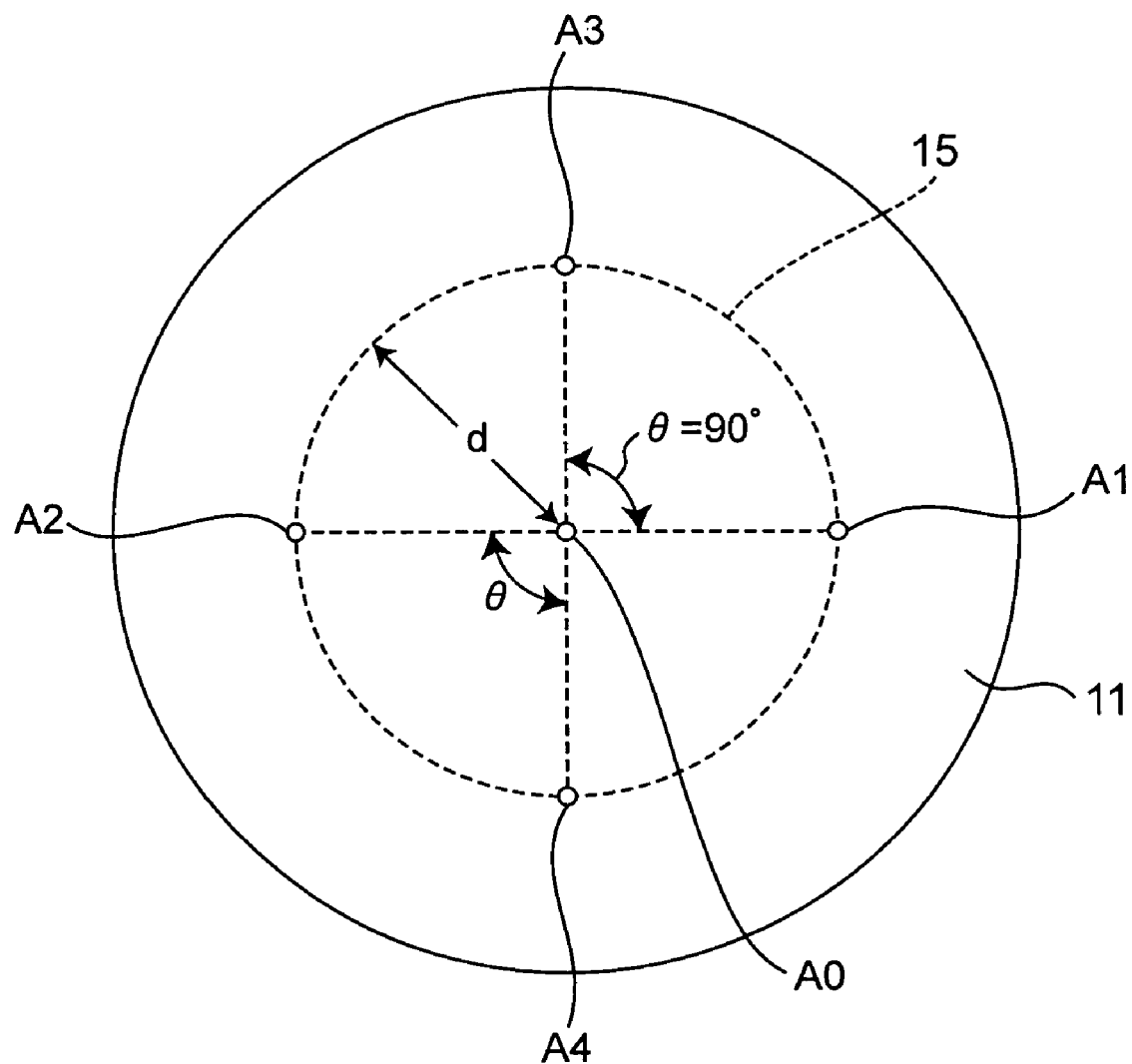
FIG. 26 is a plan view of an array antenna apparatus according to a first modified preferred embodiment of the present invention.

FIG. 26 is a plan view showing an electronically steerable passive array radiator antenna apparatus according to a first modified preferred embodiment of the present invention.

Referring to FIG. 26, respective parasitic elements A1, A2, A3, and A4 are provided on a circumference 15 having a diameter "d" around a radiating element A0. The parasitic element A2, the radiating element A0, and the parasitic element A1 are arranged linearly in parallel, and the parasitic element A3, the radiating element A0, and the parasitic element A4 are arranged linearly in parallel, and this leads to setting of an angle θ formed between the antenna elements A3, A0, and A1 and an angle θ formed between the antenna elements A2, A0, and A4 at right angles. It is to be noted that the respective antenna elements A0 to A4 are provided vertically on a grounding electrical conductor 11 so as to be electrically isolated from the grounding electrical conductor 11. It is assumed herein that the parasitic elements A1 and A3 are a first set of parasitic elements and the parasitic elements A2 and A4 are a second set of parasitic elements. In addition, it is assumed that variable reactance elements 12-1 and 12-3 connected to the parasitic elements A1 and A3, respectively are a first set of variable reactance elements, and that variable reactance elements 12-2 and 12-4 connected to the parasitic elements A2 and A4, respectively are a second set of variable reactance elements. An antenna controller 10 selects a reactance set as obtained when a signal power of a received radio signal is larger from those in a first case in which a first reactance set (Xa and Xb) are set to the first and second sets of variable reactance elements (note that the reactance Xa is set to the first set of variable reactance elements, and that the reactance Xb is set to the second set of variable reactance elements), and a second case in which a second reactance set (Xb and Xa) are set to the first and second sets of variable reactance elements (note that the reactance Xb is set to the first set of variable reactance elements, and that the reactance Xa is set to the second set of variable reactance elements) so that the antenna apparatus can obtain a diversity gain equal to or larger than a predetermined value, and so that an input impedance of the electronically steerable passive radiator antenna apparatus is kept substantially unchanged, and sets the selected reactance set to the first and second sets of variable reactance elements, respectively, based on the radio signal received by the electronically steerable passive array radiator antenna apparatus. The second reactance set may be (Xc and Xd). Further, in the above-mentioned modified preferred embodiment, the angle θ is set to 90 degrees. However, the present invention is not limited to this, however, the angle may be set in a range of 0<θ<180 [degree].

Second Modified Preferred Embodiment

Figure 27:
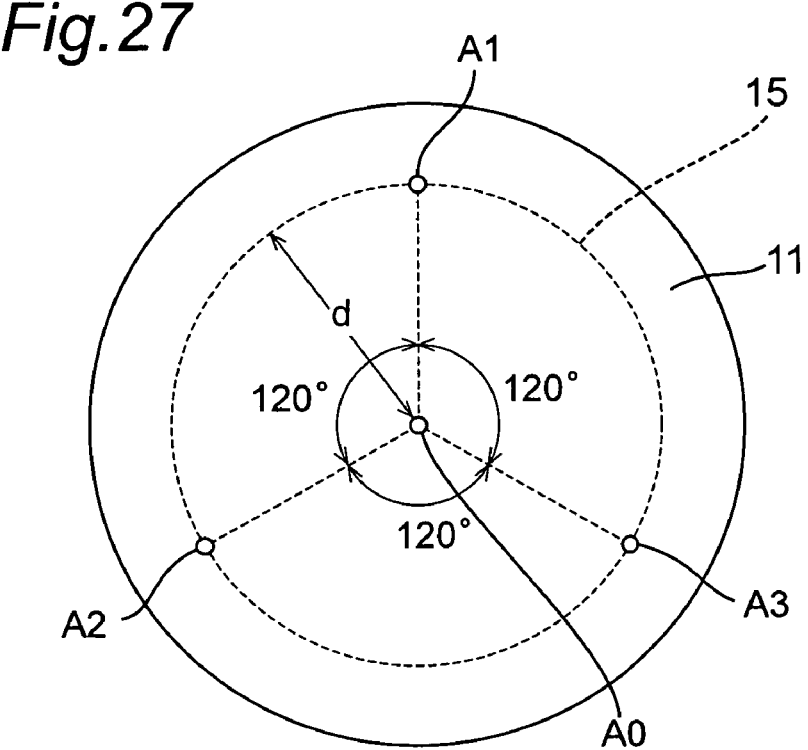
FIG. 27 is a plan view of an array antenna apparatus according to a second modified preferred embodiment of the present invention.

FIG. 27 is a plan view showing an electronically steerable passive array radiator antenna apparatus according to a second modified preferred embodiment of the present invention.

Referring to FIG. 27, three parasitic elements A1, A2, and A3 are provided on a circumference 15 having a diameter "d" around a radiating element A0, and provided to be distant from each other by as much as an angle of 120°, and to form an equilateral triangle when points of positions of the three parasitic elements A1, A2, and A3 are virtually connected by a line which does not pass through the center. It is to be noted that variable reactance elements 12-1, 12-2, and 12-3 are connected to the three parasitic elements A1, A2, and A3, respectively, and that the other constitution is equal to that in the above-mentioned preferred embodiment.

In the electronically steerable passive array radiator antenna apparatus constituted as mentioned above, a reactance set (Xa, Xb, and Xc) can be set to the variable reactance elements 12-1, 12-2, and 12-3 so that the electronically steerable passive array radiator antenna apparatus can obtain a diversity gain equal to or larger than a predetermined value, and so that an input impedance of the a electronically steerable passive array radiator antenna apparatus is kept substantially unchanged, in a manner similar to that of the above-mentioned preferred embodiment and the first modified preferred embodiment. The parasitic elements A1, A2, and A3 are arranged at symmetric positions about the radiating element A0. Therefore, even when the reactance set (Xa, Xb, and Xc) is cyclically set to the variable reactance elements 12-1, 12-2, and 12-3 as though the set is a different reactance set (Xb, Xc, and Xa) or (Xc, Xa, and Xb), the input impedance is not changed when the antenna apparatus is viewed from a feeding port of the radiating element A0. Accordingly, an antenna controller 10 selects a reactance set as obtained when a signal power of a received radio signal is larger from those in three cases in which the three reactance sets (Xa, Xb, and Xc), (Xb, Xc, and Xa), and (Xc, Xa, and Xb) obtained by circulating the respective reactances are set to the variable reactance elements 12-1, 12-2, and 12-3 so that the electronically steerable passive array radiator antenna apparatus can obtain a diversity gain equal to or larger than a predetermined value, and so that an input impedance of the electronically steerable passive array radiator antenna apparatus is kept substantially unchanged, and sets the selected reactance set to the variable reactance elements, respectively, based on the radio signal received by the electronically steerable passive array radiator antenna apparatus. In this case, even when the reactance set to be set to the respective variable reactance elements 12-1, 12-2, and 12-3 is changed, the diversity equal to or larger than a predetermined value can be obtained, and the input impedance is kept substantially unchanged.

Third Modified Preferred Embodiment

Figure 28:
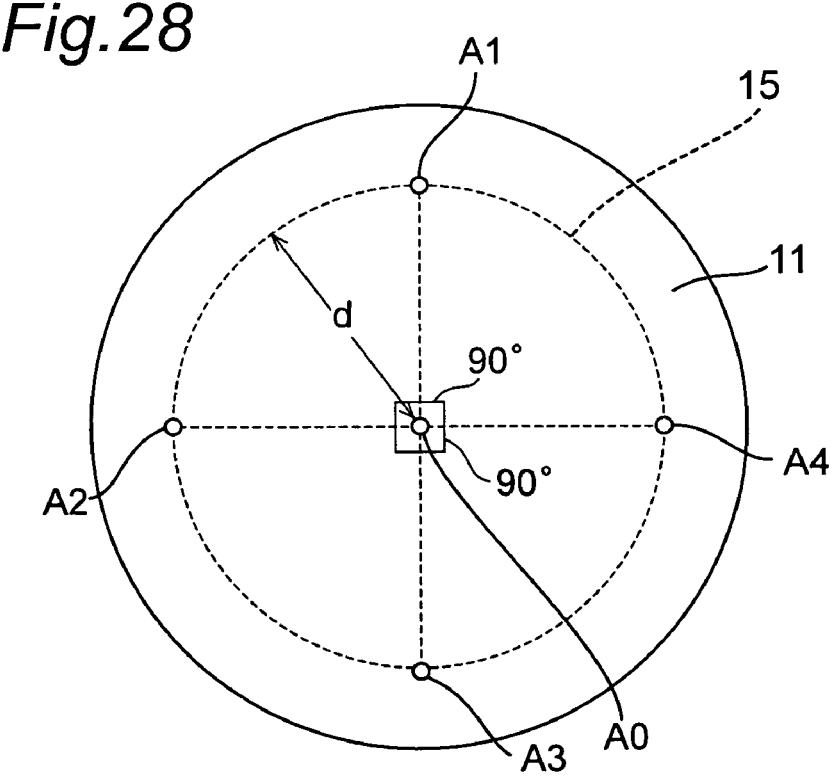
FIG. 28 is a plan view of an array antenna apparatus according to a third modified preferred embodiment of the present invention.

FIG. 28 is a plan view showing an electronically steerable passive array radiator antenna apparatus according to a third modified preferred embodiment of the present invention.

Referring to FIG. 28, four parasitic elements A1, A2, A3, and A4 are provided on a circumference 15 having a diameter "d" around a radiating element A0, and provided to be distant from each other by as much as an angle of 90°, and to form a square (an equilateral rectangle) when points of positions of the four parasitic elements A1, A2, A3, and A4 are virtually connected by a line which does not pass through the center. It is to be noted that variable reactance elements 12-1, 12-2, 12-3, and 12-4 are connected to the four parasitic elements A1, A2, A3, and A4, respectively, and that the other constitution is equal to that in the above-mentioned preferred embodiment and modified preferred embodiment.

In the electronically steerable passive array radiator antenna apparatus constituted as mentioned above, a reactance set (Xa, Xb, Xc, and Xd) can be set to the variable reactance elements 12-1, 12-2, 12-3, and 12-4 so that the electronically steerable passive array radiator antenna apparatus can obtain a diversity gain equal to or larger than a predetermined value, and so that an input impedance of the electronically steerable passive array radiator antenna apparatus is kept substantially unchanged, in a manner similar to that of the above-mentioned preferred embodiment and the modified preferred embodiments. The parasitic elements A1, A2, A3, and A4 are arranged at symmetric positions about the radiating element A0. Therefore, even when the reactance set (Xa, Xb, Xc, and Xd) is cyclically set to the variable reactance elements 12-1, 12-2, 12-3, and 12-4 as though the set is a different reactance set (Xb, Xc, Xd, and Xa), (Xc, Xd, Xa, and Xb), or (Xd, Xa, Xb, and Xc), the input impedance is not changed when the antenna apparatus is viewed from a feeding port of the radiating element A0. Accordingly, an antenna controller 10 selects a reactance set as obtained when a signal power of a received radio signal is larger from those in four cases in which the four-reactance sets (Xa, Xb, Xc, and Xd), (Xb, Xc, Xd, and Xa), (Xc, Xd, Xa, and Xb), or (Xd, Xa, Xb, and Xc) obtained by circulating the respective reactances are set to the variable reactance elements 12-1, 12-2, 12-3, and 12-4 so that the electronically steerable passive array radiator antenna apparatus can obtain a diversity gain equal to or larger than a predetermined value, and so that the input impedance of the electronically steerable passive array radiator antenna apparatus is kept substantially unchanged, and sets the selected reactance set to the variable reactance elements 12-1, 12-2, 12-3, and 12-4, respectively, based on the radio signal received by the electronically steerable passive array radiator antenna apparatus. In this case, even when the reactance set to be set to the respective variable reactance elements 12-1, 12-2, 12-3, and 12-4 is changed, the diversity equal to or larger than a predetermined value can be obtained, and the input impedance is kept substantially unchanged.

The Invention According to Second and Third Modified Preferred Embodiments

In the second modified preferred embodiment, the three parasitic elements A1, A2, and A3 are arranged at the respective vertexes of the equilateral triangle symmetrically about the radiating element A0. In the third modified preferred embodiment, the four parasitic elements A1, A2, A3, and A4 are arranged at the respective vertexes of the square symmetrically about the radiating element A0. Alternatively, the two modified preferred embodiments may be extended so that a plurality of parasitic elements A1 to AN are arranged at respective vertexes of an equidistant polygon symmetrically about the radiating element A0. In this case, an antenna controller 10 selects a reactance set as obtained when a signal power of a received radio signal is larger from those in N cases in which N reactance sets obtained by circulating the respective reactances so that the electronically steerable passive array radiator antenna apparatus can obtain a diversity gain equal to or larger than a predetermined value, and so that the input impedance of the electronically steerable passive array radiator antenna apparatus is kept substantially unchanged, and sets the selected reactance set to the variable reactance elements 12-1 to 12-N, respectively, based on the radio signal received by the electronically steerable passive array radiator antenna apparatus. In this case, even when the reactance set to be set to the respective variable reactance elements 12-1 to 12-N is changed, the diversity equal to or larger than a predetermined value can be obtained, and the input impedance is kept substantially unchanged.

In the present invention, in a manner similar to that of the above-mentioned preferred embodiment, a plurality of reactance sets may be preferably set so that the diversity gain is substantially the maximum when a CDF, which is a cumulative probability of such an event as the signal power of the received radio signal exceeding a predetermined signal power, is a predetermined value. Further, in a manner similar to that of the above-mentioned preferred embodiment, a plurality of reactance sets may be set so that the diversity gain is equal to or larger than a predetermined value when the CDF, which is a cumulative probability of such an event as the signal power of the received radio signal exceeding a predetermined signal power, is a predetermined value.

Fourth Modified Preferred Embodiment

Figure 29:
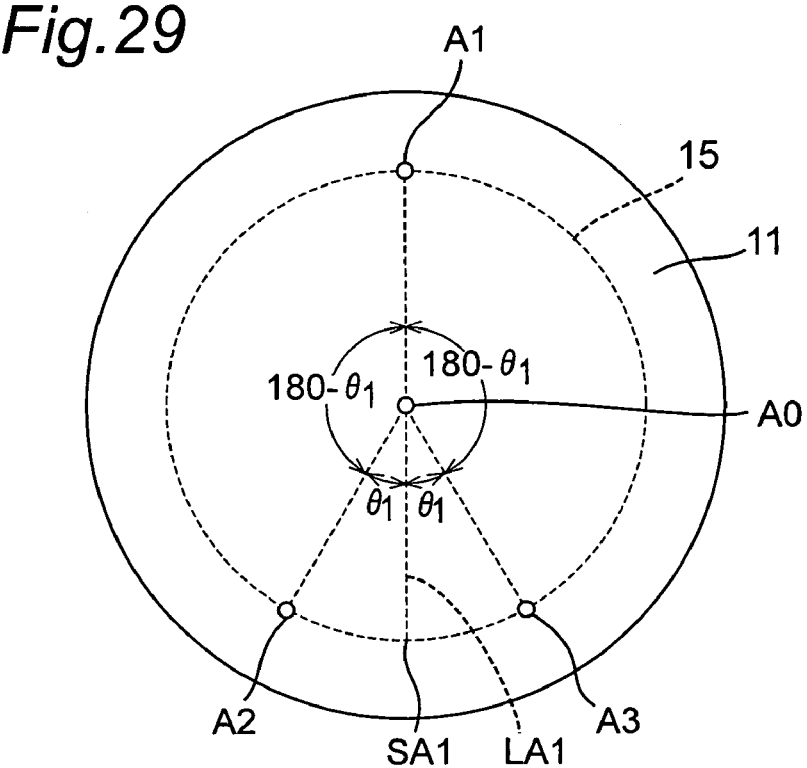
FIG. 29 is a plan view of an array antenna apparatus according to a fourth modified preferred embodiment of the present invention.

FIG. 29 is a plan view showing an electronically steerable passive array radiator antenna apparatus according to a fourth modified preferred embodiment of the present invention.

Referring to FIG. 29, three parasitic elements A1, A2, and A3 are provided on a circumference 15 having a diameter "d" around a radiating element A0. The parasitic elements A1 and A2 are provided to be distant from each other by as much as an angle of 180−$\theta_1$° (0<$\theta_1$<180), the parasitic elements A1 and A3 are provided to be distant from each other by as much as an angle of 180−$\theta_1$°, and the parasitic elements A2 and A3 are provided to be distant from each other by as much as an angle of 2$\theta_1$°. At this time, an isosceles triangle is formed when points of positions of the three parasitic elements A1, A2, and A3 are virtually connected by a line which does not pass through the center. The parasitic elements A2 and A3 are provided at linearly symmetric positions about a line LA1 extending from the parasitic element A1 through the radiating element A0 (the line is referred to as a "symmetric line" hereinafter, and it is defined herein that a point as obtained when the symmetric line LA1 intersects the circumference 15 is an intersection SA1) as a symmetric axis. It is to be noted that variable reactance elements 12-1, 12-2, and 12-3 are connected to the three parasitic elements A1, A2, and A3, respectively, and that the other constitution is equal to that in the above-mentioned preferred embodiment.

In the electronically steerable passive array radiator antenna apparatus constituted as mentioned above, a reactance set (Xa, Xb, and Xc) can be set to the variable reactance elements 12-1, 12-2, and 12-3 so that the electronically steerable passive array radiator antenna apparatus can obtain a diversity gain equal to or larger than a predetermined value, and so that an input impedance of the electronically steerable passive array radiator antenna apparatus is kept substantially unchanged, in a manner similar to that of the above-mentioned preferred embodiment and the modified preferred embodiments. The parasitic elements A2 and A3 are arranged at linearly symmetric positions about the symmetric line LA1 as a symmetric axis. Therefore, even when the reactance set (Xa, Xb, and Xc) to be set to the variable reactance elements 12-1, 12-2, and 12-3 are set so that the reactances of the variable reactance elements 12-2 and 12-3 are replaced with each other such as (Xa, Xc, and Xb), the input impedance is not changed when the antenna apparatus is viewed from a feeding port of the radiating element A0. Accordingly, an antenna controller 10 selects a reactance set as obtained when a signal power of a received radio signal is larger from those in two cases in which the two reactance sets (Xa, Xb, and Xc) and (Xa, Xc, and Xb) obtained by replacing the respective reactances are set to the variable reactance elements 12-1, 12-2, and 12-3, so that the electronically steerable passive array radiator antenna apparatus can obtain a diversity gain equal to or larger than a predetermined value, and so that the input impedance of the electronically steerable passive array radiator antenna apparatus is kept substantially unchanged, and sets the selected reactance set to the variable reactance elements 12-1, 12-2, and 12-3, respectively, based on the radio signal received by the electronically steerable passive array radiator antenna apparatus. In this case, even when the reactance set to be set to the respective variable reactance elements 12-1, 12-2, and 12-3 is changed, the diversity equal to or larger than a predetermined value can be obtained, and the input impedance is kept substantially unchanged.

Fifth Modified Preferred Embodiment

Figure 30:
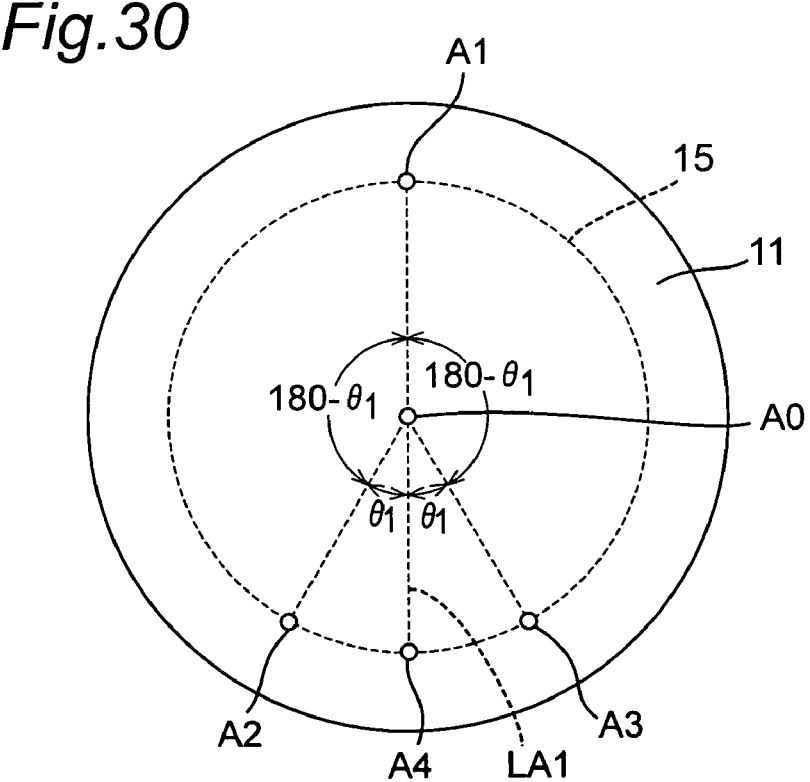
FIG. 30 is a plan view of an array antenna apparatus according to a fifth modified preferred embodiment of the present invention.

FIG. 30 is a plan view showing an electronically steerable passive array radiator antenna apparatus according to a fifth modified preferred embodiment of the present invention. The electronically steerable passive array radiator antenna apparatus according to the fifth modified preferred embodiment is characterized, as compared with the fourth modified preferred embodiment shown in FIG. 29, by further providing a parasitic element A4 to which a variable reactance element 12-4 is connected, at a position of the intersection SA1 shown in FIG. 29.

In the electronically steerable passive array radiator antenna apparatus constituted as mentioned above, a reactance set (Xa, Xb, Xc, and Xd) can be set to the variable reactance elements 12-1, 12-2, 12-3, and 12-4 so that the electronically steerable passive array radiator antenna apparatus can obtain a diversity gain equal to or larger than a predetermined value, and so that an input impedance of the electronically steerable passive array radiator antenna apparatus is kept substantially unchanged, in a manner similar to that of the above-mentioned fourth modified preferred embodiment. The parasitic elements A2 and A3 are arranged at linearly symmetric positions about the symmetric line LA1 as a symmetric axis. Therefore, even when the reactance set (Xa, Xb, Xc, and Xd) to be set to the variable reactance elements 12-1, 12-2, 12-3, and 12-4 are set so that the reactances of the variable reactance elements 12-2 and 12-3 are replaced with each other such as (Xa, Xc, Xb, and Xd), the input impedance is not changed when the antenna apparatus is viewed from a feeding port of the radiating element A0. Accordingly, an antenna controller 10 selects a reactance set as obtained when a signal power of a received radio signal is larger from those in two cases in which the two reactance sets (Xa, Xb, Xc, and Xd) and (Xa, Xc, Xb, and Xd) obtained by replacing the respective reactances are set to the variable reactance elements 12-1, 12-2, 12-3, and 12-4, so that the electronically steerable passive array radiator antenna apparatus can obtain a diversity gain equal to or larger than a predetermined value, and so that the input impedance of the electronically steerable passive array radiator antenna apparatus is kept substantially unchanged, and sets the selected reactance set to the variable reactance elements 12-1, 12-2, 12-3, and 12-4, respectively, based on the radio signal received by the electronically steerable passive array radiator antenna apparatus. In this case, even when the reactance set to be set to the respective variable reactance elements 12-1, 12-2, 12-3 and 12-4 is changed, the diversity equal to or larger than a predetermined value can be obtained, and the input impedance is kept substantially unchanged.

Sixth Modified Preferred Embodiment

Figure 31:
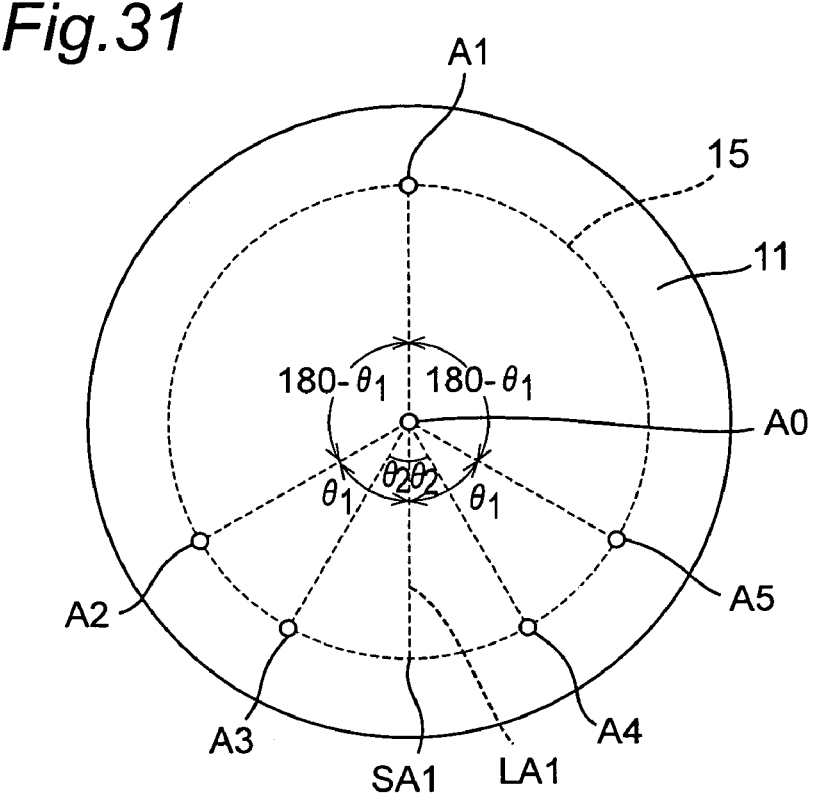
FIG. 31 is a plan view of an array antenna apparatus according to a sixth modified preferred embodiment of the present invention.

FIG. 31 is a plan view showing an electronically steerable passive array radiator antenna apparatus according to a sixth modified preferred embodiment of the present invention.

Referring to FIG. 31, five parasitic elements A1, A2, A3, A4, and A5 are provided on a circumference 15 having a diameter "d" around a radiating element A0. The parasitic elements A1 and A2 are provided to be distant from each other by as much as an angle of $180-\theta_1°$ ($0<\theta_2<\theta_1<180$), and the parasitic elements A1 and A5 are provided to be distant from each other by as much as an angle of $180-\theta_1°$ ($0<\theta_2<\theta_1<180$). An angle between a symmetric line LA1 and a line that connects a position of the radiating element A0 to that of the parasitic element A2 is set to a predetermined angle $\theta_1$, and an angle between the symmetric line LA1 and a line that connects the position of the radiating element A0 to that of the parasitic element A5 is set to a predetermined angle $\theta_1$. In addition, an angle between the symmetric line LA1 and a line that connects a position of the radiating element A0 to that of the parasitic element A3 is set to a predetermined angle $\theta_2$, and an angle between the symmetric line LA1 and a line that connects the position of the radiating element A0 to that of the parasitic element A4 is set to a predetermined angle $\theta_2$. At this time, an isosceles triangle is formed when points of positions of the three parasitic elements A1, A2, and A5 are virtually connected by a line which does not pass through the center. The parasitic elements A2 and A5 are provided at linearly symmetric positions about the symmetric line LA1 as a symmetric axis. In addition, an isosceles triangle is formed when points of positions of the three parasitic elements A1, A3 and A4 are virtually connected by a line which does not pass through the center. The parasitic elements A3 and A4 are provided at linearly symmetric positions about the symmetric line LA1 as a symmetric axis. It is to be noted that variable reactance elements 12-1 to 12-5 are connected to the five parasitic elements A1 to A5, respectively, and that the other constitution is equal to that in the above-mentioned preferred embodiment.

In the electronically steerable passive array radiator antenna apparatus constituted as mentioned above, a reactance set (Xa, Xb, Xc, Xd, and Xe) can be set to the variable reactance elements 12-1 to 12-5 so that the electronically steerable passive array radiator antenna apparatus can obtain a diversity gain equal to or larger than a predetermined value, and so that an input impedance of the electronically steerable passive array radiator antenna apparatus is kept substantially unchanged, in a manner similar to that of the above-mentioned preferred embodiment and the modified preferred embodiments. The parasitic elements A2 and A5 are arranged at linearly symmetric positions about the symmetric line LA1. The parasitic elements A3 and A4 are arranged at linearly symmetric positions about the symmetric line LA1 as a symmetric axis. Therefore, the reactance set (Xa, Xb, Xc, Xd, and Xe) to be set to the variable reactance elements 12-1 to 12-5 may be set so that the reactances of the variable reactance elements 12-2 and 12-5 are replaced as though the set is a different set such as (Xa, Xe, Xc, Xd, and Xe). The reactance set (Xa, Xb, Xc, Xd, and Xe) to be set to the variable reactance elements 12-1 to 12-5 may be set so that the reactances of the variable reactance elements 12-3 and 12-4 are replaced as though the set is a different set such as (Xa, Xb, Xd, Xc, and Xe). The reactance set (Xa, Xb, Xc, Xd, and Xe) to be set to the variable reactance elements 12-1 to 12-5 may be set so that the reactances of the variable reactance elements 12-2 and 12-5 are replaced and those of the variable reactance elements 12-3 and 12-4 are replaced as though the set is a different set such as (Xa, Xe, Xc, Xd, and Xb). In other words, the reactance set of the variable reactance elements connected to at least one pair of parasitic elements provided at linearly symmetric position about the symmetric line as the symmetric axis may be replaced with each other. Even if the reactances are so set, the input impedance is not changed when the antenna apparatus is viewed from a feeding port of the radiating element A0. Accordingly, an antenna controller 10 selects a reactance set as obtained when a signal power of a received radio signal is larger from those in four cases in which the four reactance sets (Xa, Xb, Xc, Xd, and Xe), (Xa, Xe, Xc, Xd, and Xb), (Xa, Xb, Xd, Xc, and Xe), and (Xa, Xe, Xc, Xd, and Xb) obtained by replacing the respective reactances as mentioned above are set to the variable reactance elements 12-1 to 12-5 so that the electronically steerable passive array radiator antenna apparatus can obtain a diversity gain equal to or larger than a predetermined value, and so that the input impedance of the antenna apparatus is kept substantially unchanged, and sets the selected reactance set to the variable reactance elements 12-1 to 12-5, respectively, based on the radio signal received by the electronically steerable passive array radiator antenna apparatus. In this case, even when the reactance set to be set to the respective variable reactance elements 12-1 to 12-5 is changed, the diversity equal to or larger than a predetermined value can be obtained, and the input impedance is kept substantially unchanged.

Seventh Modified Preferred Embodiment

Figure 32:
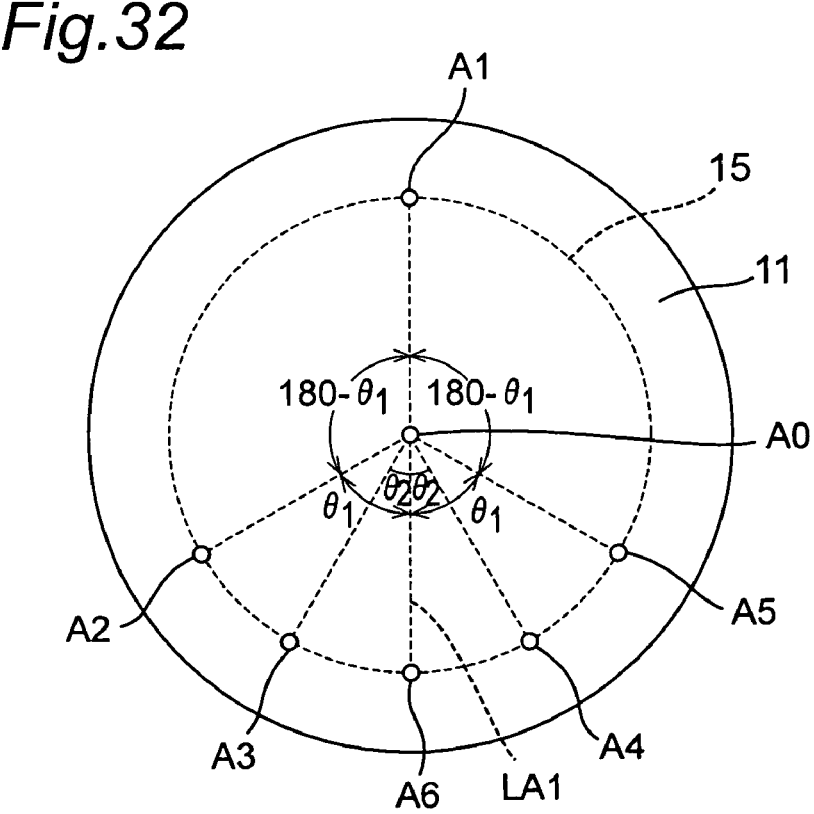
FIG. 32 is a plan view of an array antenna apparatus according to a seventh modified preferred embodiment of the present invention.

FIG. 32 is a plan view showing an electronically steerable passive array radiator antenna apparatus according to a seventh modified preferred embodiment of the present invention. The electronically steerable passive array radiator antenna apparatus according to the seventh modified preferred embodiment is characterized, as compared with the sixth modified preferred embodiment shown in FIG. 31, by further providing a parasitic element A6 to which a variable reactance element 12-6 is connected at a position of the intersection SA1 shown in FIG. 31. In this case, in a manner similar to that of the fourth modified preferred embodiment and the fifth modified preferred embodiment, the reactances of the variable reactance elements 12-1 and 12-6 connected to the parasitic elements A1 and A6 are fixed. However, by setting the reactances of the other variable reactance elements as mentioned in the sixth modified preferred embodiment, even when the reactance set to be set to the respective variable reactance elements 12-1 to 12-5, the electronically steerable passive array radiator antenna apparatus can obtain a diversity gain equal to or larger than a predetermined value, and an input impedance is kept substantially unchanged.

The Invention According to Fourth to Seventh Modified Preferred Embodiments

In the fourth and the fifth modified preferred embodiments, the parasitic elements A2 and A3 are arranged at positions of two bottom-side vertexes of the isosceles triangle linearly symmetrically about the symmetric line LA1 as the symmetric axis. In the sixth and the seventh modified preferred embodiments, the parasitic elements A2 and A5 are arranged at positions of two bottom-side vertexes of the isosceles triangle linearly symmetrically about the symmetric line LA1 as the symmetric axis, and the parasitic elements A3 and A4 are arranged linearly symmetrically about the symmetric line LA1 as the symmetric axis. In the fifth and the seventh modified preferred embodiments, the parasitic element A4 or A6 is further provided at the position of the intersection SA1 on the symmetric line LA1. In these four modified preferred embodiments as well as a modified preferred embodiment modified from the four modified preferred embodiments, a pair of or two pair of parasitic elements are provided linearly symmetrically about the symmetric line LA1 as the symmetric axis. Alternatively, the modified preferred embodiments may be extended so that three or more pairs of parasitic elements are provided linearly symmetrically about the symmetric line A1 as the symmetric axis. In this case, an antenna controller 10 selects a reactance set as obtained when the signal power of the radio signal to be received is larger from those in at least two cases in which at least two reactance set obtained by replacing the reactances of the variable reactance elements connected to at least one pair of parasitic elements provided linearly symmetrically so that the electronically steerable passive array radiator antenna apparatus can obtain a diversity gain equal to or larger than a predetermined value, and so that the input impedance of the electronically steerable passive array radiator antenna apparatus is kept substantially unchanged, and sets the selected reactance set to the respective variable reactance elements, based on the radio signal received by the electronically steerable passive array radiator antenna apparatus. In this case, even when the reactance set to be set to the respective variable reactance elements is changed, the diversity equal to or larger than a predetermined value can be obtained, and the input impedance is kept substantially unchanged.

In the present invention, in a manner similar to that of the above-mentioned preferred embodiment, a plurality of reactance sets may be preferably set so that the diversity gain is substantially the maximum when a CDF, which is a cumulative probability of such an event as the signal power of the received radio signal exceeding a predetermined signal power, is a predetermined value. Further, in a manner similar to that of the above-mentioned preferred embodiment, a plurality of reactance sets may be set so that the diversity gain is equal to or larger than a predetermined value when the CDF, which is the cumulative probability of such an event as the signal power of the received radio signal exceeding a predetermined signal power, is a predetermined value.

In the fourth to the seventh modified preferred embodiments mentioned above, the parasitic element A1 may not be necessarily provided. It is to be noted that control over the reactances of the variable reactance elements connected to the other parasitic elements is executed as mentioned above. In the fourth to the seventh modified preferred embodiments as well as their modified preferred embodiment mentioned above, the electronically steerable passive array radiator antenna apparatus is constituted to include at least one pair of parasitic elements provided linearly symmetrically about the symmetric line LA1 that passes through the position of the radiating element A0 as the symmetric axis, and to include a plurality of parasitic elements either provided to be located on the symmetric line LA1 or provided linearly symmetrically about the symmetric line LA1 as the symmetric axis. The antenna controller 10 selects a reactance set as obtained when the signal power of the radio signal to be received is larger from those in at least two cases in which a plurality of reactance sets obtained by replacing the reactances of at least one pair of parasitic elements provided linearly symmetrically so that the antenna apparatus can obtain a diversity gain equal to or larger than a predetermined value, and so that the input impedance of the antenna apparatus is kept substantially unchanged, and sets the selected reactance set to the respective variable reactance elements, based on the radio signal received by the electronically steerable passive array radiator antenna apparatus. In this case, even when the reactance set to be set to the respective variable reactance elements is changed, the diversity equal to or larger than a predetermined value can be obtained, and the input impedance is kept substantially unchanged.

THIRD AND FOURTH IMPLEMENTAL EXAMPLES

Figure 33:
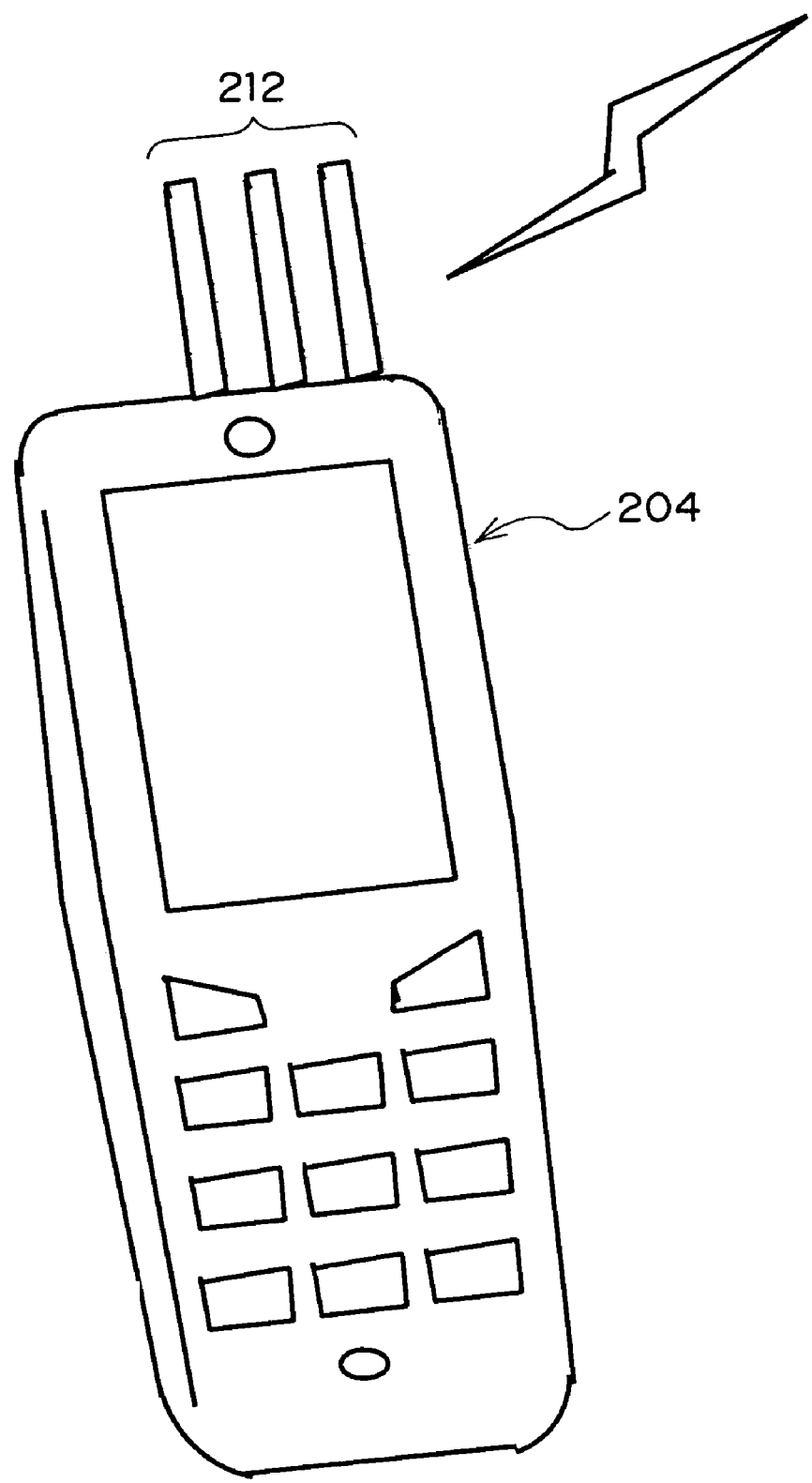
FIG. 33 is a perspective view showing an array antenna apparatus 212 mounted in a mobile telephone 204 as a third implemental example according to the present invention.
Figure 34:
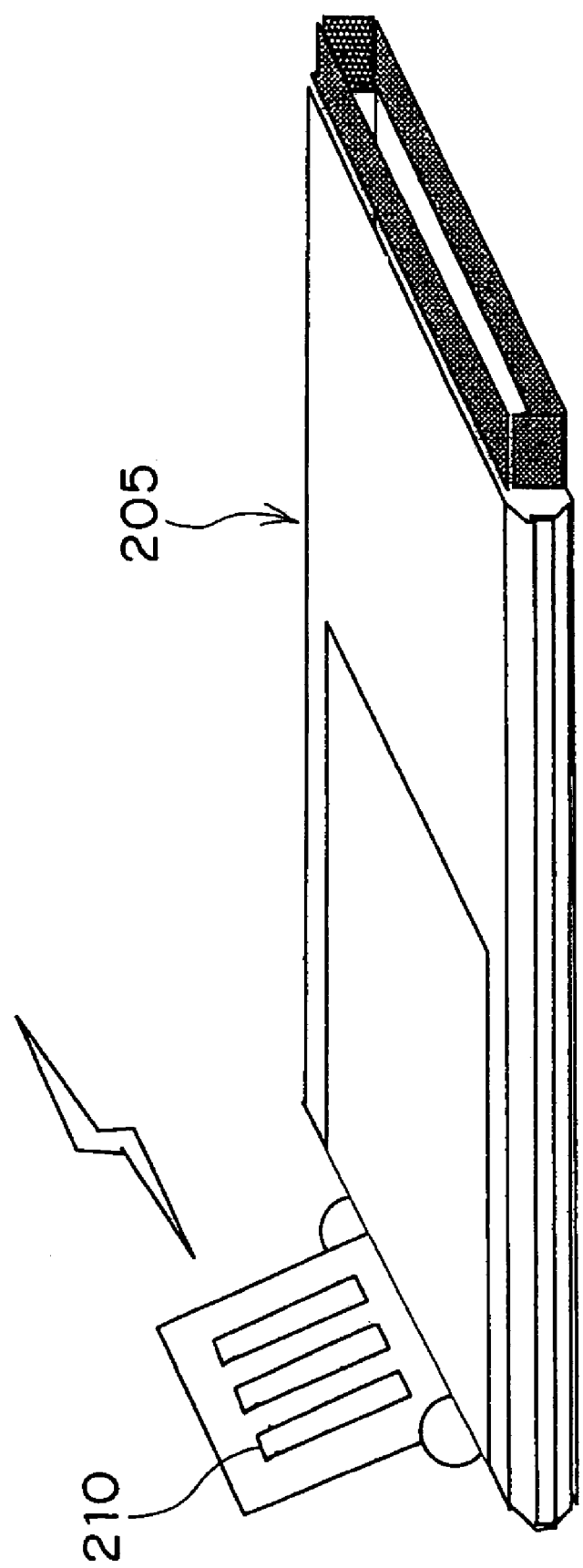
FIG. 34 is a perspective view showing an array antenna apparatus 210 mounted in a LANPC card 205 as a fourth implemental example according to the present invention.

FIG. 33 is a perspective view showing an array antenna apparatus 212 mounted in a mobile telephone 204 as a third implemental example according to the present invention. In the present implemental example, the array antenna apparatus 212, which is the three-element electronically steerable passive array radiator antenna apparatus, is provided on an upper portion of the mobile telephone 204. FIG. 34 is a perspective view showing an array antenna apparatus 210 mounted in a LANPC card 205 as a fourth implemental example according to the present invention. In the present implemental example, the array antenna apparatus 210 according to the above-mentioned preferred embodiment is provided on an end face of the LANPC card 205 opposite to a PC connection terminal.

Fifth Preferred Embodiment

Figure 35:
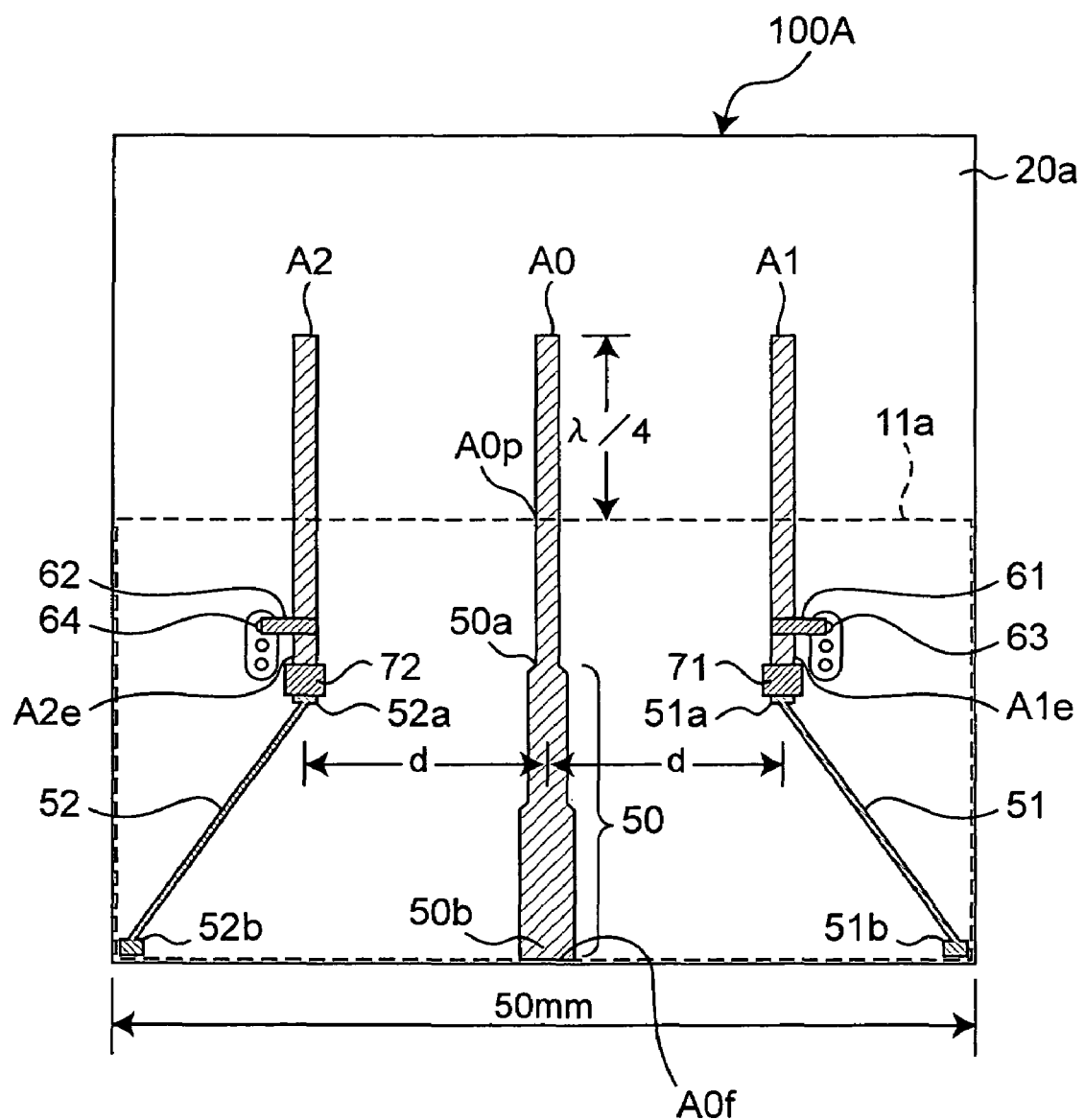
FIG. 35 is a plan view showing an array antenna apparatus 100A according to a fifth preferred embodiment of the present invention.

FIG. 35 is a plan view showing an array antenna apparatus 100A according to a fifth preferred embodiment of the present invention. The array antenna apparatus 100A according to the fifth preferred embodiment is different from the array antenna apparatus shown in FIG. 9 in the following respects.

(1) As a dielectric substrate 20a, a Teflon substrate having a grounding electrical conductor 11a provided on its rear surface, having a dielectric constant of 2.6, and having a dielectric loss tan δ of 0.0008 is used. A size of the Teflon substrate is such that a vertical length is 50 [mm], a horizontal length is 50 [mm], and a thickness is 0.6 [mm].

(2) The dielectric substrate 20a includes varactor diodes 61 and 62 of, for example, JDV2S71EE type manufactured by Toshiba Corporation, which constitute variable reactance elements 12-1 and 12-2, respectively, a feeding strip electrical conductor 50, reactance signal transmission strip electrical conductors 51 and 52, and chip resistors 71 and 72 of, for example, 10 kΩ inserted between the strip electrical conductors 51 and 52 and parasitic elements A1 and A2, respectively.

Referring to FIG. 35, the configuration of the array antenna apparatus 100A will be described in detail. As shown in FIG. 35, the grounding electrical conductor 11a is formed generally in a lower portion of the rear surface of the dielectric substrate 20a. In addition, conductor patterns (strip electrical conductors) of a radiating element A0 and the parasitic elements A1 and A2 are formed on a front surface of the dielectric substrate 20a so that each element protrudes from a top edge of the grounding electrical conductor 11a by a quarter-wave, and so that the respective elements are distant from each other at a predetermined interval "d" in parallel with each other. The conductor patterns of the radiating element A0 and the parasitic elements A1 and A2 in a portion of the rear surface, in which the grounding electrical conductor 11a is not formed, operate as antenna elements. On the other hand, these conductor patterns in the portion of the rear surface, in which the grounding electrical conductor 11a is formed, operate as microstrip lines (transmission lines). In other words, a point on the radiating element A0 when the conductor pattern of the radiating element A0 intersects a top edge of the grounding electrical conductor 11a three-dimensionally serves as a feeding point A0p.

The feeding strip electrical conductor 50 has a stepped tapered shape formed so that a characteristic impedance is changed step by steps such as two steps or the like. The feeding strip electrical conductor 50 and the grounding electrical conductor 11a constitute the microstrip line. An upper end 50a of the feeding strip electrical conductor 50 is connected to a lower end 50b of the radiating element A0, a connection point between them constitute a feeding connection point A0f, and a lower end 50b of the feeding strip electrical conductor 50 is connected to a core of a feeding cable connected to a radio receiver (not shown). Further, the reactance signal transmission strip electrical conductor 51 and the grounding electrical conductor 11a constitutes a microstrip line, an upper end 51a of the reactance signal transmission strip electrical conductor 51 is connected to a lower end A1e of the parasitic element A1 through the chip resistor 71, and a lower end 51b of the reactance signal transmission strip electrical conductor 51 is connected to a personal computer 401 that constitutes the antenna controller 10 shown in FIG. 1, through a preamplifier 404 as will be described later with reference to FIG. 38. In a manner similar to above, the reactance signal transmission strip electrical conductor 52 and the grounding electrical conductor 11a constitutes a microstrip line, an upper end 52a of the reactance signal transmission strip electrical conductor 52 is connected to a lower end A2e of the parasitic element A2 through the chip resistor 72, and a lower end 52b of the reactance signal transmission strip electrical conductor 52 is connected to the personal computer 401 that constitutes the antenna controller 10 shown in FIG. 1, through the preamplifier 404 as will be described later with reference to FIG. 38.

A through hole conductor 63 obtained by plating an inner peripheral surface of a through hole which passes through the dielectric substrate 20a in a thickness direction with a conductor, is formed near the lower end A1e of the parasitic element A1 (it is to be noted that the through hole conductor may be filled into the through hole). One end of the through hole conductor 63 is connected to a neighborhood of the lower end A1e of the parasitic element A1 through the varactor diode 61. In a manner similar to above, a through hole conductor 64 obtained by filling a through hole which passes through the dielectric substrate 20a in a thickness direction with a conductor, is formed near the lower end A2e of the parasitic element A2. One end of the through hole conductor 64 is connected to a neighborhood of the lower end A2e of the parasitic element A2 through the varactor diode 62. The array antenna apparatus constituted as mentioned above can be formed as a three-element electronically steerable passive array radiator antenna apparatus which is small in size, light in weight, and thin.

Figure 36:
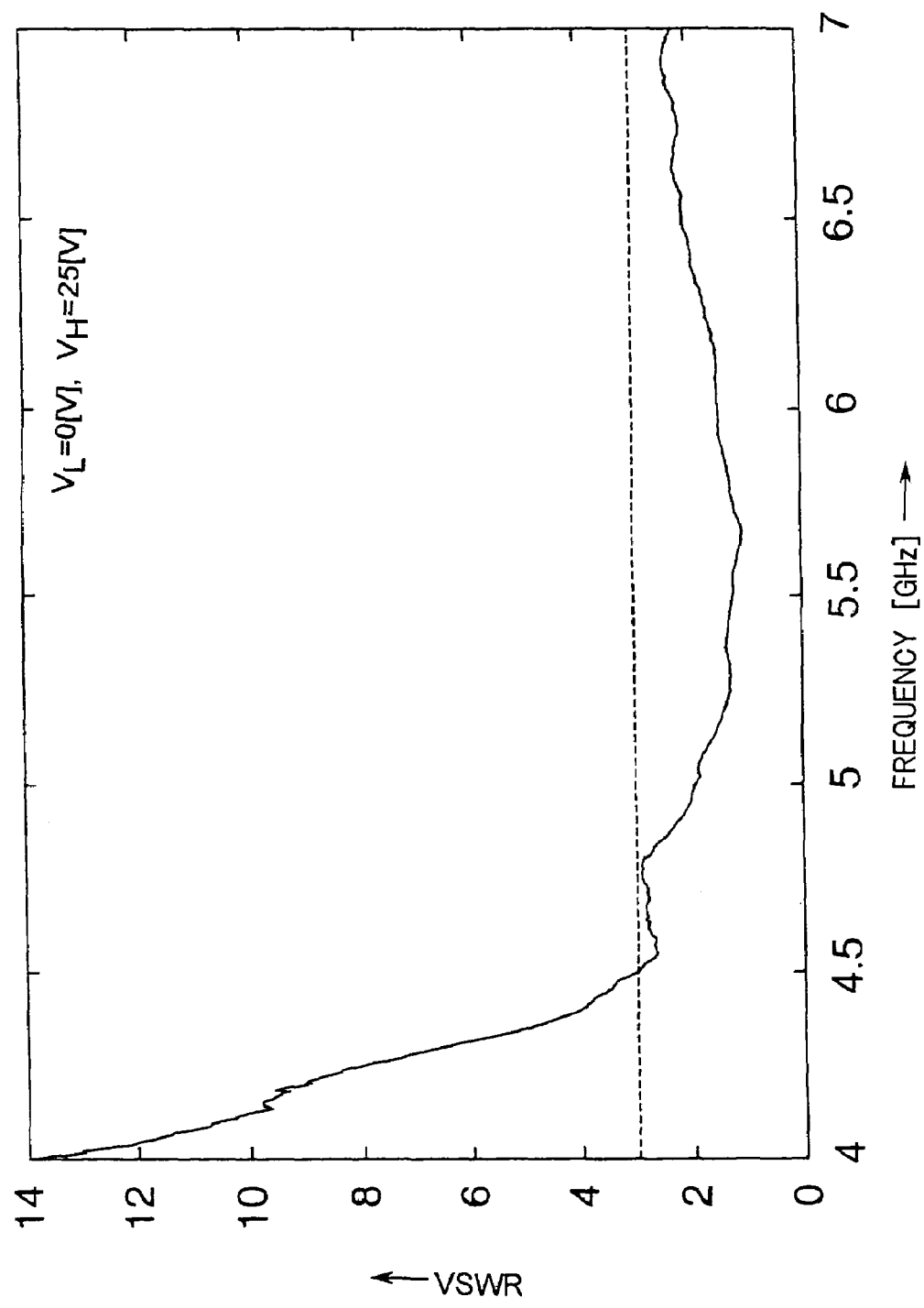
FIG. 36 is a graph showing results of an experiment as conducted to the array antenna apparatus 100A shown in FIG. 35, and showing a frequency characteristic of VSWR.

FIG. 36 is a graph showing results of an experiment as conducted to the array antenna apparatus 100A shown in FIG. 35, and showing a frequency characteristic of VSWR. The measurement of the VSWR is performed in a range of 3 to 7 GHz when $V_L=0$ [V] and $V_H=25$ [V] are applied, as reverse bias voltages serving as reactance signals, to the respective varactor diodes 61 and 62. As a result of the measurement, as is apparent from FIG. 36, the array antenna apparatus 100A reaches VSWR$\leqq$3 in a range of 4.5 to 7.0 GHz.

A change in an input impedance of the three-element array antenna apparatus 100A shown in FIG. 35 and a change in an input impedance of a conventional two-element electronically steerable passive array radiator antenna apparatus by switching reactances are confirmed by measurement.

Figure 37:
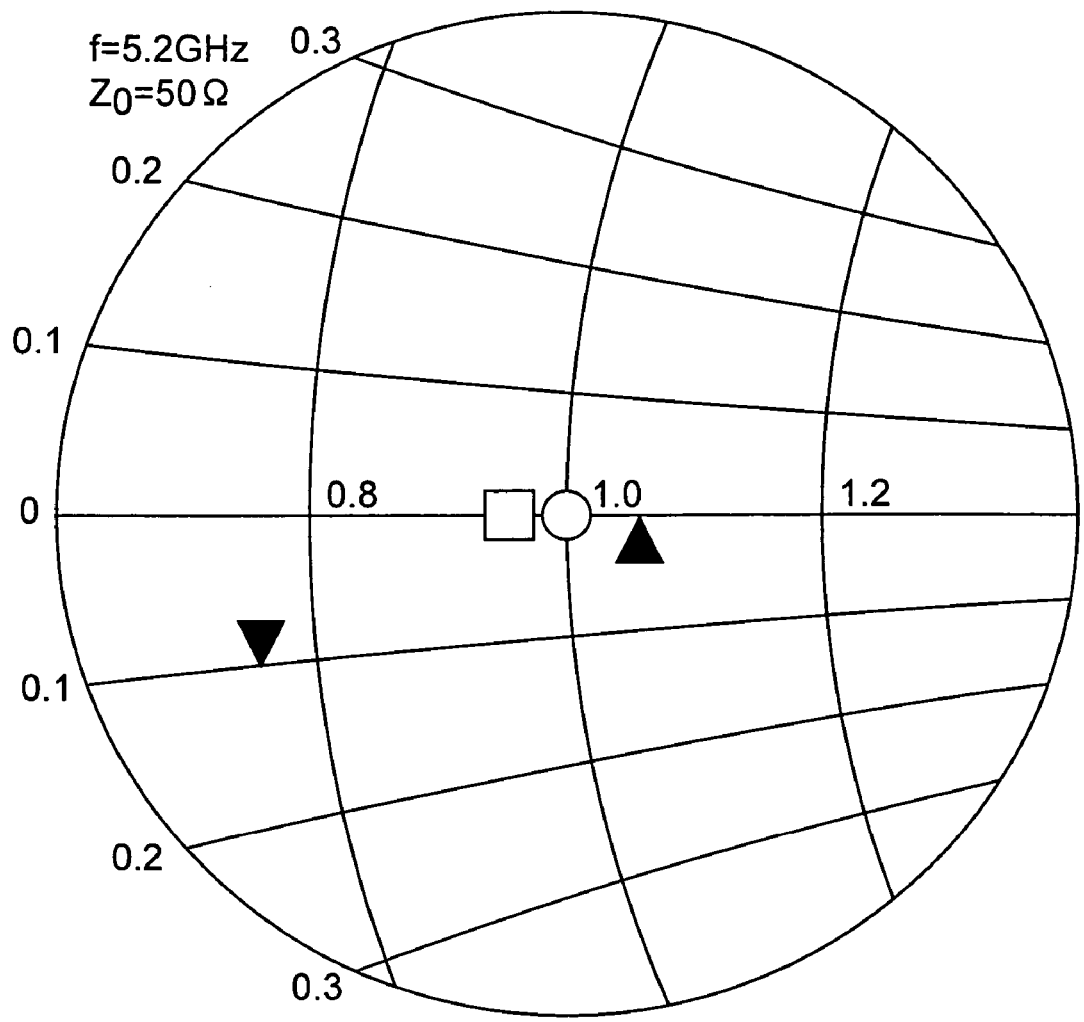
FIG. 37 is a Smith chart showing results of an experiment as conducted to the array antenna apparatus 100A shown in FIG. 35 and that conducted to a two-element electronically steerable passive array radiator antenna apparatus, and showing input impedances.

Referring to FIG. 37, the input impedance of the three-element array antenna apparatus 100A and that of the conventional two-element electronically steerable passive array radiator antenna apparatus at 5.2 GHz are plotted on a Smith chart. In the three-element array antenna apparatus 100A, an impedance matching state of 50 Ω is substantially maintained before and after the reverse bias voltages $V_1$ and $V_2$ applied to the respective varactor diodes 61 and 62 are switched over. By contrast, as indicated by a triangle shown in FIG. 37, in the two-element electronically steerable passive array radiator antenna apparatus which makes an impedance matching of 50 Ω on a larger reverse bias voltage $V_H$ side, the input impedance $Z_i$ is changed up to 39.4-j4.26 [Ω] (an inverted triangle shown in FIG. 37) when the reverse bias voltage is switched over to a smaller reverse bias voltage $V_L$. The three-element array antenna apparatus 100A is characterized in that the antenna input impedance is constant before and after the switching, which fact can be confirmed by the experiment.

Next, measurement of a reactance diversity effect using the array antenna apparatus 100A according to the fifth preferred embodiment and measurement results will be described.

Figure 38:
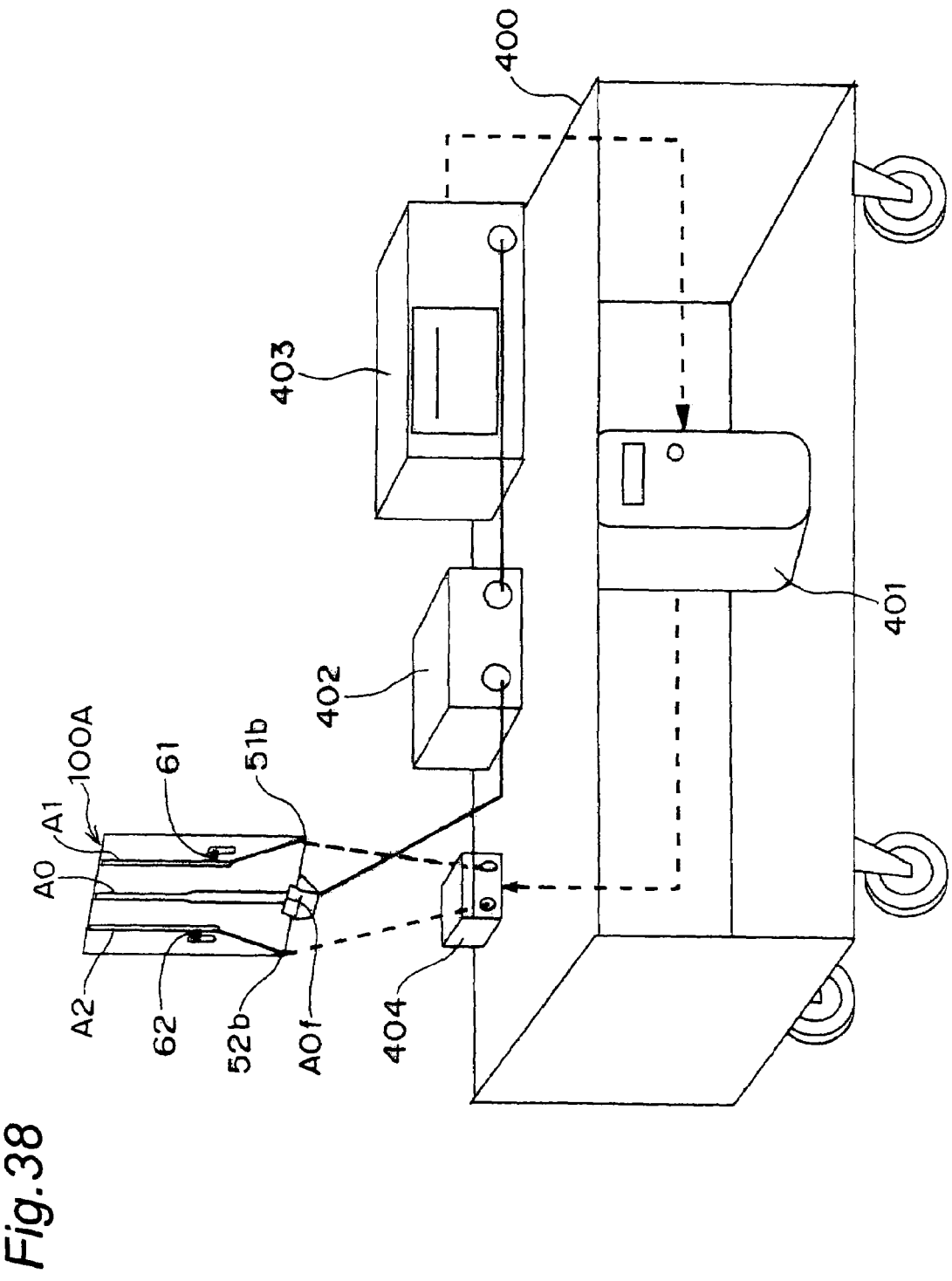
FIG. 38 is a perspective view showing a receiver-side measurement system which conducts an experiment to the array antenna apparatus 100A shown in FIG. 35.

FIG. 38 is a perspective view showing a receiver-side measurement system which conducts an experiment to the array antenna apparatus 100A shown in FIG. 35.

Referring to FIG. 38, the measurement system is constructed on a wheelie truck 400. The variable reactances of the array antenna apparatus 100A are switched over continuously at certain interval with moving the apparatus 100A in an experimental environment at a certain speed and measured, and this leads to obtaining measurement results in a fading environment. In the measurement system, a personal computer 401 which constitutes a main control section of the antenna controller 10 shown in FIG. 1, a preamplifier 402 of, for example, 8349B type (a gain of 20 dB) manufactured by Hewlett-Packard Development Company, a spectrum analyzer 403 of, for example, R3371A type manufactured by Advantest Corporation, a direct-current amplifier 404 having an amplification factor of 2.5, and the array antenna apparatus 100A are mounted on the wheelie truck 400.

A received radio signal output from the feeding point A0f of the three-element array antenna apparatus 100A is amplified by the preamplifier 402, and inputted to the spectrum analyzer 403. The spectrum analyzer 403 operates in a zero-span mode, fetches a voltage output proportional to a power strength of the received radio signal, and stores and records the fetched voltage output in a hard disk memory as provided in the personal computer 401 through an A/D converter board connected to the personal computer 401. The reactances of the apparatus are switched over by a D/A converter board connected to the personal computer 401 by switching the reverse bias voltages of the varactor diodes 61 and 62 between $V_H$ and $V_L$ synchronously with A/D conversion. In the present example, an output voltage of the D/A converter board is a maximum of 10 [V]. Therefore, the output voltage is multiplied by 2.5 by the direct-current amplifier 404, and connected to the varactor diodes 61 and 62 on the three-element array antenna apparatus 100A. Switching is performed with a cycle of 1.5 milliseconds so that the measurement results before and after the switching over among the reactances can be considered to be obtained substantially simultaneously with a moving speed of the measurement system shown in FIG. 38. The value is determined with reference to study results of a random field measurement method using a space diversity antenna and an RF switch (See, for example, the fifth and sixth non-patent documents).

Figure 39:
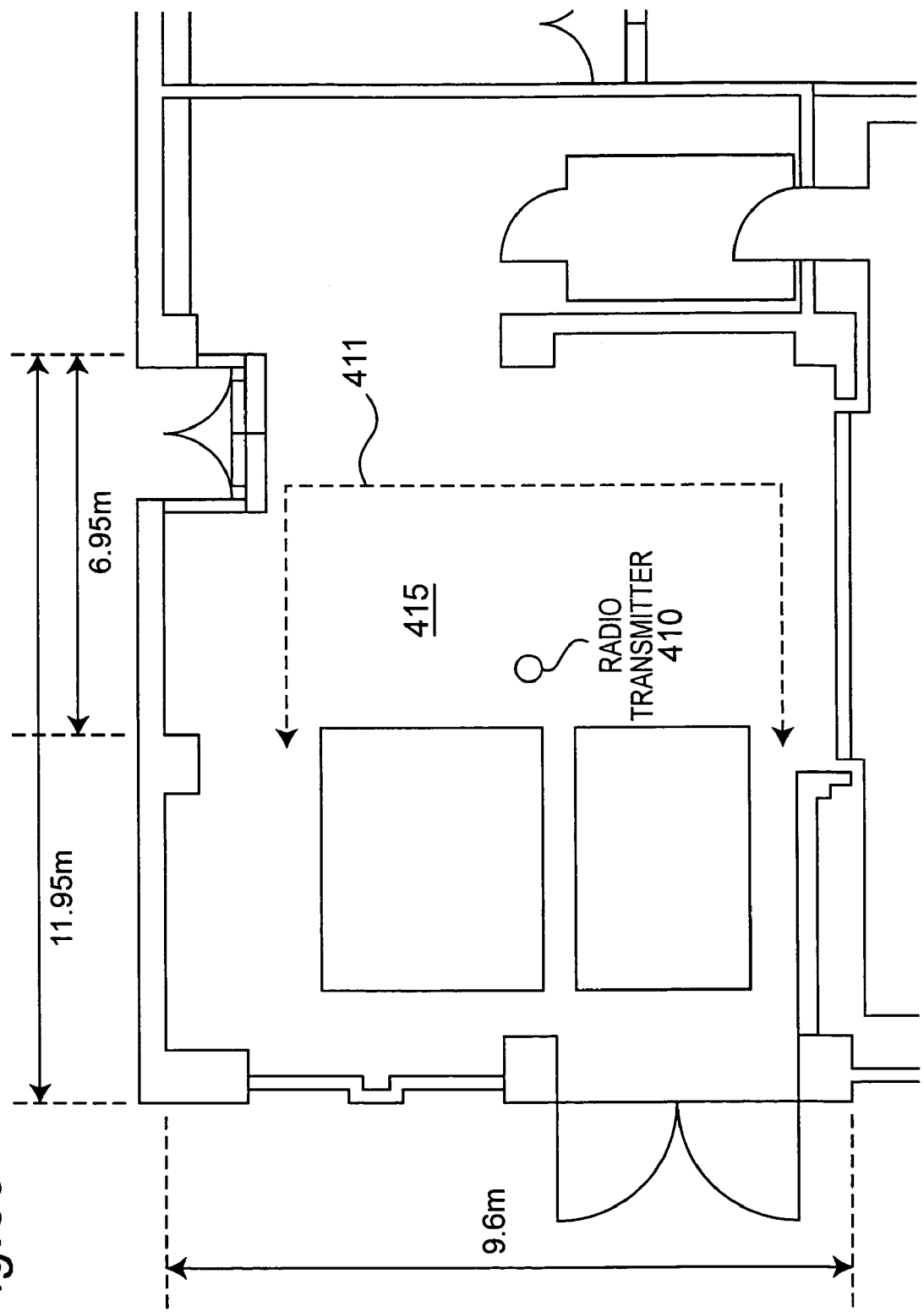
FIG. 39 is a plan view showing layout of the experimental environment of the array antenna apparatus 100A shown in FIG. 35.

FIG. 39 is a plan view showing layout of the experimental environment of the array antenna apparatus 100A shown in FIG. 35. As shown in FIG. 39, measurement is conducted by moving the receiver-side measurement system shown in FIG. 38 at a constant speed along with dotted line 411. On other hand, a radio transmitter 410 at 5.2 GHz is provided in the center of a room 415. An installation height of the array antenna apparatus 100A is set to 1.2 m both on transmitting and receiving sides.

Figure 40:
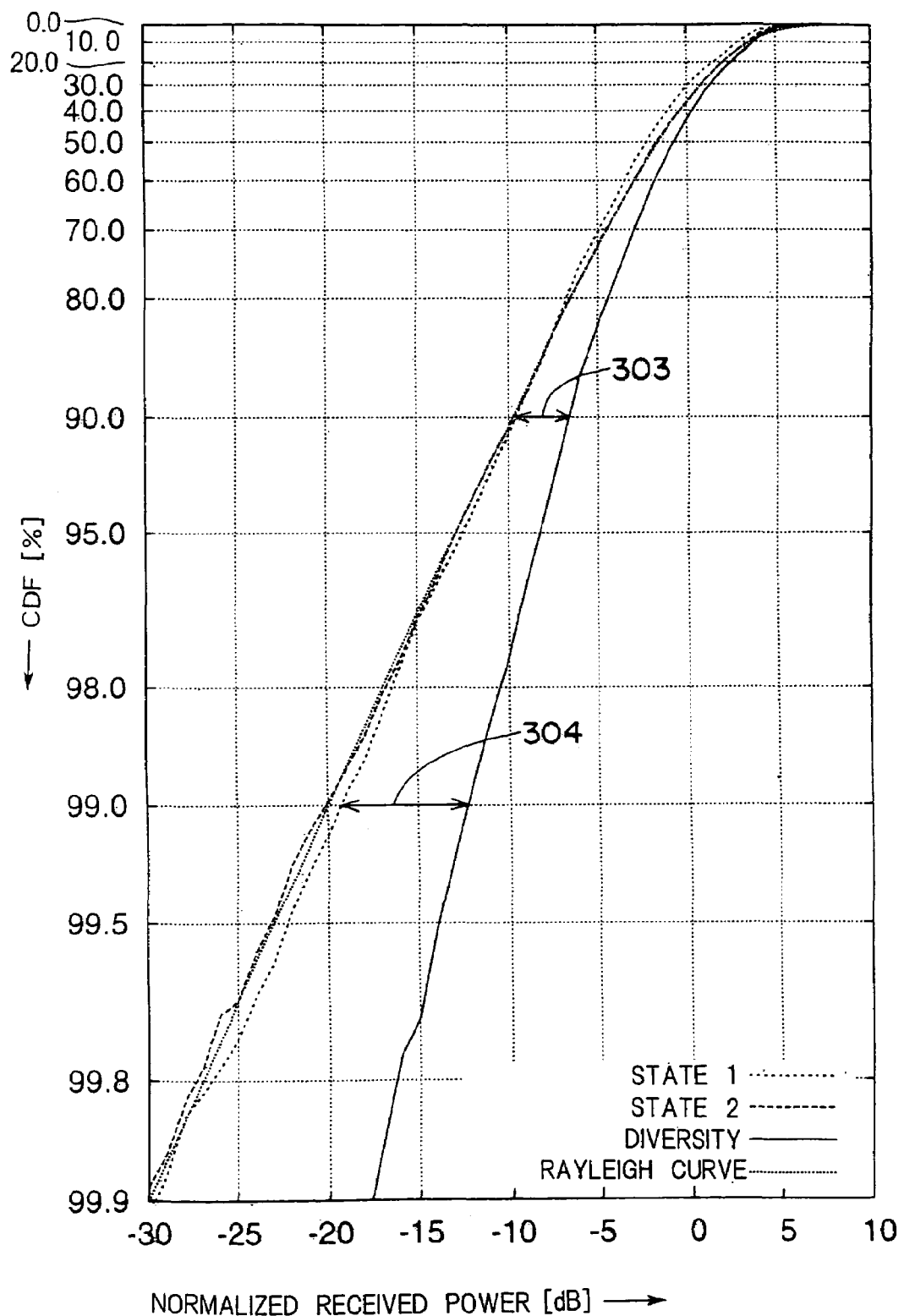
FIG. 40 is a graph of CDF relative to normalized received power, showing results of experiment as conducted to the array antenna apparatus 100A shown in FIG. 35, and showing a diversity gain.

FIG. 40 is a graph of CDF relative to normalized power, showing results of the experiments as conducted to the array antenna apparatus 100A shown in FIG. 35, and showing a diversity gain. The experimental results shows a CDF curve relative to the normalized received power [dB] as derived from the measurement results in the experimental environment shown in FIG. 39. The CDF on a vertical axis indicates a cumulative probability as obtained when the received power of the three-element array antenna apparatus 100A is larger than the value on a horizontal axis. The states 1 and 2 are cumulative probability distribution curves when the reverse bias voltages V1 and V2 applied to the varactor diodes 61 and 62 as connected to the parasitic elements A1 and A2 are (V1, V2)=(0, 25) [V] and (V1, V2)=(25, 0) [V]. A cumulative probability distribution curve obtained by selecting and combining the curves, i.e., by selecting the larger received power at the switching over among the reverse bias voltages is indicated by a solid line (diversity).

The results of the states 1 and 2 are substantially along a Rayleigh curve shown in FIG. 40, so that it is estimated that the experimental environment shown in FIG. 39 is a fading environment less influenced by direct waves. A diversity ability of the three-element array antenna apparatus 100A is estimated based on a difference in received power between a case in which diversity is performed and a case in which diversity is not performed, i.e., based on the diversity gain. As is apparent from FIG. 40, a comparison made at the cumulative probability distribution (CDF) of 90% indicates that a diversity gain 303 of about 4 dB is obtained by diversity receiving and that the received power is improved. At the CDF of 99% as obtained when the fading is deeper, a diversity gain 304 of about 7 dB is obtained.

As mentioned above, the reactance diversity by the three-element array antenna apparatus 100A is proposed and the reactance diversity is confirmed by the experiment. It is proven from the prototype that the plane three-element array antenna apparatus 100A can be constructed by the dielectric substrate 20a and the two varactor diodes 61 and 62. This indicates that the plane three-element array antenna apparatus 100A can be packaged at a low cost. Further, as mentioned above, it is confirmed by the experiment that the input impedance of the three-element array antenna apparatus 100A is constant before and after switching. As a result of measuring the diversity gain, the diversity gain of about 7 dB can be obtained at the CDF of 99%. Besides, it is confirmed by the experiment that the diversity receiving of the plane three-element array antenna apparatus 100A exhibits a multipath fading resisting ability.

Sixth Preferred Embodiment

Figure 41:
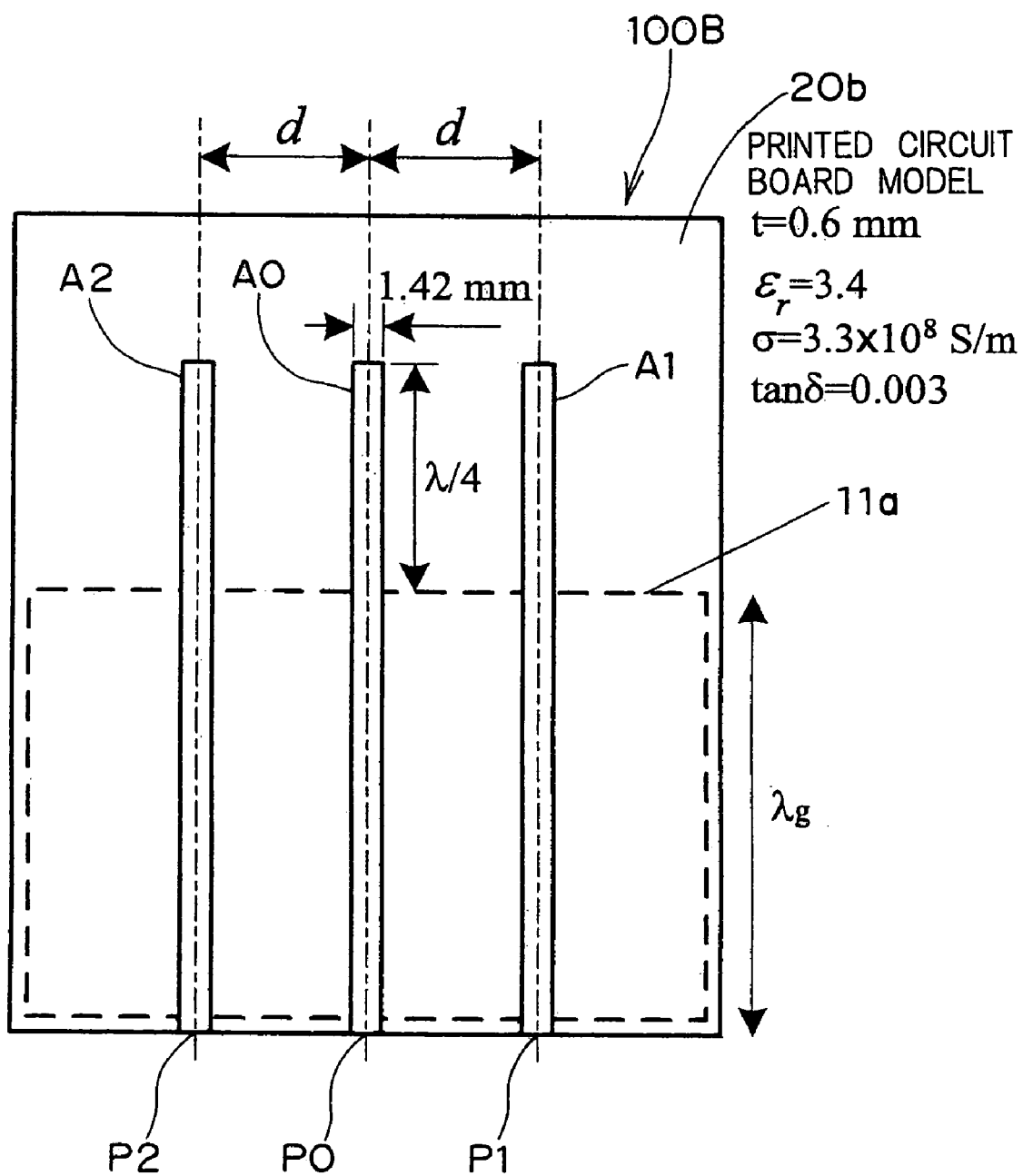
FIG. 41 is a plan view showing an array antenna apparatus 100B according to a sixth preferred embodiment of the present invention.

FIG. 41 is a plan view showing an array antenna apparatus 100B according to a sixth preferred embodiment of the present invention. The array antenna apparatus 100B according to the sixth preferred embodiment is different from the array antenna apparatus shown in FIG. 9 in the following respects:

(1) A dielectric substrate 20b which shows substrate data in FIG. 41 is provided in place of the dielectric substrate 20.

(2) A vertical length of a grounding electrical conductor 11a is set to λg. The length λg is an effective wavelength obtained from a dielectric constant ∈r of the dielectric substrate 20b.

In FIG. 41, t denotes a thickness of the dielectric substrate 20b, ∈r denotes the dielectric constant of the dielectric substrate 20b, and σ denotes a conductivity of a conductor formed on the dielectric substrate 20b.

A controller for the array antenna apparatus 100B employed in the present preferred embodiment is constituted in a manner similar to that of FIG. 1. The varactor diodes are mounted, as variable reactance elements 12-1 and 12-2, to parasitic elements A1 and A2, respectively. Loaded reactances are negative if only the varactor diodes are provided. Due to this, in order to make even inductivity variable, inductors are connected either in series or in parallel if it is necessary to do so. The array antenna apparatus 100B is constituted to exchange direct-current bias voltage applied to the respective varactor diodes by the controller 10 shown in FIG. 1. That is, the loaded reactances $(x_1, x_2)$ are switched over to one of the two sets $(x_1, x_h)$ or $(x_h, x_1)$, and this leads to change of a directivity of the array antenna apparatus 100B. In the present preferred embodiment, each loaded reactance which determines the directivity of the array antenna apparatus 100B is referred to as "branch reactance". Accordingly, two directivities determined by the reactance constants $x_h$ and $x_1$ are "diversity branches". According to the constitution of the present preferred embodiment, since an antenna impedance is not changed by switching, the antenna impedance matching can be made by a fixed constant circuit.

In the present preferred embodiment, the reactances are switched over based on an algorithm for antenna switching diversity (See, for example, the seventh non-patent document) or an algorithm for antenna selection diversity (See, for example, the eighth and ninth non-patent documents) which switches the antenna with single receiving circuit. It is assumed hereafter that the latter algorithm is employed for control over the array antenna apparatus. Generally speaking, when diversity branches are switched over in an antenna system of a radio receiver, a phase of a received radio signal is discontinuous, so that a bit error between at least one to two symbols occurs. In order to avoid this, the "branch reactances" are switched over to binary values of $x_1$ and $x_h$ in a preamble interval provided in a leading part of a received frame or slot. The branch reactances are fixed to a side on which RSSI (Receive Signal Strength Indication; the value represents a numeric representation of a strength of the received radio wave signal) is larger, and a slot in the data interval is received. Therefore, if fading is sufficiently slow relative to a slot length, an equivalent characteristic for that of post-wave-detection selection and combination diversity can be obtained.

The calculator simulations using the array antenna apparatus 100B according to the present preferred embodiment or the like and results of the simulations will be next described. In the present calculator simulations, a bit error rate characteristic of the array antenna apparatus in reactance diversity receiving in a multipath propagation environment is estimated by the calculator simulation. Data as obtained in the calculator simulations are shown in Table 1 below.

TABLE 1

SIMULATION DATA

| | |
|---|---|
| Number of elements | 3 |
| Element interval | $d = 0.1 \lambda$ |
| Number of incident waves | 8 |
| Direction of incident waves | Uniform distribution (for 0 to $2\pi$) |
| Amplitude of incident waves | Rayleigh distribution |
| Phase of incident waves | Uniform distribution (for 0 to $2\pi$) |
| Fading | Flat and low velocity relative to frequency |

In the calculator simulation, the following two antenna models are employed.

(1) A monopole antenna apparatus (referred to as an infinite grounding substrate model hereinafter), which is provided on an infinite grounding substrate, and of a cylindrical shape having a radius which is one-hundredth of a wavelength.

(2) The array antenna apparatus 100B (referred to as a printed circuit board model hereinafter) which is the three-element electronically steerable passive array radiator antenna apparatus formed on the dielectric substrate 20b including a high-frequency double-sided printed circuit board at a thickness t of 0.6 mm shown in FIG. 41 (referred to as a printed circuit board hereinafter). Microstrip lines including strip electrical conductors are formed on the dielectric substrate 20b, and a tip end of each microstrip line extends in an upward direction from a position on a top edge of the grounding electrical conductor 11a by $\lambda/4$ (where $\lambda$ denotes a free space wavelength). A measurement frequency is set to 5.2 GHz. A line width of each microstrip line is set so that a characteristic impedance of the strip electrical conductor is 50 [$\Omega$]. It is, therefore, assumed that ports P0, P1, and P2 on lower ends of the respective elements A0, A1, and A2 and portions of the respective elements A0, A1 and A2 that constitute monopole elements, located on the top edge of the grounding electrical conductor 11a are substantially equal in current carried across them.

Figure 42:
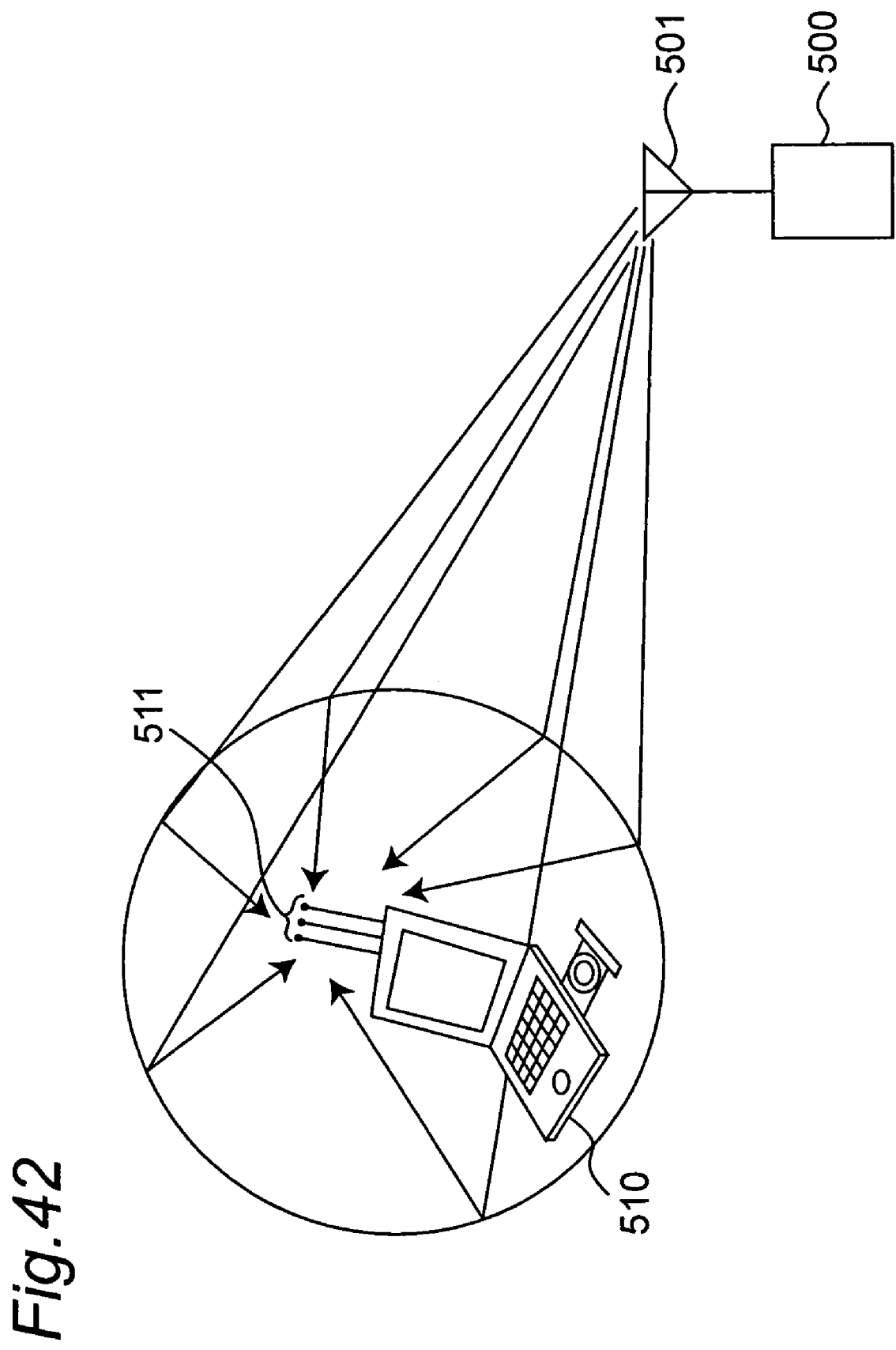
FIG. 42 is a perspective view showing a propagation model employed in calculator simulations of the array antenna apparatus 100B shown in FIG. 41.

In the calculator simulation, it is assumed that a mobile station performs reactance diversity receiving, and that a propagation path is a Jakes model shown in FIG. 42. In other words, M elementary waves arrive at random each from an azimuth (DOA) $\phi$. It is assumed that DOAs of the respective elementary waves are uniformly distributed at 0-$2\pi$, and phases and amplitudes of the respective elementary waves are uniformly distributed as Rayleigh distribution. It is assumed herein that $h_m$ and $\phi_m$ denote a transmission function and DOA of an m-th elementary wave. The transmission function of the elementary wave is relative to a position of the radiating element A0. If the phases and the amplitudes of the respective elementary waves are given, the transmission function until the wave is inputted to a receiving circuit serves as a function of the directivity and branch reactance of the electronically steerable passive array radiator antenna apparatus, which function is generally represented by the following equation when the number of elementary elements is N+1:

$$h(x_1, x_2, \ldots x_N) = \sum_{m=1}^{M} D(\phi_m) h_m = \sum_{m=1}^{M} h_m w^T a(\phi_m). \quad (27)$$

In other words, an absolute value of a transmission function $h(x_1, x_h)$ is compared with that of a transmission function $h(x_h, x_1)$, the transmission function having a greater absolute value is selected, and the selected function is set a function indicating the amplitude of the received signal. An additive white Gaussian noise (AWGN) is assumed as a thermal noise input to the receiver. Providing that a power density of the AWGN is $N_0$, an instantaneous signal-to-noise power ratio ($E_b/N_0$) relative to a fading change is obtained. It is assumed herein that BPSK is adopted as a modulation system, and demodulation is performed by delay detection, a bit error rate (referred to as a BER hereinafter) Pc is represented by the following equation (See, for example, the tenth non-patent document):

$$P_e = \frac{1}{2} e^{-\gamma}. \quad (28)$$

In the equation (28), $\gamma$ is represented by the following equation (29).

$$\gamma = E_b/N_0 \quad (29).$$

In the present calculator simulations, the transmission function $h_m$ and the $\phi_m$ of each elementary wave are generated by random numbers per received slot (frame), the transmission function $h(x_1)$ and the transmission function $h(x_h)$ or the transmission function $h(x_1, x_h)$ and the transmission function $h(x_h, x_1)$ are obtained, and the BER per received slot is calculated according to the equation (28). In other words, it is assumed that each slot has no fading change, and that fading is sufficiently slow relative to a slot length.

The calculation of an equivalent weight vector will be next described. First of all, the equivalent weight vector w is calculated according to the equations (19) and (20). As respective elements of an admittance matrix Y, the following values calculated from the element shape and constellation shown in the Table 1 by a moment method are used.

(1) Respective elements of the admittance matrix in case of the infinite grounding substrate model:

$$y_{00} = 8.843 \times 10^{-4} - j4.389 \times 10^{-2},$$

$$y_{01} = y_{02} = 1.545 \times 10^{-3} - j2.390 \times 10^{-2},$$

$$y_{11} = y_{22} = 9.882 \times 10^{-3} - j2.663 \times 10^{-2}, \text{ and}$$

$$y_{12} = 8.994 \times 10^{-4} - j8.776 \times 10^{-4} \quad (30).$$

(2) Respective elements of the admittance matrix in case of the printed circuit board model:

$$y_{00}=7.920\times10^{-4}-j1.383\times10^{-2},$$

$$y_{01}=y_{02}=6.275\times10^{-4}+j6.212\times10^{-3},$$

$$y_{11}=y_{22}=3.841\times10^{-3}-j8.665\times10^{-3}, \text{ and}$$

$$y_{12}=4.250\times10^{-4}+j6.770\times10^{-4} \tag{31}$$

Figure 43:
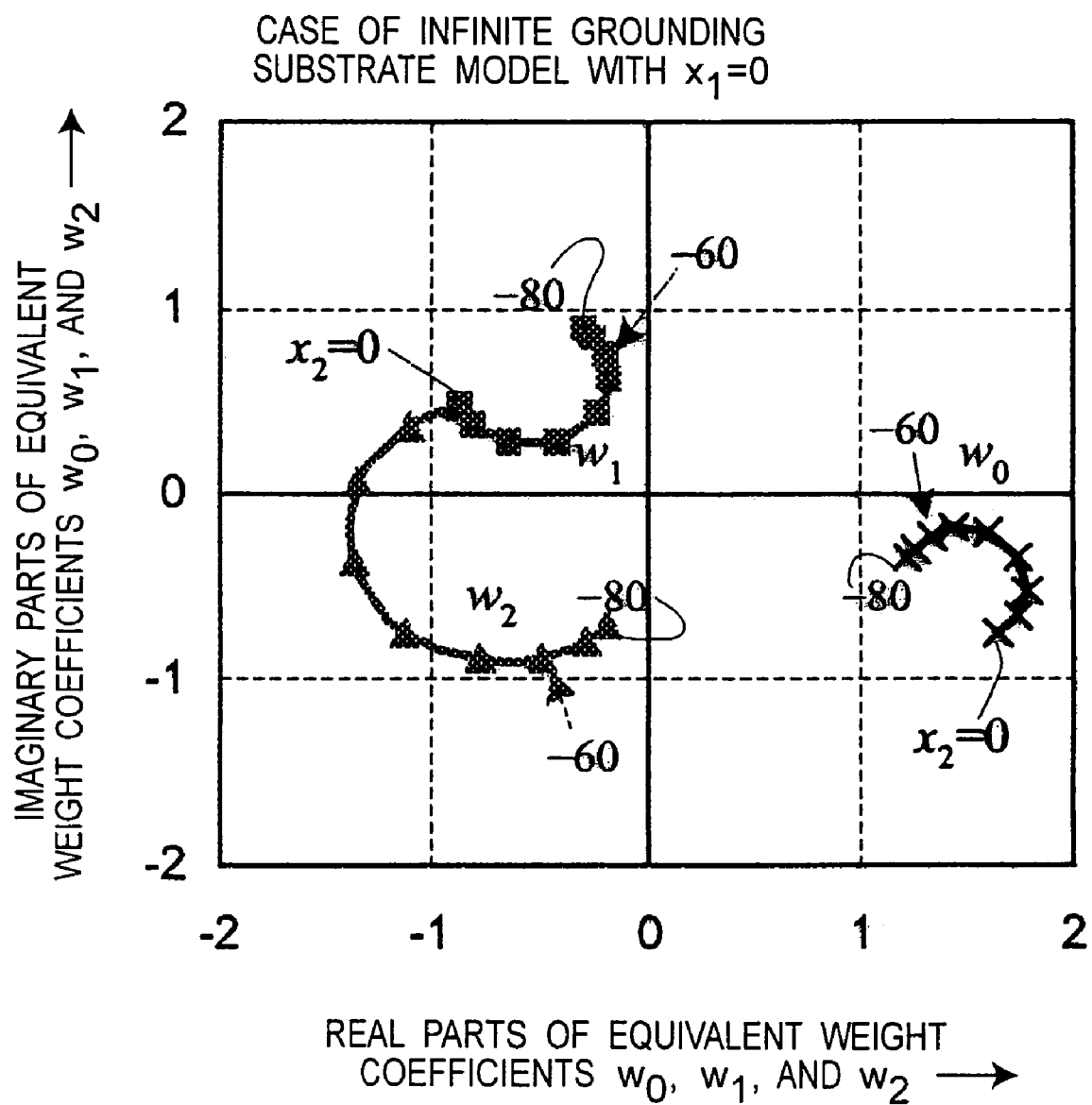
FIG. 43 is a graph showing results of the calculator simulations of the array antenna apparatus 100B shown in FIG. 41, and showing a complex plane of equivalent weight coefficients $w_0$, $w_1$, and $w_2$ when a reactance $x_2$ is changed using an infinite grounding substrate in the case of a reactance $x_1=0$.
Figure 44:
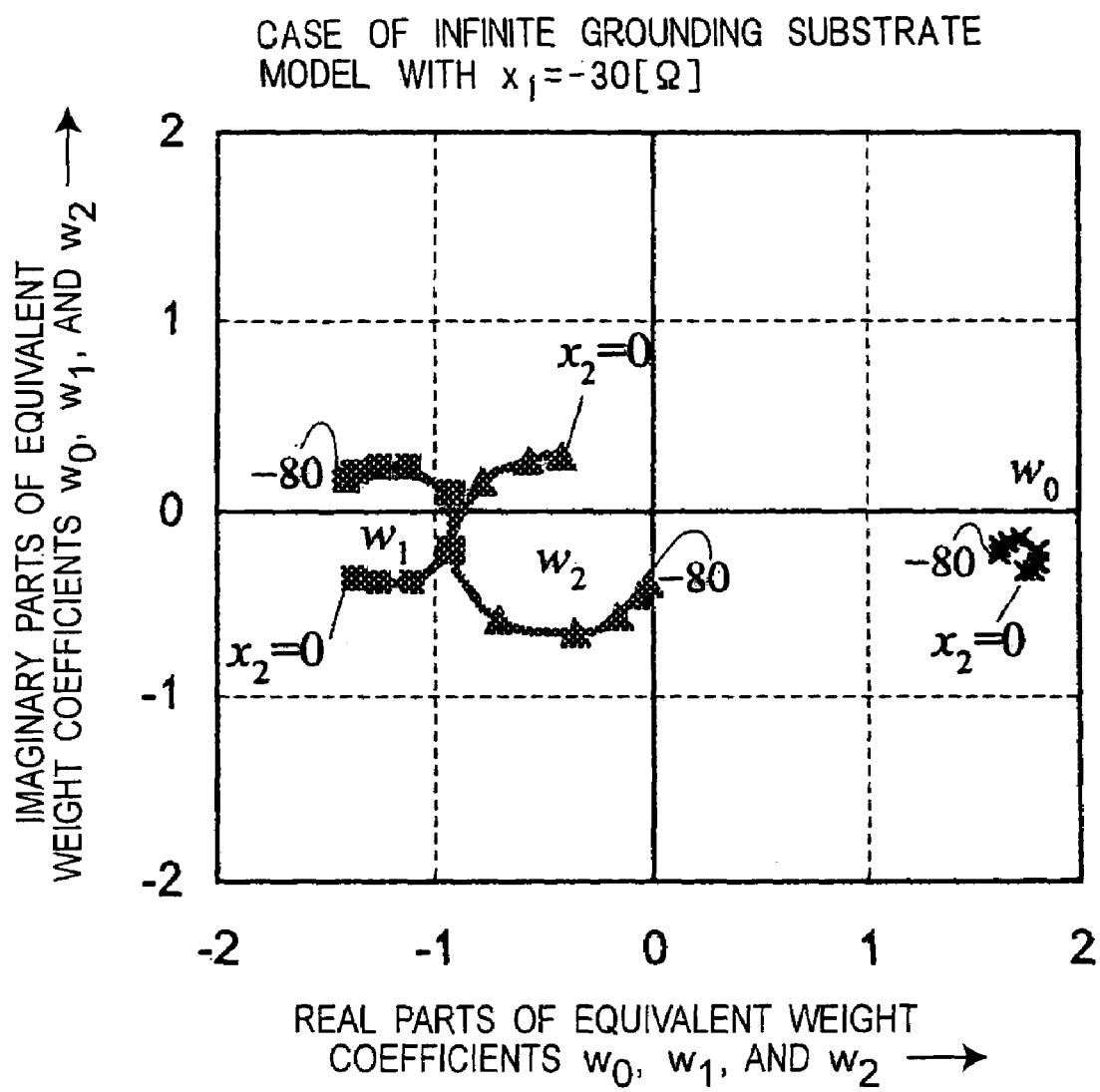
FIG. 44 is a graph showing results of the calculator simulations of the array antenna apparatus 100B shown in FIG. 41, and showing a complex plane of the equivalent weight coefficients $w_0$, $w_1$, and $w_2$ when the reactance $x_2$ is changed using the infinite grounding substrate at the reactance $x_1=-30$ [$\Omega$]
Figure 45:
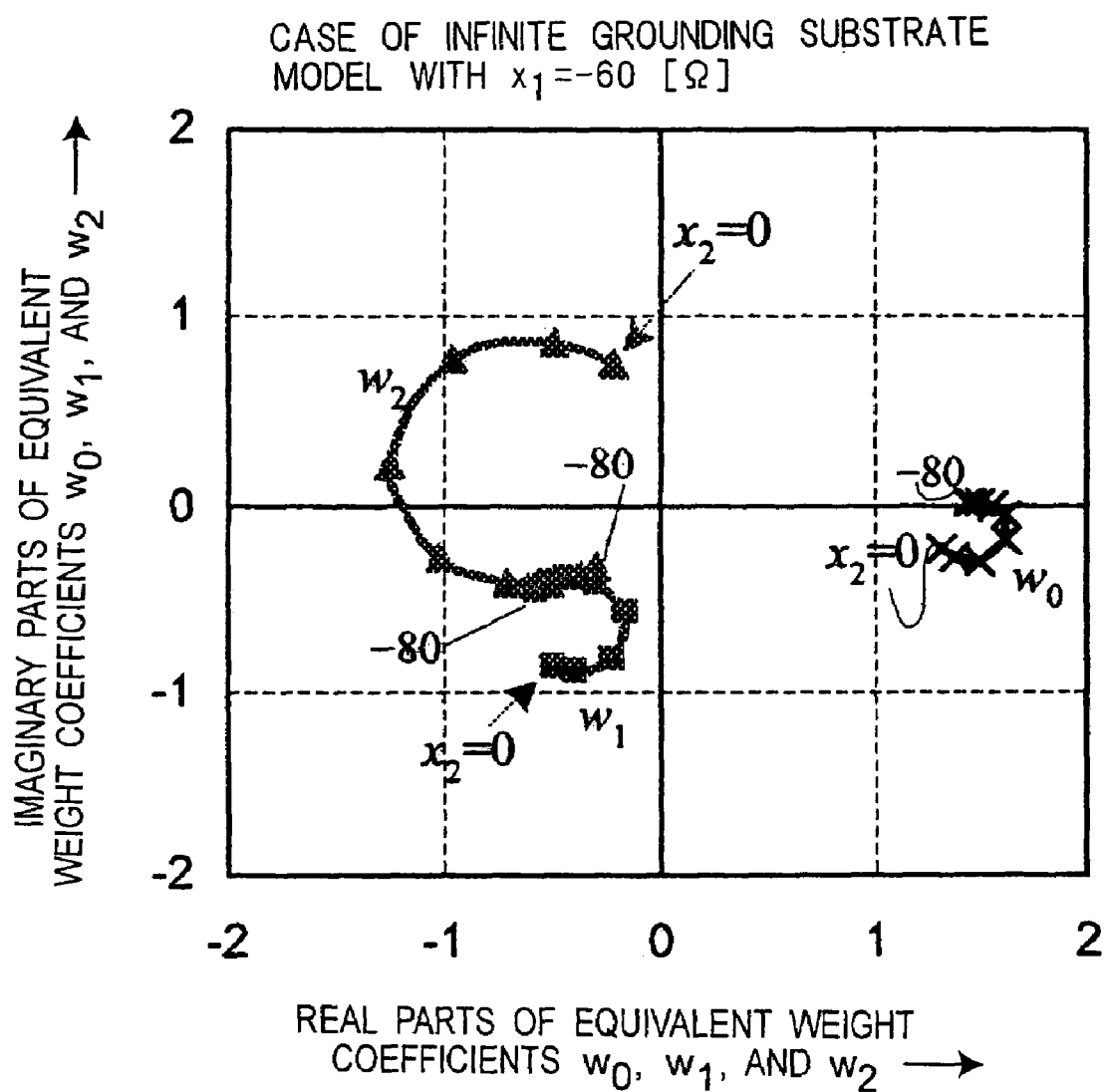
FIG. 45 is a graph showing results of the calculator simulations of the array antenna apparatus 100B shown in FIG. 41, and showing a complex plane of the equivalent weight coefficients $w_0$, $w_1$, and $w_2$ when the reactance $x_2$ is changed using the infinite grounding substrate at the reactance $x_1=-30$ [$\Omega$]
Figure 46:
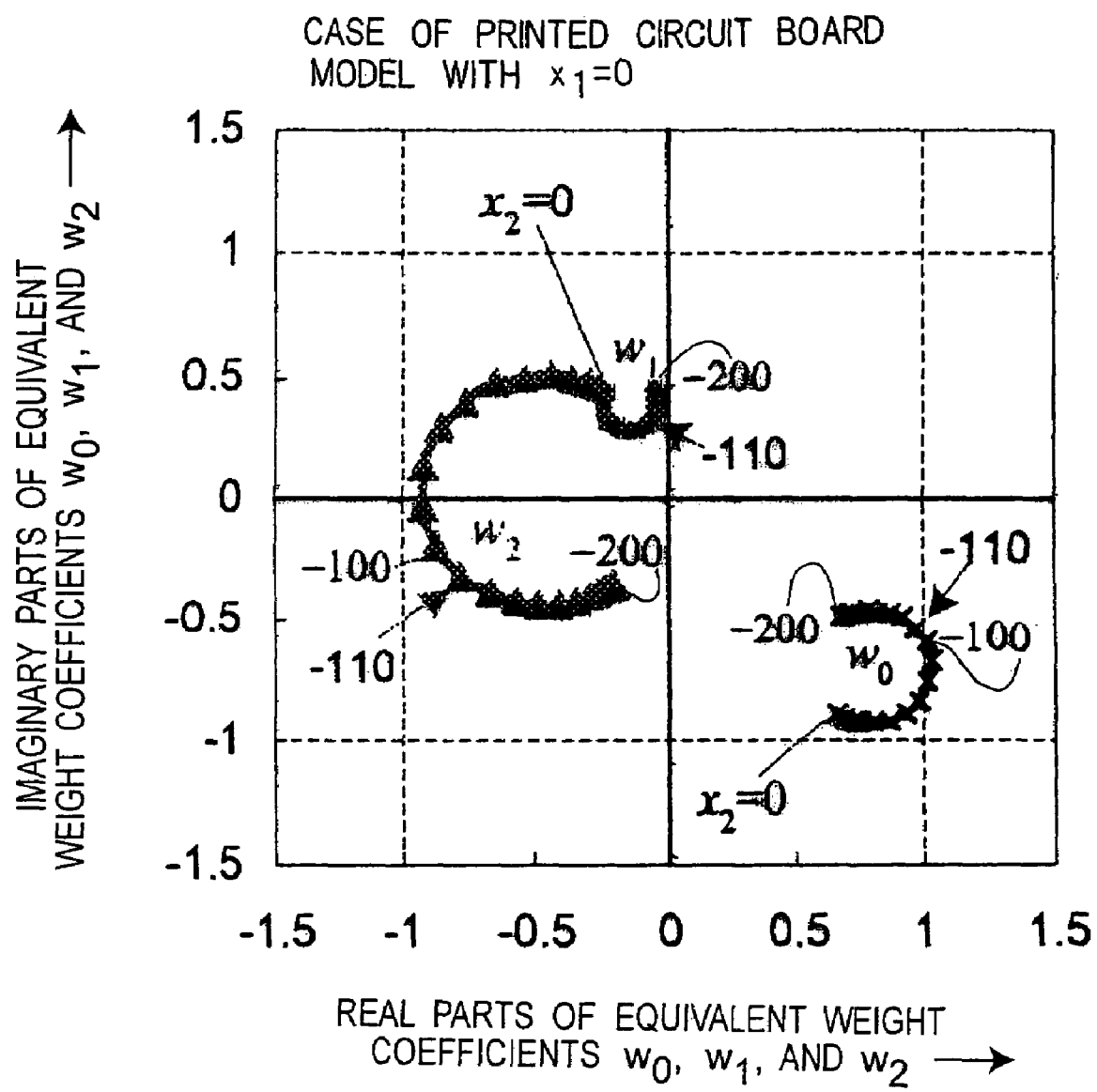
FIG. 46 is a graph showing results of the calculator simulations of the array antenna apparatus shown in FIG. 41, and showing a complex plane of equivalent weight coefficients vectors $w_0$, $w_1$, and $w_2$ when the reactance $x_2$ is changed using a printed circuit board in the case of a reactance $x_1=0$.
Figure 47:
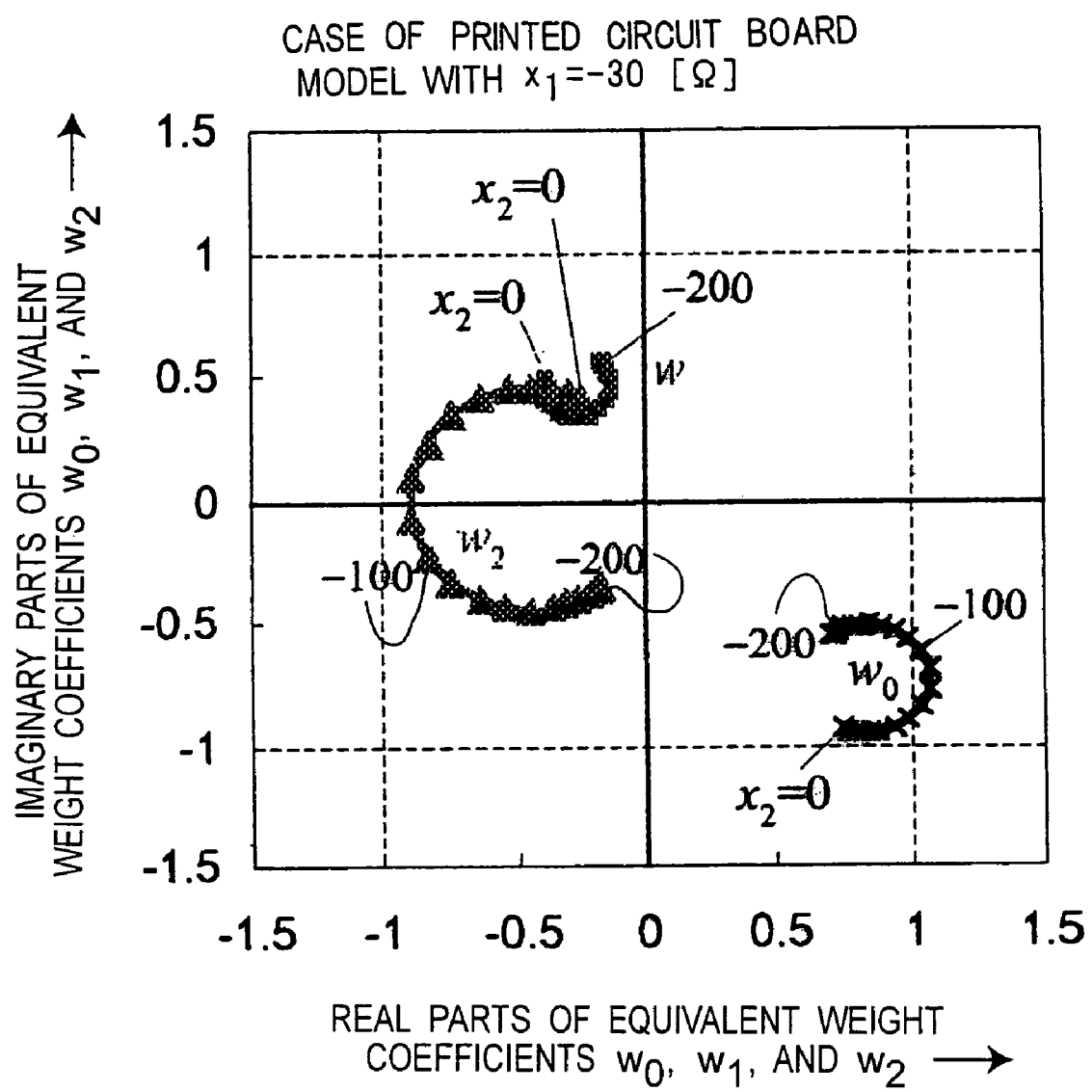
FIG. 47 is a graph showing results of the calculator simulations of the array antenna apparatus 100B shown in FIG. 41, and showing a complex plane of the equivalent weight coefficients $w_0$, $w_1$, and $w_2$ when the reactance $x_2$ is changed using the printed circuit board at the reactance $x_1=-30$ [$\Omega$]
Figure 48:
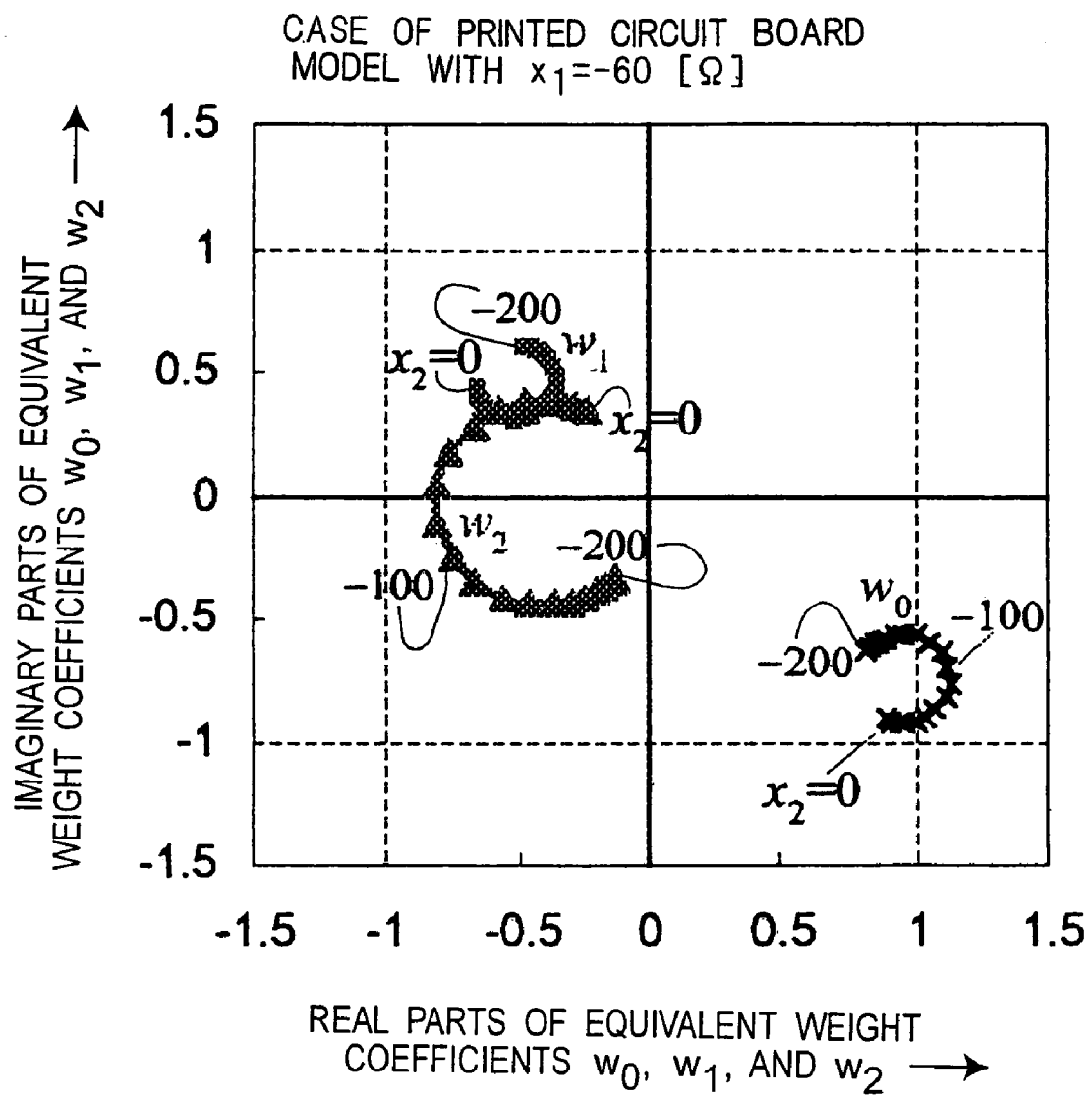
FIG. 48 is a graph showing results of the calculator simulations of the array antenna apparatus 100B shown in FIG. 41, and showing a complex plane of the equivalent weight coefficients $w_0$, $w_1$, and $w_2$ when the reactance $x_2$ is changed using the printed circuit board at the reactance $x_1=-60$ [$\Omega$]

A unit of the elements is S (siemens, $\Omega^{-1}$), and $y_{mn}$ indicates an element in (m+1) rows by (n+1) columns in the admittance matrix Y. For the equivalent weight vector w thus obtained, loci when the reactance $x_1$ or $x_2$ is changed in case of the infinite grounding substrate model are shown by FIGS. 43 to 45, and those for the printed circuit board model are shown by FIGS. 46 to 48. In the former case, i.e., the infinite grounding substrate model, the following equation is satisfied:

$$(w_0 w_1) = w^T \tag{32}$$

In the latter case, i.e., the printed circuit board model, the following equation is satisfied:

$$(w_0 w_1 w_2) = w^T \tag{33}$$

According to the first non-patent document, mapping from the reactance $x_1$ or $x_2$ to the equivalent weight vector $w_0 w_1$ or $w_2$ is a bilinear transform. Therefore, the loci of the equivalent weight vectors are all circles, and rotation directions of the weight vectors when reducing the reactance $x_1$ or $x_2$ are all semi-clockwise direction. In FIGS. 43 to 45, for the reactance $x_2$, equivalent weight vectors are plotted from 0 to −80 Ω at an interval of 10 Ω.

Figure 49:
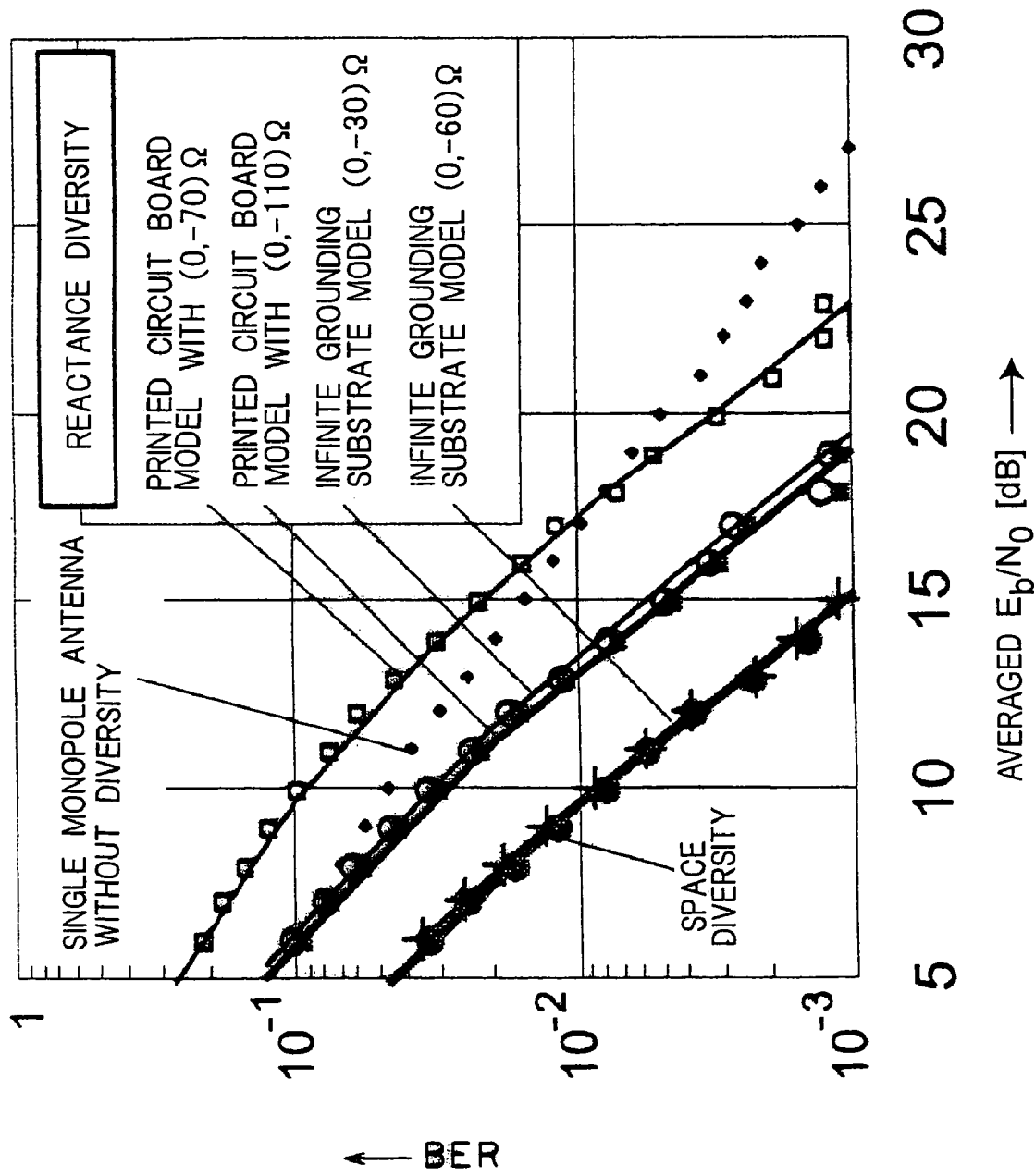
FIG. 49 is a graph showing results of the calculator simulations of the array antenna apparatus 100B shown in FIG. 41 or the like, and showing a bit error rate (BER) during reactance diversity receiving relative to an averaged signal-to-noise power ratio (averaged $E_b/N_0$)

BER characteristics will be next described. Using the obtained equivalent weight vectors w, the calculator simulations are performed in the above-mentioned conditions. FIG. 49 shows obtained BER characteristics. For comparison, BER characteristics when space diversity is performed using infinite grounding substrate models (monopole antennas) provided to be sufficiently distant from each other (at an interval of 10 λ) to make ideal impedance matching, and BER characteristics without diversity using a single monopole antenna are also shown in FIG. 49. As for the infinite grounding substrate model, a case in which branch inductances $(x_h, x_1)$ are (0, −30) [Ω] and a case in which branch inductances $(x_h, x_1)$ are (0, −60) [Ω] are shown. As for the printed circuit board model, a case in which branch inductances $(x_h, x_1)$ are (0, −70) [Ω] and a case in which branch inductances $(x_h, x_1)$ are (0, −110) [Ω] are shown. These equivalent weight vectors are indicated by arrows in FIG. 43. The infinite grounding substrate model having the branch inductances (0, −60) [Ω] exhibits the best characteristic, which characteristic is substantially coincident with that of the monopole antenna that performs space diversity. The printed circuit board model having the branch inductances (0, −110) [Ω] exhibits the best characteristic, which characteristic is deteriorated from the characteristic when performing the space diversity by about 3 dB at the BER of $10^{-3}$.

Based on these results, it is considered that the equivalent weight vectors are preferably set to be distant from each other on a complex plane between diversity branches so as to obtain a high diversity gain. Accordingly, in the design of the reactance diversity, the branch reactances may be set so that the correspondent equivalent weight vectors are distant from each other on the complex plane. As is apparent from FIGS. 43 to 45, combinations of the branch reactances (0, −60) and (60, 0) [Ω] satisfy the above-mentioned criterion. On the other hand, the printed circuit board model has a deterioration of about 3 dB. However, since one of factors for the deterioration is impedance mismatching, the characteristic of the printed circuit board model can be easily improved by a simple matching circuit. The equivalent weight vector $w_0$ of the radiating element A0 is obtained by normalizing a current carried across the element A0 by a current carried during the impedance matching. Therefore, the further the equivalent weight vector $w_0$ is from $w_0 = 1+j0$, the more the VSWR is increased. In this case, the gain is reduced by an amount [dB] represented by the following equation:

$$10 \log(2\text{Re}[w_0] - |w_0|^2) \tag{34}$$

According to the equation (34), the gain reduction for $(x_1, x_2) = (0, -110)$ [Ω] ($w_0 = 0.97 - j0.53$) is 1.5 dB. Therefore, when an appropriate impedance matching circuit is provided, the deterioration of the printed circuit board model as compared with the space diversity model is remaining 1.5 B, and the diversity gain is 10.5 dB at the BER of $10^{-3}$.

On the other hand, the BER characteristic curves shown in FIG. 49 are substantially parallel to the BER characteristic curve of the space diversity model. This indicates that a correlation of diversity branches is substantially zero. Therefore, the remaining deterioration of 1.5 dB indicates that an averaged gain (a gain obtained by averaging power gains at all azimuths) is about 0.7 relative to an ideal monopole antenna. This is considered to be cause by the dielectric loss tan δ and the loss due to the conductivity of the dielectric substrate 20b, and by imperfection of the analysis model. In other words, the analysis mentioned above is performed on assumption (approximation) that the currents carried across the respective ports P0, P1, and P2 are equal to the current of the element feeding portion of the monopole antenna (the top edge of the grounding electrical conductor 11a). Actually, however, the currents normally are different from each other due to the mutual influence of the three strip lines.

Therefore, the criterions of the design of the reactance diversity can be summarized as follows.

(1) The diversity branches (two directivities to be switched over) are set so that equivalent weight vectors are distant from each other on the complex plain. In other words, the diversity branches are set so that the distance between the diversity branches on the complex plane is the largest.

(2) If the equivalent weight vector $w_0$ of the radiating element A0 is set close to $1+j0$, it is possible to dispense with the impedance matching circuit between the antenna apparatus and the feeding cable.

The design criterion (1) is obtained from the simulations in predetermined conditions, so that a universal design criterion needs to be more studied theoretically. Nevertheless, if the equivalent weight vectors are closer among the diversity branches, then the directivities of the diversity branches are closer, as well. Therefore, obviously, a receiving level correlation of the branches is larger, resulting in reduction in diversity gain. As a consequence, the design criterion (1) is at least the requisite criterion.

The characteristic of the antenna apparatus in binary reactance diversity receiving for switching the reactances between two states, and the reactance setting criterions have been described above. The BER of the multipath propagation model in the Rayleigh fading environment has been estimated by the calculator simulation. As a result, the monopole antenna as the infinite grounding substrate model constituted so that the element interval is 0.1 wavelength and the three elements are provided has a diversity gain of 12 dB. The monopole antenna as the printed circuit board model has a diversity gain of 10.5 dB. Further, the design criterions of the reactance diversity have been considered. As a result, it is shown that the correlation in equivalent weight vector among the reactance branches and the equivalent weight vector of the feeding element, i.e., the impedance matching are important.

Appendix

Using theoretical analysis described in the eleventh non-patent document, the relationship between the loaded reactance, that is, branch reactance and the equivalent weight vector will be theoretically described. First of all, the equation (20) is reduced for the equivalent weight vector w using Cramer's Formula as follows:

$$w_k = \frac{\det(v_0 v_1 \ldots v_{k-1} 2z_s u_0 v_{k+1} \ldots v_N)}{\det V}. \tag{35}$$

In the equation (35), V is represented by the following equation.

$$V = Y^{-1} + X = (v_0\ v_1\ v_2 \ldots v_N), \text{ where } 0 \leq k \leq N \tag{36}$$

Next, a conformal characteristic will be described. Mapping from a reactance $x_k$ to equivalent weight vectors $w_k$ and $w_i$ when all reactances $x_i$ are fixed, in which $i \neq k$ ($0 \leq i \leq N$), is a bilinear transform and conformal mapping. This will be verified as follows.

In a certain matrix V, only a diagonal element in the (k+1)-th row by the (k+1)-th column includes the reactance $x_k$. When a denominator det(V) of the equation (18) is expanded for the (k+1)-th column, the following equation is obtained:

$$\det V = (z_{kk} + jx_k)\det V_{k+1k+1} + \sum_{i=0, \neq k}^{N} (-1)^{i+k} z_{ik} \det V_{i+1k+1}, \tag{37}$$

where $V_{mn}$ denotes a matrix obtained by removing the m-th row and the n-th column from the matrix V, and $z_{mn}$ denotes an element in the m-th row by the n-th column of an admittance matrix $Y^{-1}$. Accordingly, a term that includes the reactance $x_k$ is only the first term on a right member and the term is a linear equation for the reactance $x_k$. In a manner similar to above, the term is a Linear equation for every reactance $x_i$. Further, when a numerator of the equation (18) is expanded for the (k+1)-th column, the following equation (38) is obtained and the equation (38) does not include the reactance $x_k$:

$$\det(v_0 v_1 \ldots v_{k-1} 2z_s u_0 v_{k+1} \ldots v_{N-1}) = (-1)^{k+2} 2z_s \det V_{1k+1} \tag{38}$$

On the other hand, the term of the equation (38) is a linear equation for every $x_i$. In other words, the term is expressed by the following equation:

$$w_k = \frac{\text{Linear equation of } x_i (\text{for every } i \neq k)}{\text{Linear equation of } x_k \text{ and } x_i \text{ (for every } i \neq k)}. \tag{39}$$

Therefore, the equivalent weight vector $w_k$ is conformal and a bilinear transform from the reactance $x_k$, and also a bilinear transform from the reactance $x_i$. Accordingly, based on a property of the transform, a locus of the equivalent weight vector $w_k$ when a certain reactance is changed is a circle. When the reactance $x_k$ is changed with fixing the reactance $x_i$ ($0 \leq i \leq N-1$, $i \neq k$), the equivalent weight vector $w_k$ has a circular locus that passes an origin.

Next, commonality of a rotation angle of the locus of the equivalent weight vector $w_k$ will be described. As mentioned above, the denominator of the equation (35) is the linear equation of the reactance $x_i$ and common to every k. On the other hand, for $i \neq k$, the numerator is the linear equation of the reactance $x_i$. For i=k, the numerator does not include the reactance $x_i$. Therefore, the equivalent weight vector $w_k$ can be expressed by the following equation:

$$w_k = a_{ik} + \frac{b_{ik}}{jx_i + c_i}, \tag{40}$$

where $a_{ik}$, $b_{ik}$, and $c_i$ denote complexes determined by an inverse matrix $Y^{-1}$ of an admittance matrix, a signal source impedance $z_s$ and a loaded reactance $x_1$ ($i \neq 1$), and each complex does not include the reactance $x_i$. For k=i, in particular, $a_{ik}$=0. At this time, a denominator $jx_i+c_i$ of a second term on the right member of the equation (40) moves linearly on the complex plane following a change in the reactance $x_i$. Therefore, based on the property of the bilinear transform, a locus of the equivalent weight vector $w_i$ is a circle that passes an origin. Since the denominator $jx_i+c_i$ is common to every k, the equivalent weight vector $w_k$ is a result of subjecting the locus of $1/(jx_i+c_i)$ to similarity transform and rotation by a complex number $b_{ik}$ and to translation by a complex number $b_{ik}$. Consequently, the rotation angle on the circular locus including a rotation angle and rotation direction of the circular locus of $1/(jx_i+c_i)$ is common to every equivalent weight vector $w_k$. In other words, if the equivalent weight vector $w_i$ is rotated on the circular locus at an angle θ by appropriately changing the reactance $x_i$, the equivalent weight vector $w_k$ is rotated at the angle θ in the same direction.

Other Modified Preferred Embodiment

Figure 50:
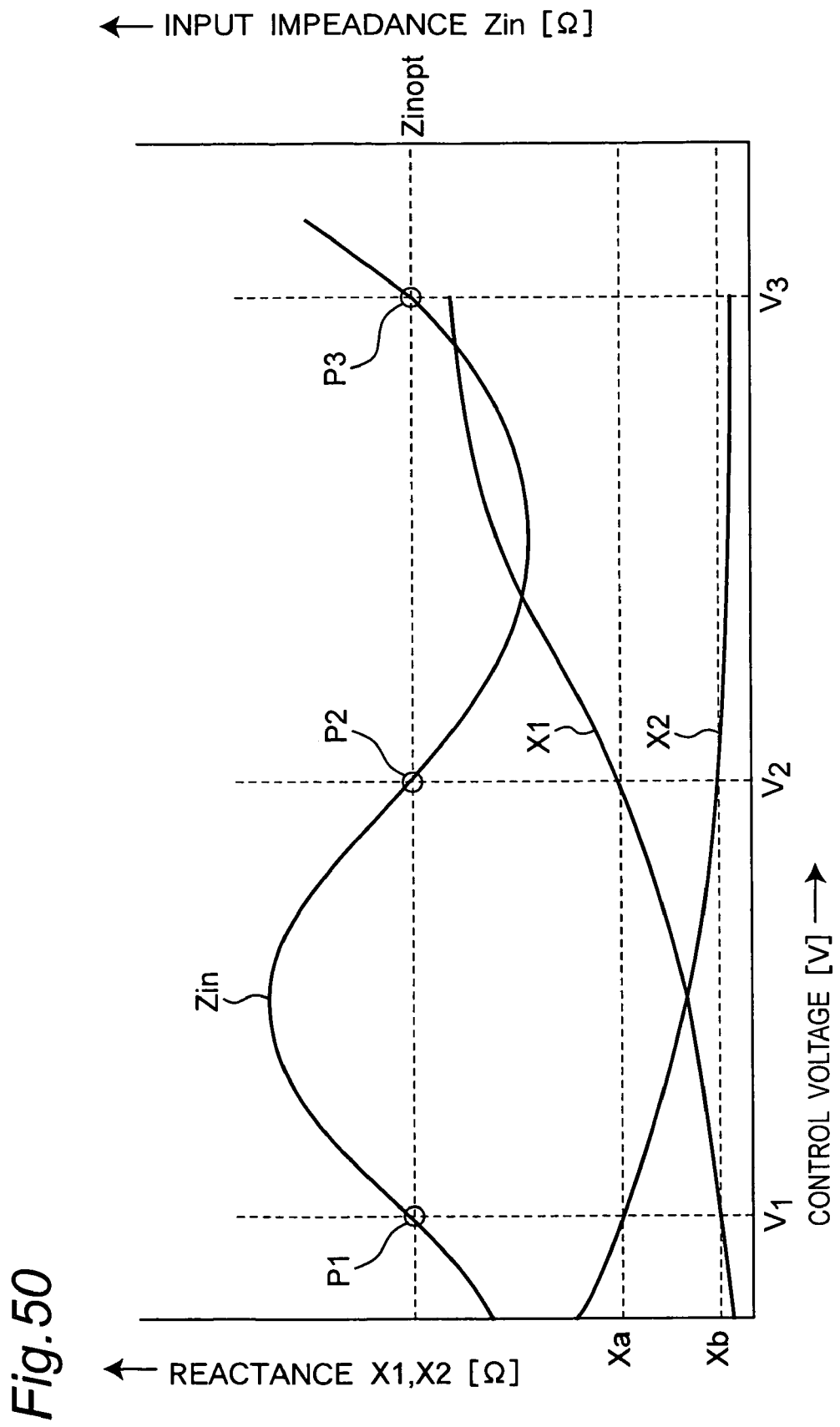
FIG. 50 is a graph showing three states P1, P2, and P3 which can be set for characteristics of an input impedance $Z_{in}$ and reactances X1 and X2 relative to a control voltage applied to variable reactance elements 12-1 and 12-2 according to a modified preferred embodiment of the present invention.
Figure 51:
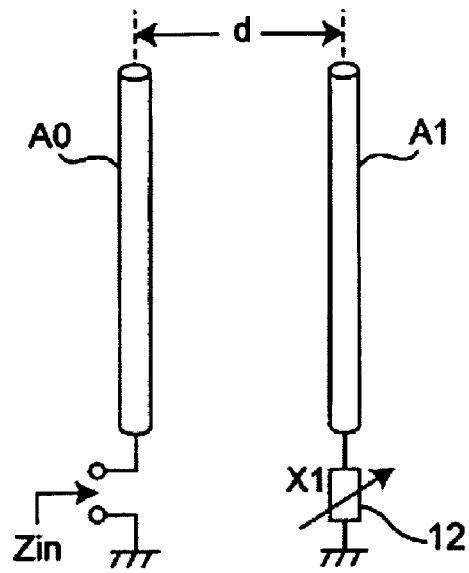
FIG. 51 is a block diagram showing a configuration of a conventional two-element array antenna apparatus.
Figure 52:
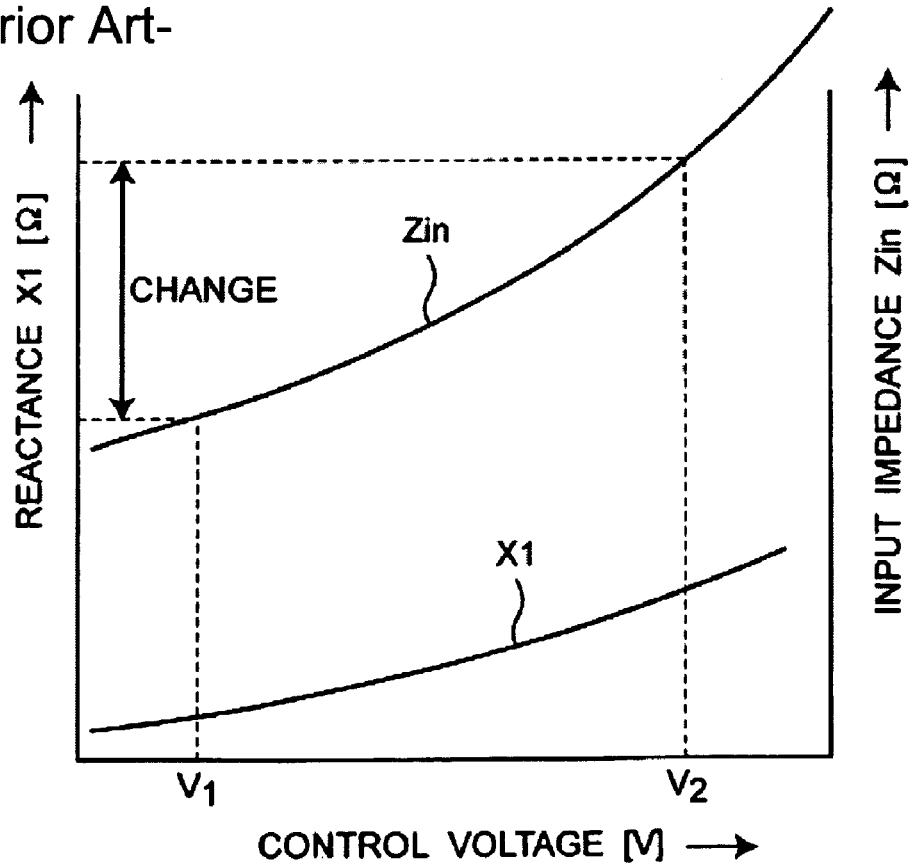
FIG. 52 is a graph showing a reactance X1 and an input impedance $Z_{in}$ relative to a control voltage applied to a variable reactance element 12-1 of the array antenna apparatus shown in FIG. 51.

FIG. 50 is a graph showing three states P1, P2, and P3 which can be set for characteristics of an input impedance $Z_{in}$ and reactances X1 and X2 relative to a control voltage applied to variable reactance elements 12-1 and 12-2 according to a modified preferred embodiment of the present invention.

In the first preferred embodiment, the instance of selecting one reactance set from two reactance sets so as to be able to obtain a diversity gain equal to or larger than a predetermined value, and so as to keep the input impedance of the array antenna substantially unchanged has been described. However, the present invention is not limited to this. As shown in FIG. 50, one reactance set may be selected from among three or more reactance sets so as to be able to obtain a diversity gain equal to or larger than a predetermined value, and so to keep the input impedance of the array antenna substantially unchanged.

In the above-mentioned preferred embodiments, the array antenna the array antenna may be an array antenna apparatus which includes: a radiating element for receiving a transmitted radio signal; a plurality of parasitic elements each provided to be distant from the radiating element at a predetermined interval; and a plurality of variable reactance elements connected to the parasitic elements, respectively, wherein, by changing reactances which are set to the respective variable reactance elements, the respective parasitic elements are allowed to operate as waveguides or reflectors, and this leads to change of changing a directivity characteristic of the array antenna. It is preferable that the antenna controller 10 selects one reactance set from among a plurality of reactance sets in a plurality of cases of setting the plurality of reactance sets, respectively so as to be able to obtain a diversity gain equal to or larger than a predetermined value without a limitation that an input impedance is kept substantially unchanged, based on the radio signal received by the array antenna, based on a signal quality of the radio signal received in each of the plurality of cases according to a predetermined selection criterion, and sets the selected reactance set to the plurality of variable reactance elements, respectively.

Further, the plurality of cases are cases of setting the plurality of reactance sets so as to be able to obtain a diversity gain equal to or larger than a predetermined value, and so as to keep an input impedance of the array antenna substantially unchanged, based on the radio signal received by the array antenna.

The signal quality of the radio signal may be estimated using any one of a signal strength, a signal power, a signal-to-noise ratio, a ratio of signal to noise including interference noise, a ratio of carrier signal to noise, a bit error rate, a frame error rate, and a packet error rate.

Preferably, the selection criterion is such that the signal quality of the radio signal received in each of the plurality of cases is equal to or larger than a predetermined threshold. Alternatively and preferably, the selection criterion is that, when the signal quality of the radio signal received in each of the plurality of cases is any one of the signal power, the signal-to-noise ratio, the ratio of signal to noise including an interference noise, and the ratio of carrier signal to noise, the reactance set, as obtained when the signal quality is the maximum, is selected. Alternatively, the selection criterion is that, when the signal quality of the radio signal received in each of the plurality of cases is any one of the bit error rate, the frame error rate, and the packet error rate, the reactance set as obtained when the signal quality is a lowest is selected.

Preferably, the antenna controller 10 arbitrarily selects one reactance set from among the plurality of reactance sets when the signal quality of the radio signal received in each of the plurality of cases is smaller than a predetermined threshold, and repeats the selection processing until the signal quality reaches a predetermined selection criterion for the selected reactance set. Alternatively and preferably, the antenna controller 10 selects one reactance set in a predetermined order from among the plurality of reactance sets when the signal quality of the radio signal received in each of the plurality of cases is smaller than a predetermined threshold, and repeats the selection processing until the signal quality reaches a predetermined selection criterion for the selected reactance set.

It is also preferable that the antenna controller 10 switches over the plurality of cases with changing the threshold in a predetermined range, and sets the threshold as obtained when the signal quality of the radio signal satisfies a predetermined selection criterion, as the threshold.

Further, the antenna controller 10 preferably sets the threshold when the signal quality of the radio signal for the currently selected reactance set is smaller than a different threshold as smaller than the present threshold by a predetermined natural number of times or more. Alternatively and preferably, the antenna controller 10 sets the threshold when it is detected that a radio communication apparatus mounting therein the array antenna controller 10 moves. Alternatively and preferably, the antenna controller 10 sets the threshold when a utilization frequency of the radio communication apparatus mounting therein the array antenna controller 10 is switched over. Furthermore, alternatively and preferably, when one of the plurality of reactance sets is selected and set to the plurality of variable reactance elements according to the selection criterion, the antenna controller 10 stops switching of the set for a predetermined period.

As mentioned above in detail, according to one aspect of the present invention, there is provided a controller for controlling an array antenna. The array antenna includes a radiating element, a plurality of parasitic elements, and a plurality of variable reactance elements. The radiating element is provided for receiving a transmitted radio signal, and each of the parasitic elements is provided to be distant from the radiating element at a predetermined interval. The variable reactance elements are connected to the parasitic elements, respectively. The controller changes reactances to be set to the variable reactance elements, respectively, so that the parasitic elements operate as waveguides or reflectors, and then changing a directivity characteristic of the array antenna. The controller includes a control device. The control device selects one reactance set from among a plurality of reactance sets in a plurality of cases of setting the plurality of reactance sets, respectively so as to be able to obtain a diversity gain equal to or larger than a predetermined value, based on the radio signal received by the array antenna, based on a signal quality of the radio signal received in each of the plurality of cases according to a predetermined selection criterion, and then, sets the selected reactance set to the plurality of variable reactance elements, respectively.

Therefore, as compared with the conventional art, hardware for configuration is quite simple, and a larger diversity gain can be obtained by extremely simple control. The array antenna controller can obtain an advantageous effect of greatly improving the antenna gain, in particular when the multipath fading is present, by simple one-bit control. Therefore, the diversity antenna which can be mounted in a commercially available consumer terminal apparatus such as a laptop terminal apparatus or a PC card can be realized. In addition, the one-bit control according to the present invention can dispense with the control voltage generation DA converter which is required in the conventional art for continuously controlling the variable capacitance element. Therefore, the antenna apparatus can be made smaller in size and lower in cost.

Further, in the array antenna controller, the plurality of cases are of setting the plurality of reactance sets so as to be able to obtain a diversity gain equal to or larger than a predetermined value, and so as to keep the input impedance of the array antenna substantially unchanged, based on the radio signal received by the array antenna. Therefore, as compared with the conventional art, hardware for configuration is quite simple, and a larger diversity gain can be obtained by extremely simple control. In addition, the input impedance of the array antenna can be kept substantially unchanged.

Moreover, according to another aspect of the present invention, there is provided an array antenna apparatus including one radiating element, two radiating elements, and two variable reactance elements. Between the two parasitic elements, the radiating element is provided, and the two parasitic elements are provided linearly together with the radiating element. The two variable reactance elements are connected to the parasitic elements, respectively. The array antenna apparatus changes reactances which are set to the respective variable reactance elements, so that the parasitic elements operate as waveguides or reflectors, thereby changing a directivity characteristic of the array antenna apparatus.

The array antenna apparatus further includes a dielectric substrate, a grounding electrical conductor, and three strip electrical conductors. The dielectric substrate includes first and second surface parallel to each other. The grounding electrical conductor is formed on a predetermined first region on the second surface of the dielectric substrate. The three strip electrical conductors are formed on the first surface of the dielectric substrate, the three strip electrical conductors are formed to have a predetermined length so as to protrude from a region opposite to the first region, and the three strip electrical conductors are provided at a predetermined interval so as to operate as the radiating element and the two parasitic elements, respectively.

Therefore, the three-element electronically steerable passive array radiator antenna apparatus, which is small in size, light in weight, and thin, can be provided.

INDUSTRIAL APPLICABILITY OF UTILIZATION

As mentioned above in detail, according to the present invention, as compared with the conventional art, hardware for configuration is quite simple, and a larger diversity gain can be obtained by extremely simple control. In addition, input impedance of the array antenna is not substantially changed. The array antenna controller can obtain an advantageous effect of greatly improving the antenna gain, in particular when the multipath fading is present, by simple one-bit control. Therefore, the diversity antenna which can be mounted in a commercially available consumer terminal apparatus such as a laptop terminal apparatus or a PC card can be realized. In addition, the one-bit control according to the present invention can dispense with the control voltage generation DA converter which is required in the conventional art for continuously controlling the variable reactance element. Therefore, the antenna apparatus can be made smaller in size and lower in cost. Further, the three-element electronically steerable passive array radiator antenna apparatus, which is small in size, light in weight, and thin, can be provided.

The invention claimed is:

1. A controller for controlling an array antenna, said array antenna comprising:
    a radiating element for receiving a transmitted radio signal;
    a plurality of parasitic elements each provided to be distant from said radiating element at a predetermined interval; and
    a plurality of variable reactance elements connected to said parasitic elements, respectively,
    wherein said controller changes reactances to be set to said variable reactance elements, respectively, so that said parasitic elements operate as waveguides or reflectors, thereby changing a directivity characteristic of the array antenna,
    wherein said controller comprising:
    a control device for selecting one reactance set from among a plurality of reactance sets in a plurality of cases of setting the plurality of reactance sets, respectively so as to be able to obtain a diversity gain equal to or larger than a predetermined value, and so as to keep an input impedance of said array antenna substantially unchanged, based on the radio signal received by said array antenna, based on a signal quality of the radio signal received in each of the plurality of cases according to a predetermined selection criterion, and for setting the selected reactance set to the plurality of variable reactance elements, respectively.

2. The array antenna controller as claimed in claim 1, wherein the signal quality of the radio signal is estimated using one of a signal strength, a signal power, a signal-to-noise ratio, a ratio of signal to noise including an interference noise, a ratio of a carrier signal to noise, a bit error rate, a frame error rate, and a packet error rate.

3. The array antenna controller as claimed in claim 1, wherein the selection criterion is such that the signal quality of the radio signal received in each of the plurality of cases is equal to or larger than a predetermined threshold.

4. The array antenna controller as claimed in claim 1, wherein the selection criterion is such that, when the signal quality of the radio signal received in each of a plurality of cases is one of a signal power, a signal-to-noise ratio, a ratio of signal to noise including an interference noise, and a ratio of carrier signal to noise, then a reactance set, as obtained when the signal quality is a maximum, is selected.

5. The array antenna controller as claimed in claim 1, wherein the selection criterion is such that, when the signal quality of the radio signal received in each of the plurality of cases is one of a bit error rate, a frame error rate, and a packet error rate, then a reactance set, as obtained when the signal quality is a minimum, is selected.

6. The array antenna controller as claimed in claim 1, wherein the control device arbitrarily selects one reactance set from among the plurality of reactance sets when the signal quality of the radio signal received in each of the plurality of cases is smaller than a predetermined threshold, and repeats the selection processing until the signal quality reaches a predetermined selection criterion for the selected reactance set.

7. The array antenna controller as claimed in claim 1, wherein said control device selects one reactance set in a predetermined order from among the plurality of reactance sets when the signal quality of the radio signal received in each of the plurality of cases is smaller than a predetermined threshold, and repeats the selection processing until the signal quality reaches a predetermined selection criterion for the selected reactance set.

8. The array antenna controller as claimed in claim 1, wherein said control device switches over the plurality of cases with changing a threshold in a predetermined range, and sets as said threshold, a threshold as obtained when the signal quality of the radio signal satisfies a predetermined selection criterion.

9. The array antenna controller as claimed in claim 1, wherein said array antenna comprises an even number of parasitic elements and an even number of variable reactance elements,
    wherein the even number of parasitic elements includes at least one first set of parasitic elements and at least one second set of parasitic elements,
    wherein the even number of variable reactance elements include a first set of variable reactance elements connected to the first set of parasitic elements, respectively, and a second set of variable reactance elements connected to the second set of parasitic elements, respectively,
    wherein the plurality of cases include a first case in which the first reactance set is set to the first and second sets of variable reactance elements, and a second case in which the second reactance set is set to the first and second sets of variable reactance elements, and
    wherein said control device selects one reactance set based on the signal quality of the radio signal received in each of the first and second cases, and sets the selected reactance set to the first and second sets of variable reactance elements.

10. The array antenna controller as claimed in claim 1, wherein said array antenna comprises first and second parasitic elements, a first reactance set includes reactances $X_a$ and $X_b$ which are set to said first and second parasitic elements, and a second reactance set includes the reactances $X_b$ and $X_a$ which are set to said first and second parasitic elements.

11. The array antenna controller as claimed in claim 1, wherein said array antenna comprises a plurality of parasitic elements each being distant from said radiating element at a predetermined interval, and the parasitic elements are provided at substantially equal angle relative to each other, and wherein the plurality of cases include a case in which a plurality of reactance sets obtained by circulating respective reactances are set so as to be able to obtain a diversity gain equal to or larger than a predetermined value, based on the radio signal received by said array antenna.

12. The array antenna controller as claimed in claim 1, wherein said array antenna includes a plurality of parasitic elements each being distant from said radiating element at a predetermined interval, and the parasitic elements are provided at substantially equal angle relative to each other, and wherein the plurality of cases include a case in which a plurality of reactance sets obtained by circulating respective reactances are set so as to be able to obtain a diversity gain equal to or larger than a predetermined value and so as to keep an input impedance of said array antenna substantially unchanged, based on the radio signal received by said array antenna.

13. The array antenna controller as claimed in claim 1, wherein said array antenna comprises:

at least one pair of parasitic elements provided linearly symmetrically about a symmetric line that serves as a symmetric axis, and that passes through a position of said radiating element; and a plurality of parasitic elements provided either one of to be located on the symmetric line and to be linearly symmetric about the symmetric line serving as the symmetric axis, and wherein the plurality of cases include at least two cases in which a plurality of reactance sets obtained by replacing reactances of at least one pair of parasitic elements provided linearly symmetrically with each other are set so as to be able to obtain a diversity gain equal to or larger than a predetermined value, based on the radio signal received by said array antenna.

14. The array antenna controller as claimed in claim 1, wherein said array antenna comprises:

at least one pair of parasitic elements provided linearly symmetrically about a symmetric line that serves as a symmetric axis, and that passes through a position of said radiating element; and a plurality of parasitic elements provided either one of to be located on the symmetric line and to be linearly symmetric about the symmetric line serving as the symmetric axis, and wherein the plurality of cases include at least two cases in which a plurality of reactance sets obtained by replacing reactances of at least one pair of parasitic elements provided linearly symmetrically with each other are set so as to be able to obtain a diversity gain equal to or larger than a predetermined value, and so as to keep the input impedance of said array antenna substantially unchanged, based on the radio signal received by said array antenna.

15. The array antenna controller as claimed in claim 1, wherein when a CDF, which is a cumulative probability of such an event as a signal power of the received radio signal exceeding a predetermined signal power, is a predetermined value, the plurality of reactance sets are set so that the diversity gain is substantially a maximum.

16. The array antenna controller as claimed in claim 1, wherein when a CDF, which is a cumulative probability of such an event as a signal power of the received radio signal exceeding a predetermined signal power, is a predetermined value, the plurality of reactance sets are set so that the diversity gain is equal to or larger than a predetermined value.

17. The array antenna controller as claimed in claim 1, wherein said array antenna comprises:

one radiating element; and two parasitic elements between which said radiating element is provided, and which are provided linearly together with said radiating element.

18. The array antenna controller as claimed in claim 17, wherein a distance between said radiating element and each of said parasitic elements is set to one of lengths which are 0.1 to 0.35 times as large as a wavelength of the received radio signal.

19. The array antenna controller as claimed in claim 17, wherein said array antenna comprises:

a dielectric substrate including first and second surfaces parallel to each other;

a grounding electrical conductor formed on a predetermined first region on the second surface of said dielectric substrate; and three strip electrical conductors formed on the first surface of said dielectric substrate, said three strip electrical conductors being formed to have a predetermined length so as to protrude from a region opposite to the first region, and to be provided at predetermined interval, said three strip electrical conductors operating as the radiating element and the two parasitic elements, respectively.

20. An array antenna apparatus comprising:

one radiating element;

two parasitic elements between which said radiating element is provided, and said two parasitic elements being provided linearly together with the radiating element; and two variable reactance elements connected to said parasitic elements, respectively, wherein said array antenna apparatus changes reactances which are set to said respective variable reactance elements, so that the parasitic elements operate as waveguides or reflectors, thereby changing a directivity characteristic of said array antenna apparatus, wherein said array antenna apparatus further comprises:

a dielectric substrate including first and second surface parallel to each other;

a grounding electrical conductor formed on a predetermined first region on the second surface of said dielectric substrate; and three strip electrical conductors formed lengthwise on the first surface of said dielectric substrate, said three strip electrical conductors being formed to have a predetermined length so as to protrude from a region opposite to the first region, and said three strip electrical conductors being provided at a predetermined interval, and operating as the radiating element and the two parasitic elements, respectively.

21. The array antenna apparatus as claimed in claim 20, wherein a distance between the radiating element and each of the parasitic elements is set to one of lengths which are 0.1 to 0.35 times as large as a wavelength of a received radio signal.

* * * * *